(12) United States Patent
Zamudio et al.

(10) Patent No.: US 10,932,002 B2
(45) Date of Patent: Feb. 23, 2021

(54) CROSS-MEDIA MEASUREMENT DEVICE AND METHOD

(71) Applicant: Hyphametrics, Inc., Albany, NY (US)

(72) Inventors: Gerardo Lopez Zamudio, Mexico City (MX); Joanna Drews, Derwood, MD (US)

(73) Assignee: Hyphametrics, Inc., Albany, NY (US)

( * ) Notice: Subject to any disclaimer, the term of this patent is extended or adjusted under 35 U.S.C. 154(b) by 0 days.

(21) Appl. No.: 16/925,029

(22) Filed: Jul. 9, 2020

(65) Prior Publication Data

US 2021/0014565 A1 Jan. 14, 2021

Related U.S. Application Data

(60) Provisional application No. 62/871,789, filed on Jul. 9, 2019.

(51) Int. Cl.
| | | |
|---|---|---|
| H04H 60/32 | (2008.01) |
| H04N 21/442 | (2011.01) |
| G06K 9/00 | (2006.01) |
| H04N 21/258 | (2011.01) |
| H04N 21/4402 | (2011.01) |
| H04N 21/466 | (2011.01) |
| G06N 20/00 | (2019.01) |
| G06N 5/04 | (2006.01) |
| H04N 21/81 | (2011.01) |
| G06Q 30/02 | (2012.01) |

(52) U.S. Cl.
CPC ... *H04N 21/44222* (2013.01); *G06K 9/00744* (2013.01); *G06N 5/04* (2013.01); *G06N 20/00* (2019.01); *H04N 21/25883* (2013.01); *H04N 21/4402* (2013.01); *H04N 21/4662* (2013.01); *H04N 21/812* (2013.01); *G06K 2209/25* (2013.01); *G06Q 30/0242* (2013.01); *G06Q 30/0272* (2013.01)

(58) Field of Classification Search
CPC ....... H04N 21/44222; H04N 21/25883; H04N 21/4402; H04N 21/4662; H04N 21/812
USPC ......................................................... 725/14
See application file for complete search history.

(56) References Cited

U.S. PATENT DOCUMENTS

| | | | |
|---|---|---|---|
| 9,055,309 B2 * | 6/2015 | Neumeier | H04N 21/23614 |
| 9,705,544 B2 * | 7/2017 | van de Beek | H04L 27/06 |
| 10,375,451 B2 * | 8/2019 | Neumeier | H04N 21/25866 |
| 10,631,068 B2 * | 4/2020 | Navin | G08C 17/02 |

(Continued)

*Primary Examiner* — Pankaj Kumar
*Assistant Examiner* — Sahar Aqil Riaz
(74) *Attorney, Agent, or Firm* — Maginot, Moore & Beck LLP

(57) ABSTRACT

A method of identifying media content presented on a display device includes determining a selected input source providing a video signal to the display device, and then selecting a first set of content identification rules when it is determined that the selected input source is a first input source, and selecting a second set of content identification rules when it is determined that the selected input source is a second input source. The method further comprises applying the selected first set or second set of content identification rules to the video signal in order to generate content identification data for the media content presented on the display device. Application of the content identification rules includes waiting for a trigger event and applying an algorithm to one or more frames of the video signal following the trigger event.

20 Claims, 43 Drawing Sheets

(56) References Cited

U.S. PATENT DOCUMENTS

| | | | |
|---|---|---|---|
| 10,779,058 B2* | 9/2020 | Panchaksharaiah | ................................ H04N 21/44222 |
| 2008/0184245 A1* | 7/2008 | St-Jean | .............. G06K 9/00771 718/103 |
| 2011/0078719 A1* | 3/2011 | Kenyon | ................ G06K 9/0055 725/19 |
| 2012/0158726 A1* | 6/2012 | Musgrove | ............. G06F 16/353 707/737 |
| 2014/0225924 A1* | 8/2014 | Loxam | .................. G06T 19/006 345/633 |
| 2014/0317155 A1* | 10/2014 | Treibach-Heck | ........ G06F 16/95 707/811 |
| 2018/0316939 A1* | 11/2018 | Todd | .................. H04N 21/6587 |
| 2018/0316947 A1* | 11/2018 | Todd | ................ H04N 21/25875 |
| 2019/0195652 A1* | 6/2019 | Lafon | .................. G08G 5/0021 |
| 2020/0162788 A1* | 5/2020 | Cremer | ................ H04N 21/442 |
| 2020/0228880 A1* | 7/2020 | Iyer | ................. H04N 21/23424 |
| 2020/0236415 A1* | 7/2020 | Khanna | ............. H04N 21/2353 |
| 2020/0296472 A1* | 9/2020 | Chung | ............... H04N 21/4826 |

* cited by examiner

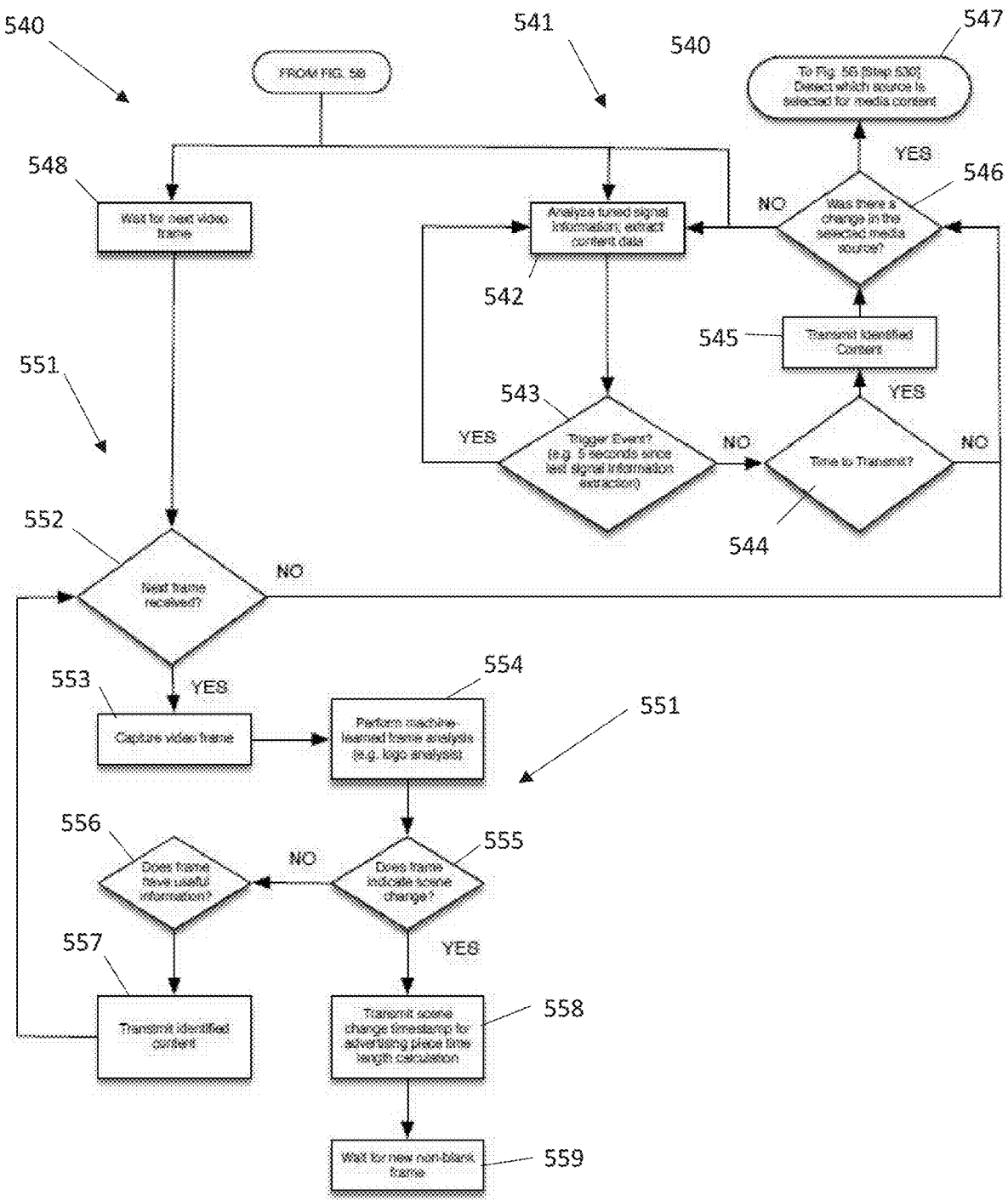
FIG. 5B1

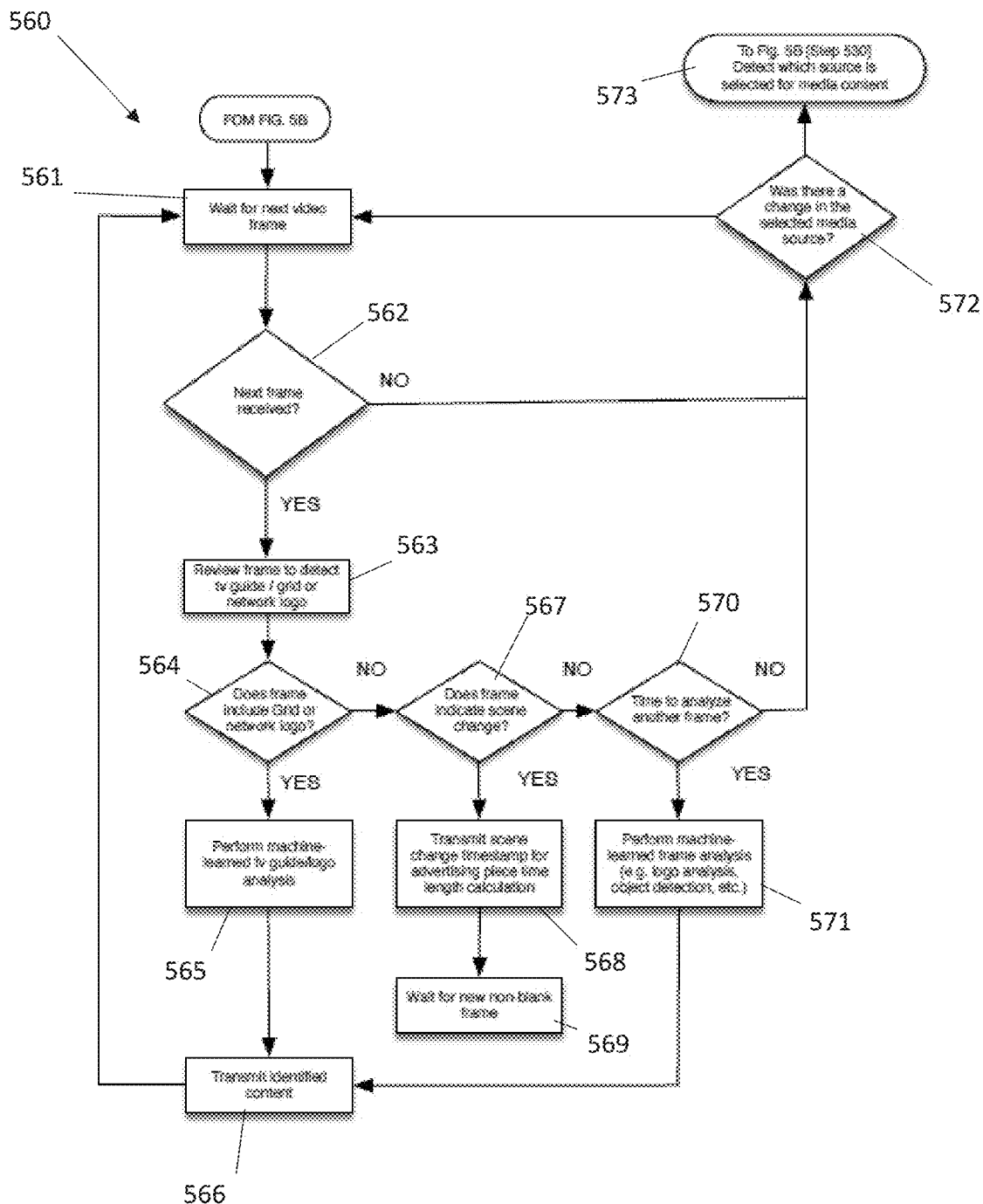
FIG. 5B2

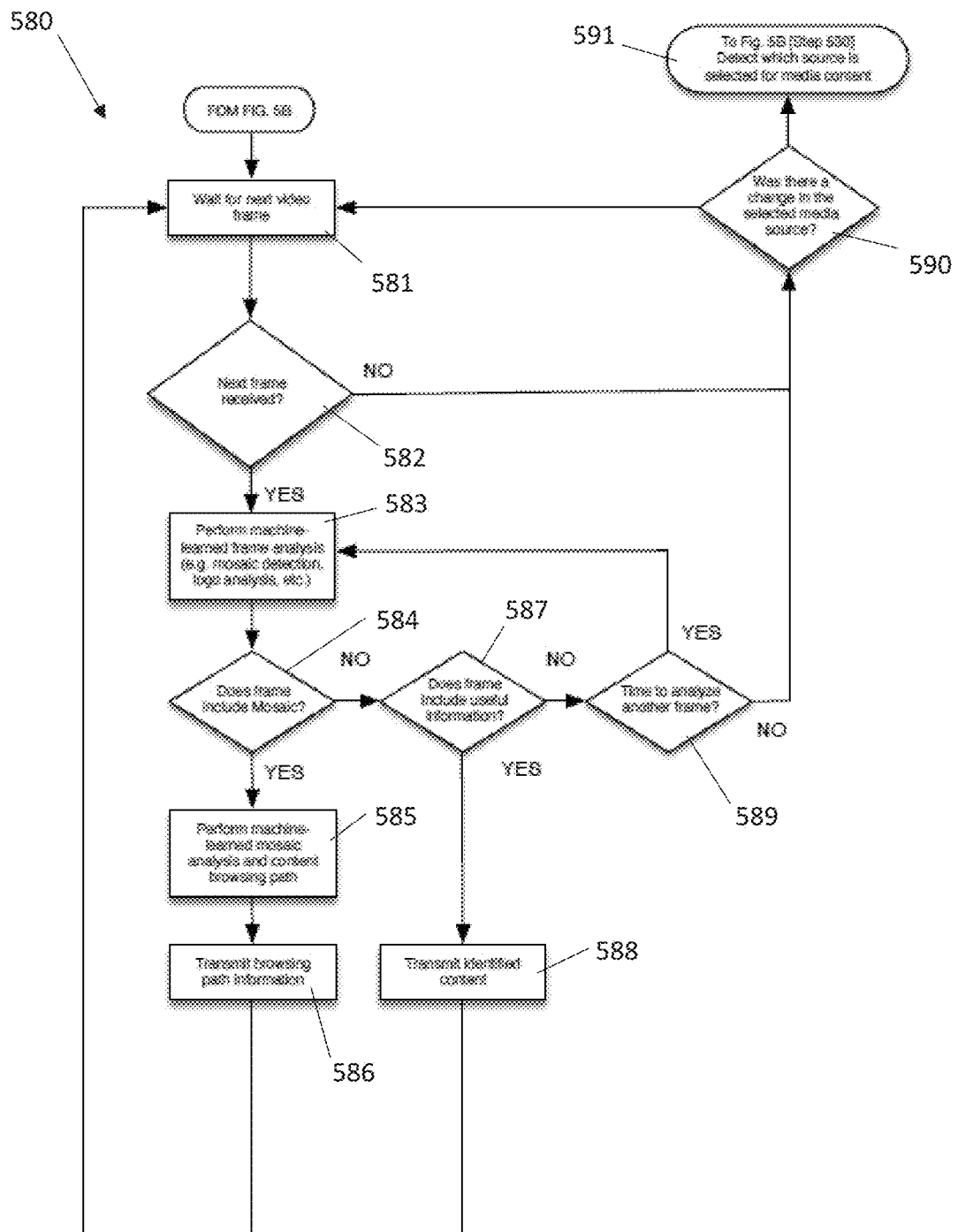
FIG. 5B3

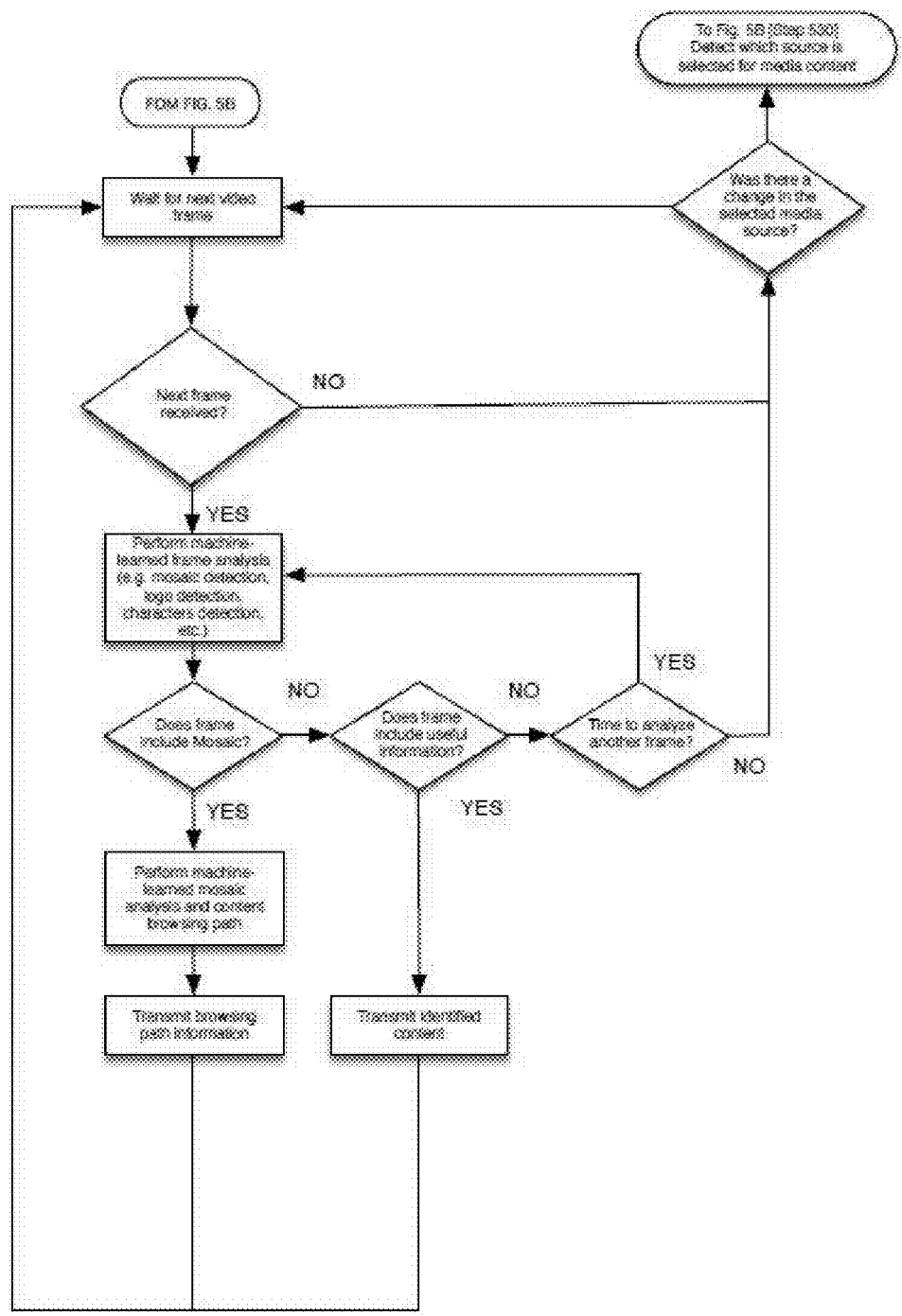
FIG. 5B4

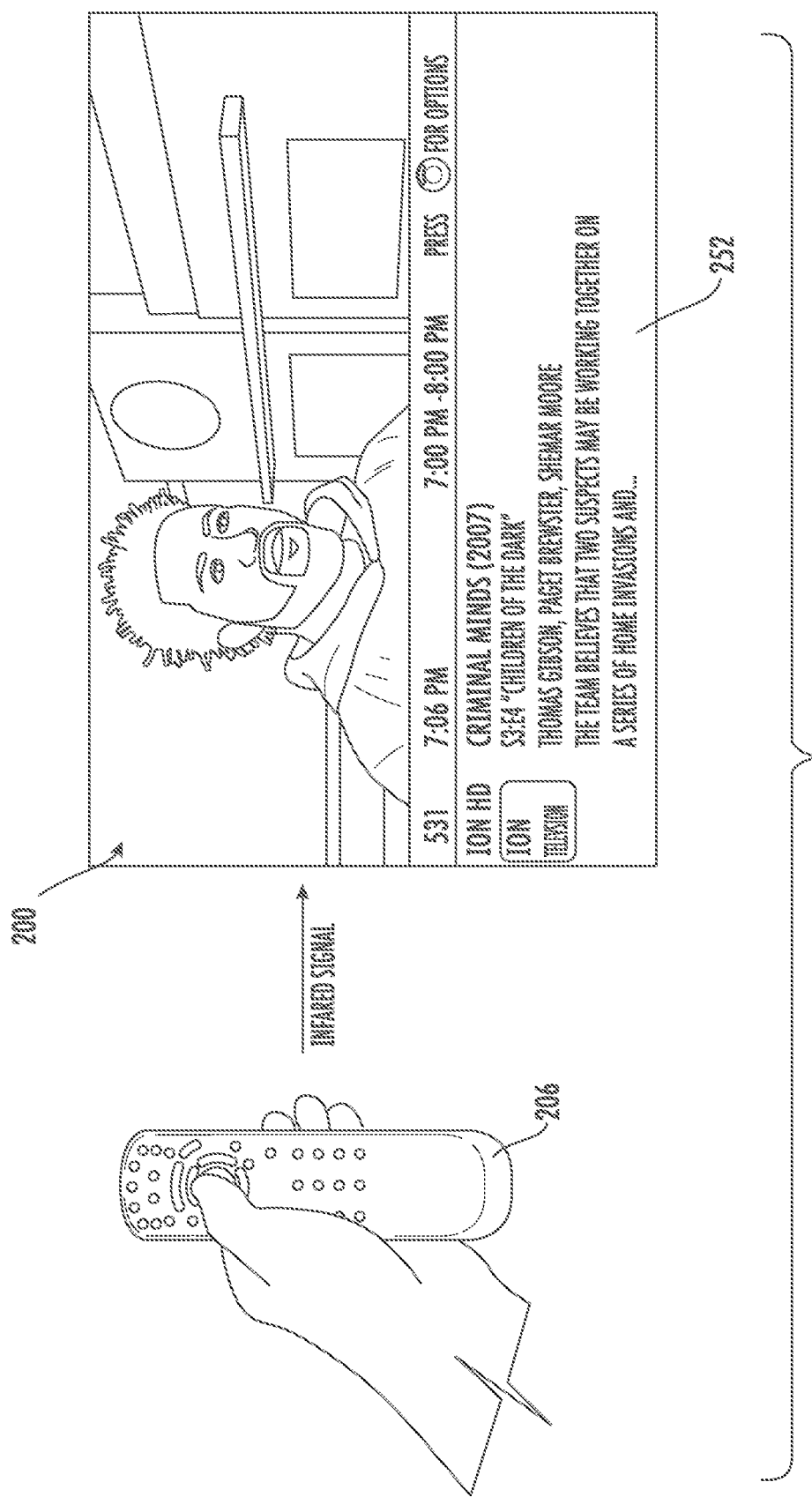

450

2020-06-12  19:06:13.196 5745-5745/com.personicore.hdmi1 I/MainActivity:  Waiting for TV-guide/grid appearance  ← 451
2020-06-12  19:06:13.265 5745-5745/com.personicore.hdmi1 I/MainActivity:  TV-guide/grid detected. Analyzing ...  ← 452
2020-06-12  19:06:13.361 5745-5745/com.personicore.hdmi1 I/MainActivity:  TV-guide/grid presence confirmed ...  ← 453
2020-06-12  19:06:14.024 5745-5745/com.personicore.hdmi1 I/MainActivity:  Extracting text from TV-guide/grid ...  ← 454
2020-06-12  19:06:14.120 5745-5745/com.personicore.hdmi1 I/MainActivity:  Extracting program: Criminal Minds (2007)  ← 455
2020-06-12  19:06:14.191 5745-5745/com.personicore.hdmi1 I/MainActivity:  Extracting network: ion HD  ← 456
2020-06-12  19:06:14.263 5745-5745/com.personicore.hdmi1 I/MainActivity:  Extracting channel number: 531 ...  ← 457
2020-06-12  19:06:14.196 5745-5745/com.personicore.hdmi1 I/MainActivity:  Transmitting data to server ...  ← 458
2020-06-12  19:06:14.328 5745-5745/com.personicore.hdmi1 I/MainActivity:  Waiting for TV-guide/grid appearance  ← 459

2020-06-12 20:05:18.014 5745-5745/com.personicore.hdmi3 I/MainActivity:  Waiting for content grid appearance  → 461
2020-06-12 20:05:18.111 5745-5745/com.personicore.hdmi3 I/MainActivity:  Content grid detected. Analyzing ...  → 462
2020-06-12 20:05:18.435 5745-5745/com.personicore.hdmi3 I/MainActivity:  Content grid presence confirmed ...  → 463
2020-06-12 20:06:19.216 5745-5745/com.personicore.hdmi3 I/MainActivity:  Extracting text from the content grid ...  → 464
2020-06-12 20:06:19.308 5745-5745/com.personicore.hdmi3 I/MainActivity:  Analyzing the selected option ...  → 465
2020-06-12 20:06:19.308 5745-5745/com.personicore.hdmi3 I/MainActivity:  Extracting text from selected option....  → 466
2020-06-12 20:06:19.354 5745-5745/com.personicore.hdmi3 I/MainActivity:  Selected option: TV  → 467
2020-06-12 20:06:19.481 5745-5745/com.personicore.hdmi3 I/MainActivity:  Transmitting data to server ...  → 468
2020-06-12 20:06:19.495 5745-5745/com.personicore.hdmi3 I/MainActivity:  Waiting for content grid appearance  → 469

| | | |
|---|---|---|
| 2020-06-16 | 07:35:13.046 5745-5745/com.personicore.hdmi1 I/MainActivity: ** Detecting logo presence ** | ← 481 |
| 2020-06-16 | 07:35:13.189 5745-5745/com.personicore.hdmi1 I/MainActivity: ** Network logo detected. Analyzing ... ** | ← 482 |
| 2020-06-16 | 07:35:14.180 5745-5745/com.personicore.hdmi1 I/MainActivity: ** Logo recognized: FOX SPORTS ** | ← 483 |
| 2020-06-16 | 07:36:14.394 5745-5745/com.personicore.hdmi1 I/MainActivity: ** Transmitting data to server ... ** | ← 484 |
| 2020-06-16 | 07:36:14.401 5745-5745/com.personicore.hdmi1 I/MainActivity: ** Detecting logo presence ** | ← 485 |
| 2020-06-16 | 07:48:54.238 5745-5745/com.personicore.hdmi1 I/MainActivity: ** Logo no longer present ** | ← 486 |
| 2020-06-16 | 07:48:54.394 5745-5745/com.personicore.hdmi1 I/MainActivity: ** Transmitting data to server ... ** | ← 487 |

Fig. 10

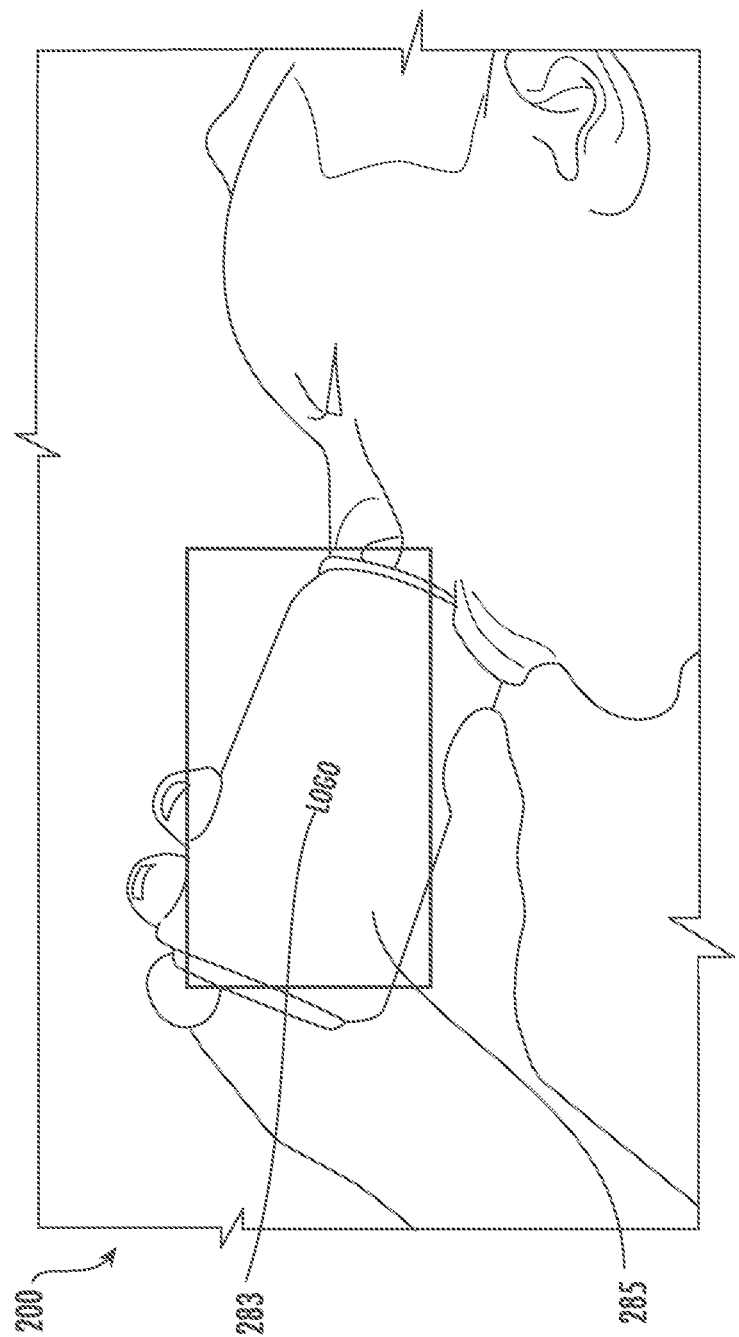
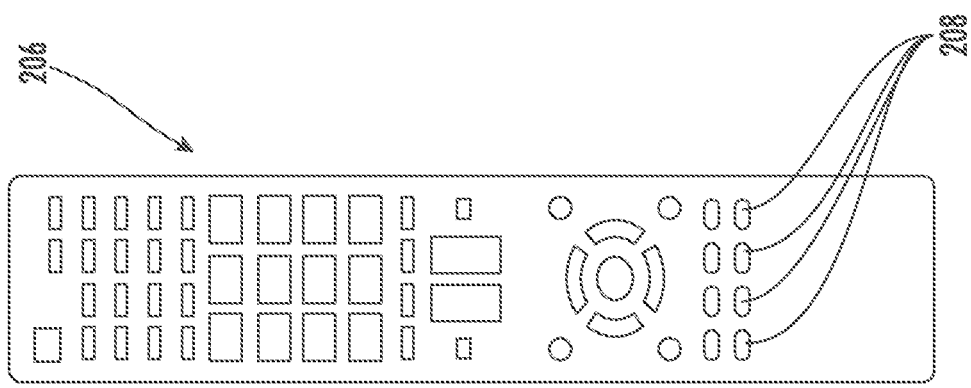
FIG. 10K
FIG. 11

CROSS-MEDIA MEASUREMENT DEVICE AND METHOD

CROSS-REFERENCE TO RELATED APPLICATIONS

The present application claims priority from U.S. Provisional Patent Application Ser. No. 62/871,789, filed Jul. 9, 2019, the entire contents of which are incorporated herein by reference.

FIELD

The present disclosure relates to the field of electronic media measurement, and particularly devices and methods for determining audience measurement for numerous media events.

BACKGROUND

Media content has been an important part of modern life for well over a century. Media content consumed in homes includes various sources, including cable television, over-the-air (OTA) television, recorded video (e.g., DVD), gaming consoles, and various internet sources offering media content via a high speed internet connection (i.e., over-the-top (OTT) content). While consumers enjoy the ability to watch this media content at will, media providers and advertisers have a vested interest in knowing exactly what media content is actually being consumed (i.e., media that is actually viewed, watched, or otherwise on a screen). By knowing this information, media providers and advertisers are better equipped to create new content and strategically place ads within such content.

The use of statistics offers one convenient approach to measuring media content consumption across a large population. To accomplish this, a group of households are recruited to serve on a "panel" intended to be representative of a larger population (e.g., the individuals in ten homes representative of a neighborhood, the individuals in one hundred homes representative of a city, etc.). Each household includes a number of individual panelists, and each panelist has specific demographic information (e.g., age, sex, ethnicity, income, etc.). By determining what media content that individual panelists are watching, statistical projections can be made about what media content is being consumed by the population as a whole.

For many years, the primary means for measuring media consumption by individuals within a household was the use of diaries. Each panelist was instructed them to keep a physical log of all content that they watched during the week. At the end of every day, each panelist would have a diary log listing everything the panelist watched for the day. This diary approach is still used in local markets to determine what ads to show during local news, etc. While the diary approach is capable of generating valuable information, there are many shortcomings. For example, panelists are notoriously inconsistent on accurately recording what they watched. Panelists often forget to log data, or simply cannot remember all of the media content they watched. The diary approach is also slow to assemble data, as physical diary logs must be collected from each user, the data compiled, and assembled into a user format. These activities not only take a significant amount of time and manpower, but are also subject to human error, making the diary approach to measuring media consumption costly and unreliable.

Numerous attempts have been made to implement technological solutions to the measurement of household media consumption in the hopes of addressing the shortcomings of diaries. Inaudible watermarks are an example of one such technological solution that has been attempted in the past. With this approach, audio signals that are inaudible to the human ear are incorporated into media content and captured by listening devices worn by the panelist. The watermark may be, for example, a series of inaudible tones, chimes, or other audio that are periodically played during television programs and/or advertisements. Each panelist is assigned a pager or other listening device that is worn on the panelist while at home. When the watermark is played, it is inaudible to the panelist, but the pager assigned to the panelist records the watermark, and a determination is made that the panelist was watching the media content at the time the watermark was played. Of course, the watermark approach also has numerous shortcomings. For example, media content is often not associated to a panelist because the panelist forgets to wear their pager, or the pager loses power. Also, media content is often incorrectly associated with a panelist because the panelist removes the pager from his or her person and subsequently leave the room. As a result, inaccurate data is often collected by the pagers. Moreover, with the watermark approach, only content that includes a watermark is capable of being captured. Many types of media that a user enjoys may not have a watermark (e.g., non-participating programs and advertisements, DVDs and other recorded media, gaming systems, etc.). As a result, panelists may watch a significant amount of media that is not captured in any way by the system. Therefore, while watermark systems offer some benefits over the conventional diary approach, many deficiencies remain in these systems.

Another example of a past technological solution to measuring household media consumption is fingerprinting using various techniques such as audio or video "automatic content recognition" (ACR). Audio ACR involves recording all of the audio aired (either OTA or on cable TV) on various channels in order to provide a library of audio data within a database. The recorded audio include both programming and advertising. Data associated with each audio signal is also catalogued and saved to a programming grid that identifies all of the content played at different times on different channels. For example, for a particular program, information about the channel that aired the program, the time of airing, the actors in the program, title and other episode data may be catalogued and saved. Thereafter, audio ACR involves periodically recording a short clip of the audio signal (e.g., ten seconds) that is output from the television of the panelist. After an audio fingerprint is captured at a particular time, it is sent to the cloud and compared to each of the audio recordings in the library. When a match is found, i.e., when the fingerprint is matched to a particular portion of one of the audio recordings in the library, the media content is identified based on the grid. In this manner, audio ACR is capable of determining what aired content a user watched at any given time. However, because of difficulties with accurately collecting fingerprints for both programming and advertising, these libraries are generally separate, and either programming fingerprints or advertising fingerprints are captured for a single household, but not both.

Like other prior art solutions to measurement of household media consumption, audio ACR has numerous shortcomings. First, it will be quickly recognized that the computer resources required for audio ACR are enormous, including both the memory and processing power required to store massive amounts of audio content in the library and subsequently compare each captured audio fingerprint to the audio content in the library. Similarly, the time required for system processors to actually compare each fingerprint to all audio recordings in the library is also significant. Moreover, the time and resources required to actually create the programming grid are also enormous. Audio ACR also has other shortcomings. For example, the audio signal captured by audio ACR is often noisy (e.g., because of noisy households), and incapable of recognition. Also, determining who was watching the identified content is problematic because users are required to actively register in association with the content (e.g., by pressing a button on the audio ACR device). Furthermore, audio ACR is only capable of identifying content that is associated with aired programs (i.e., either on cable or OTA). Audio ACR is incapable of identifying media content associated with gaming or OTT content. Audio ACR is also incapable of determining both programming and advertising consumption for a single household of panelists. Therefore, while audio ACR is capable of providing some advantages, it has numerous shortcomings that do not address the current needs in the industry.

Video ACR (also known as pixel ACR) is another form of ACR that operates similar to audio ACR, but monitors a video fingerprint instead of an audio fingerprint. In particular, video ACR records a number of pixels as a particular location on the screen, and then compares the recorded pixels to a library of pixels associated with programming and advertising content. While video ACR solves a few of the problems of audio ACR, such as noise associated with the audio signal, video ACR has related shortcomings. For example, video ACR is only capable of monitoring aired content associated with a particular time and channel. Video ACR is not capable of identifying content provided from other sources such as gaming consoles, video players (e.g., DVD players), or OTT content.

In view of the foregoing, it will be recognized that consumer's media viewing habits have far outpaced current measurement technology solutions which are unable to truly capture an audience's media exposure. The media consumption measurement industry is relying on multiple measurement sources for each device and relies on modeling to infer the measurement gaps. It would be advantageous to provide a system for media content measurement that is robust, capable of identifying content from all media sources within a household, and is not burdened by the shortcomings of past devices and methods for collecting and identifying consumed media content.

SUMMARY

In accordance with one exemplary embodiment of the disclosure, there is provided a method of identifying media content presented on a display device. The display device includes a screen and a speaker, and is in communication with a content gateway. The media content presented on the display device is provided by a video signal comprising a series of frames. The method comprises determining, at a processor within the gateway, a selected input source providing the video signal, wherein the selected input source is one of a plurality of input sources including at least a first input source and a second input source. The method further comprises selecting a first set of content identification rules when it is determined that the selected input source is the first input source, wherein the first set of content identification rules define a first trigger event and a first algorithm for analyzing one or more of the frames of the video signal following the first trigger event. Furthermore, the method comprises selecting a second set of content identification rules when it is determined that the selected input source is the second input source, wherein the second set of content identification rules define a second trigger event and a second algorithm for analyzing one or more frames of the video signal following the second trigger event, and wherein the second set of content identification rules is different from the first set of content identification rules. Additionally, the method comprises applying the selected first set or second set of content identification rules to the video signal in order to generate content identification data for the media content presented on the display device, wherein applying the selected first set of content identification rules includes waiting for the first trigger event and applying the first algorithm to one or more frames of the video signal following the first trigger event, and wherein applying the selected second set of content identification rules includes waiting for the second trigger event and applying the second algorithm to one or more frames of the video signal following the second trigger event.

In accordance with another exemplary embodiment of the disclosure, a non-transitory computer-readable medium is disclosed for identifying media content provided by a video signal delivered to and presented on a display device. The computer-readable medium includes a plurality of instructions stored thereon that, when executed by a processor, cause the processor to determine a selected input source providing the video signal, wherein the selected input source is one of a plurality of input sources including at least a first input source and a second input source. The instructions further cause the processor to select a first set of content identification rules when it is determined that the selected input source is the first input source, wherein the first set of content identification rules define a first trigger event and a first algorithm for analyzing one or more frames of the video signal following the first trigger event. The instructions also cause the processor to select a second set of content identification rules when it is determined that the selected input source is the second input source, wherein the second set of content identification rules define a second trigger event and a second algorithm for analyzing one or more frames of the video signal following the second trigger event, the second set of content identification rules being different from the first set of content identification rules. Additionally, the instructions cause the processor to apply the selected first set or second set of content identification rules to the video signal in order to generate content identification data for the media content presented on the display device, wherein application of the selected first set of content identification rules causes the processor to wait for the first trigger event and apply the first algorithm to one or more frames of the video signal following the first trigger event, and wherein application of the selected second set of content identification rules causes the processor to wait for the second trigger event and applying the second algorithm to one or more frames of the video signal following the second trigger event.

In accordance with yet another exemplary embodiment of the disclosure there is presented a gateway for identifying media content presented on a display device including a screen and a speaker. The gateway includes a plurality of input ports, an output port, and a processor. The plurality of input ports include at least a first input port and a second input port. The output port is configured to transfer a video signal received at the first input port or the second input port to the display device, wherein the video signal includes a series of frames that provide the media content. The processor is configured to execute a computer application comprising a plurality of instructions which are configured to, when executed, cause the gateway to determine a selected input port providing the video signal, and select a first set of content identification rules when it is determined that the selected input port is the first input port, wherein the first set of content identification rules define a first trigger event and a first algorithm for analyzing one or more frames of the video signal following the first trigger event. The instructions further cause the gateway to select a second set of content identification rules when it is determined that the selected input port is the second input port, wherein the second set of content identification rules define a second trigger event and a second algorithm for analyzing one or more frames of the video signal following the second trigger event, and wherein the second set of content identification rules is different from the first set of content identification rules. Additionally, the instructions cause the gateway to apply the selected first set or second set of content identification rules to the video signal in order to generate content identification data for the media content presented on the display device, wherein application of the selected first set of content identification rules causes the processor to wait for the first trigger event and apply the first algorithm to one or more frames of the video signal following the first trigger event, and wherein application of the selected second set of content identification rules causes the processor to wait for the second trigger event and apply the second algorithm to one or more frames of the video signal following the second trigger event.

The above described features and advantages, as well as others, will become more readily apparent to those of ordinary skill in the art by reference to the following detailed description and accompanying drawings. While it would be desirable to provide a method and system for media measurement that provides one or more of these or other advantageous features as may be apparent to those reviewing this disclosure, the teachings disclosed herein extend to those embodiments which fall within the scope of any eventually appended claims, regardless of whether they include or accomplish one or more of the advantages or features mentioned herein.

BRIEF DESCRIPTION OF THE DRAWINGS

FIG. 5B1 shows a flowchart of implementation of a first set of content identification rules when a selected input source is OTA television;

FIG. 5B2 shows FIG. 5B1 shows a flowchart of implementation of a second set of content identification rules when a selected input source is a set-top box;

FIG. 5B3 shows a flowchart of implementation of a third set of content identification rules when a selected input source is OTT content;

FIG. 5B4 shows a flowchart of implementation of a fourth set of content identification rules when a selected input source is a disc player or a video game console;

FIG. 7 illustrates a dataset of media consumption data for a panel collected at the remote server of FIG. 1;

FIG. 10A illustrates an infrared trigger event used in association with a set of content identification rules in the gateway of FIG. 1;

FIG. 10D is an exemplary content log illustrating use of the content banner of FIG. 10C as a trigger event;

FIG. 10F is an exemplary content log illustrating use of the content mosaic of FIG. 10E as a trigger event;

FIG. 10I is an exemplary content log illustrating use of the network logo of FIG. 10H as a trigger event;

FIG. 10K illustrates a brand recognition trigger event used in association with the gateway of FIG. 1;

FIG. 11 is a plan view of an exemplary remote control for the gateway of FIG. 1;

FIG. 21B illustrates a database having exemplary data associated with the data packages of FIG. 21A;

FIG. 21C illustrates additional data within the database of FIG. 21B;

DESCRIPTION

Figure 1:
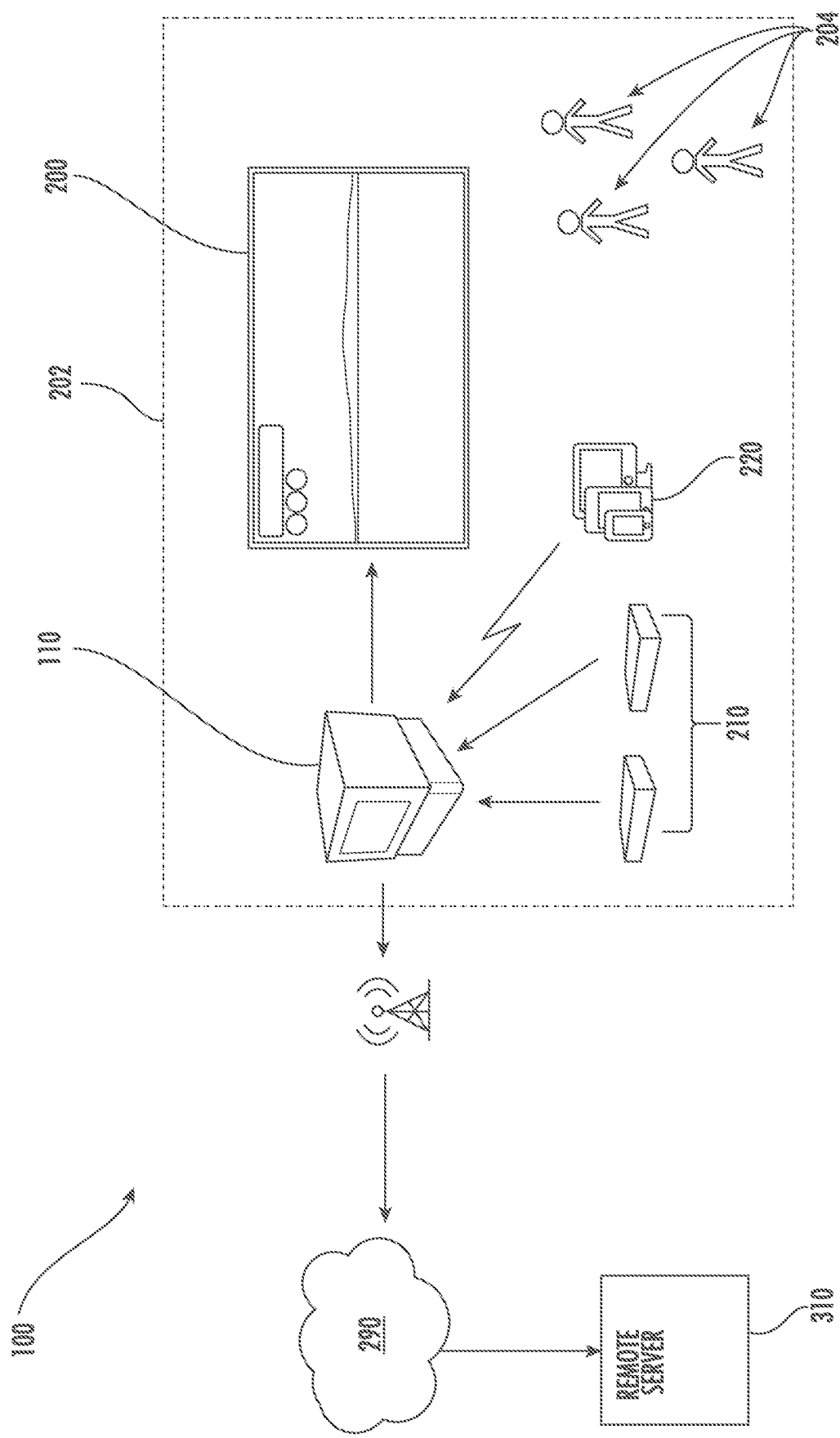
FIG. 1 shows a diagram of a system for cross-media content measurement including a media content gateway positioned within a household and in communication with a remote server.

A system and method for cross-media content measurement is disclosed herein. As shown in FIG. 1, the system for cross-media measurement 100 includes a media gateway 110 connected to a television 200 or other display device within a household. The gateway 110 is connected to various media sources within a household 202, including both wired media sources 210 and wireless media devices 220. The gateway 110 is configured detect consumption of and identify media content presented on both the television 200 and the various wireless devices 220. The gateway 110 is further configured to associate one or more panelists 204 with the identified media content. Data collected by the gateway 110 is transmitted to a remote server 310 via the internet 290 or other wide area network. The remote server 310 may perform additional processing on the data collected by the gateway 110 in order to determine the specific media content consumed by each of the specific panelists.

Gateway Architecture

Figure 2A:
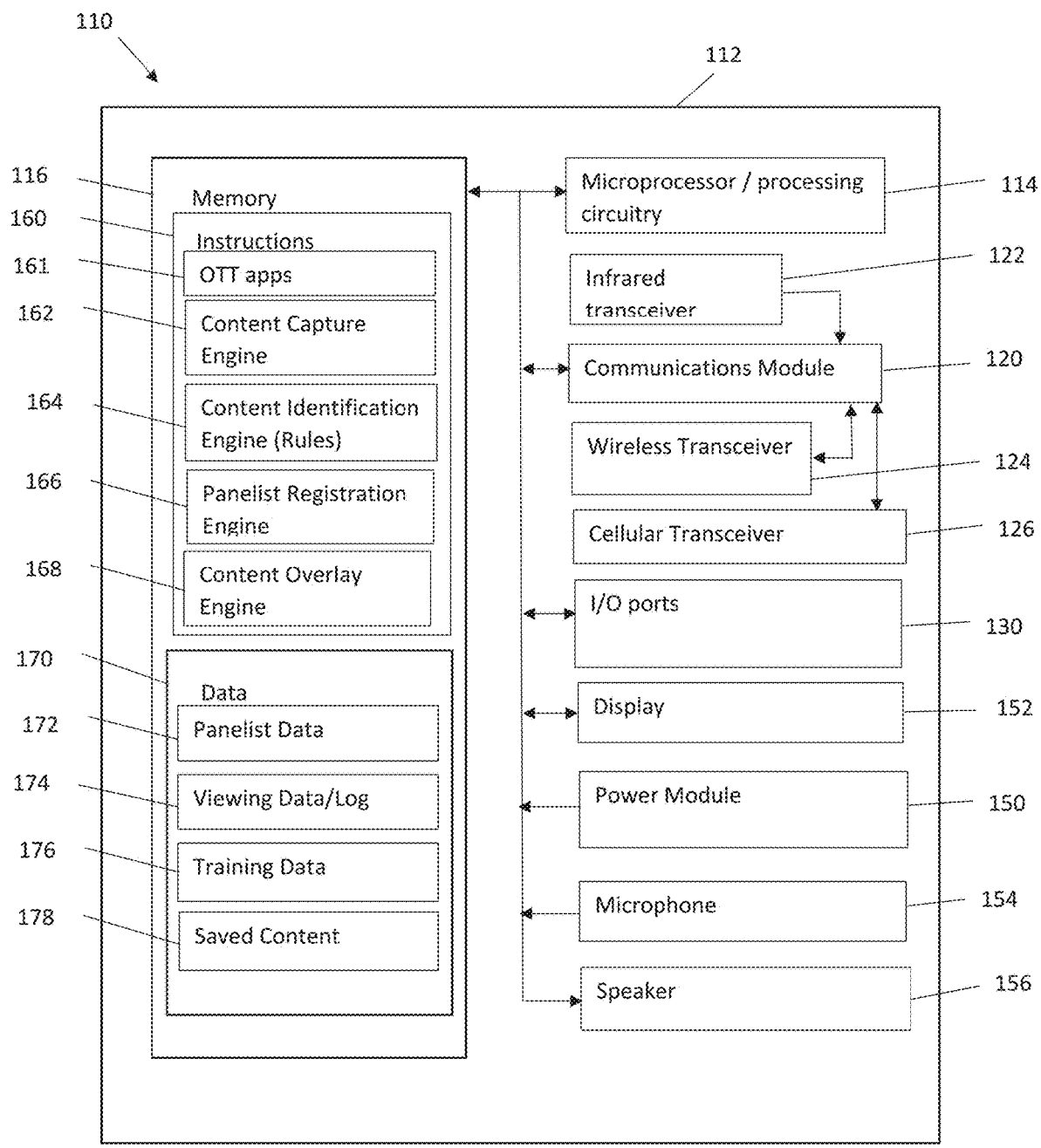
FIG. 2A shows a block diagram of the gateway of FIG. 1.
Figure 2B:
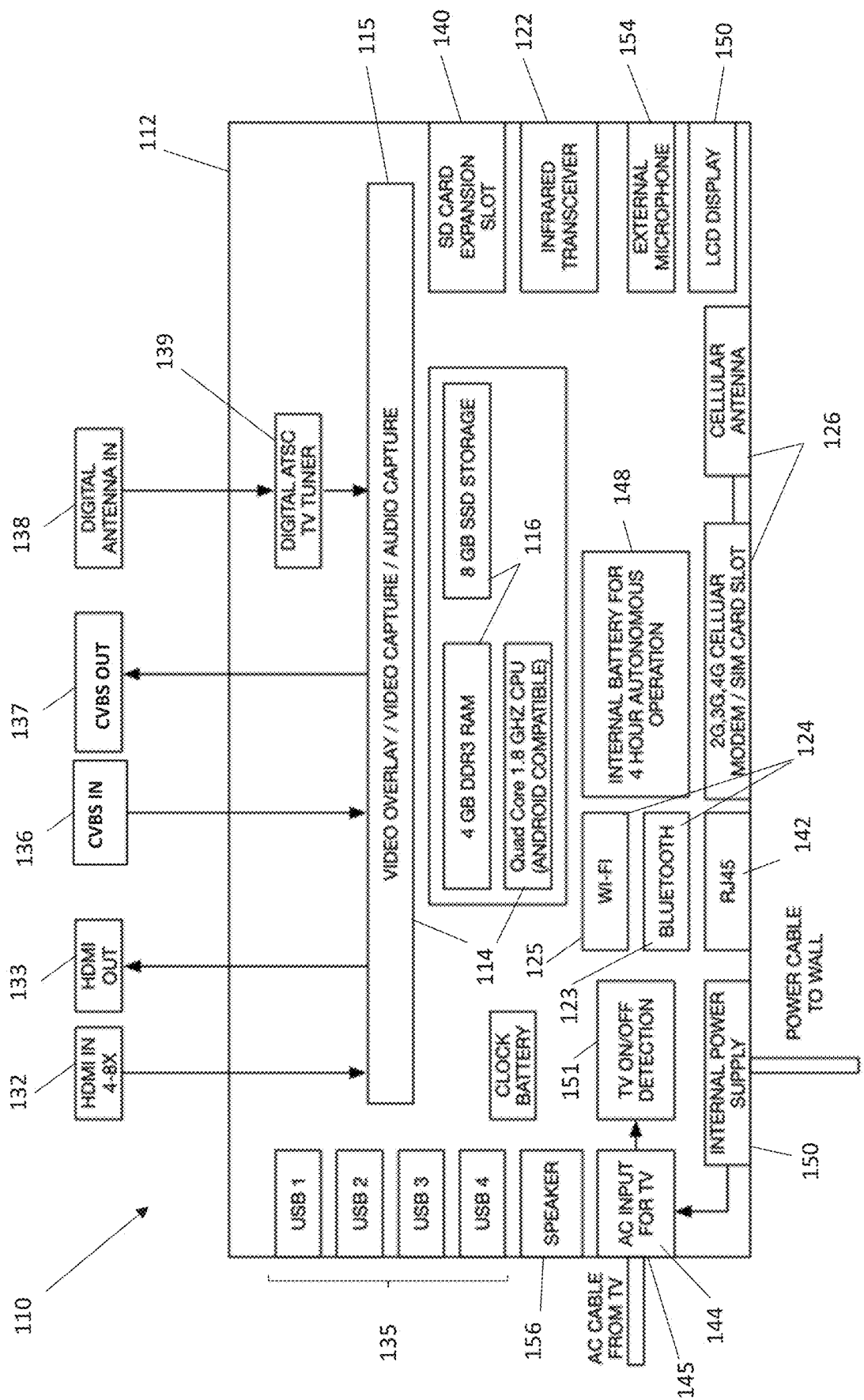
FIG. 2B shows a schematic arrangement for the electronic components within the gateway of FIG. 1.
Figure 2C:
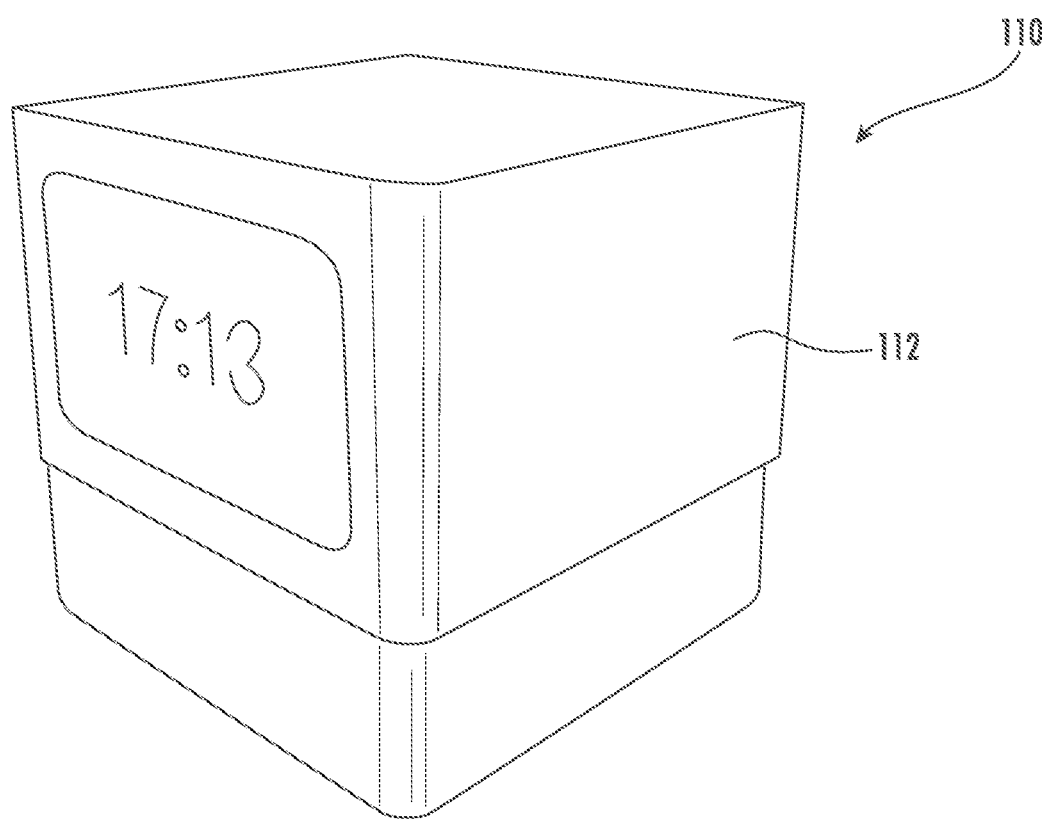
FIG. 2C shows a perspective view of one embodiment of a housing for the gateway of FIG. 1.

FIGS. 2A-2C show an exemplary embodiment of the media gateway 110 (which may also be referred to as a "content recognition meter" or "Coremeter"). FIG. 2A shows a block diagram of the gateway 110. Similarly, FIG. 2B shows a schematic layout for the gateway 110. FIG. 2C shows an exemplary housing 112 for the gateway. It will be appreciated that the embodiment of the media gateway 110 shown in FIGS. 2A-2C is only one exemplary embodiment of a media gateway. As such, the exemplary embodiment of the media gateway 110 of FIGS. 2A-2C is merely representative of any of various manners or configurations of the media gateway 110 or other data processing systems that are operative in the manner set forth herein.

Figure 2D:
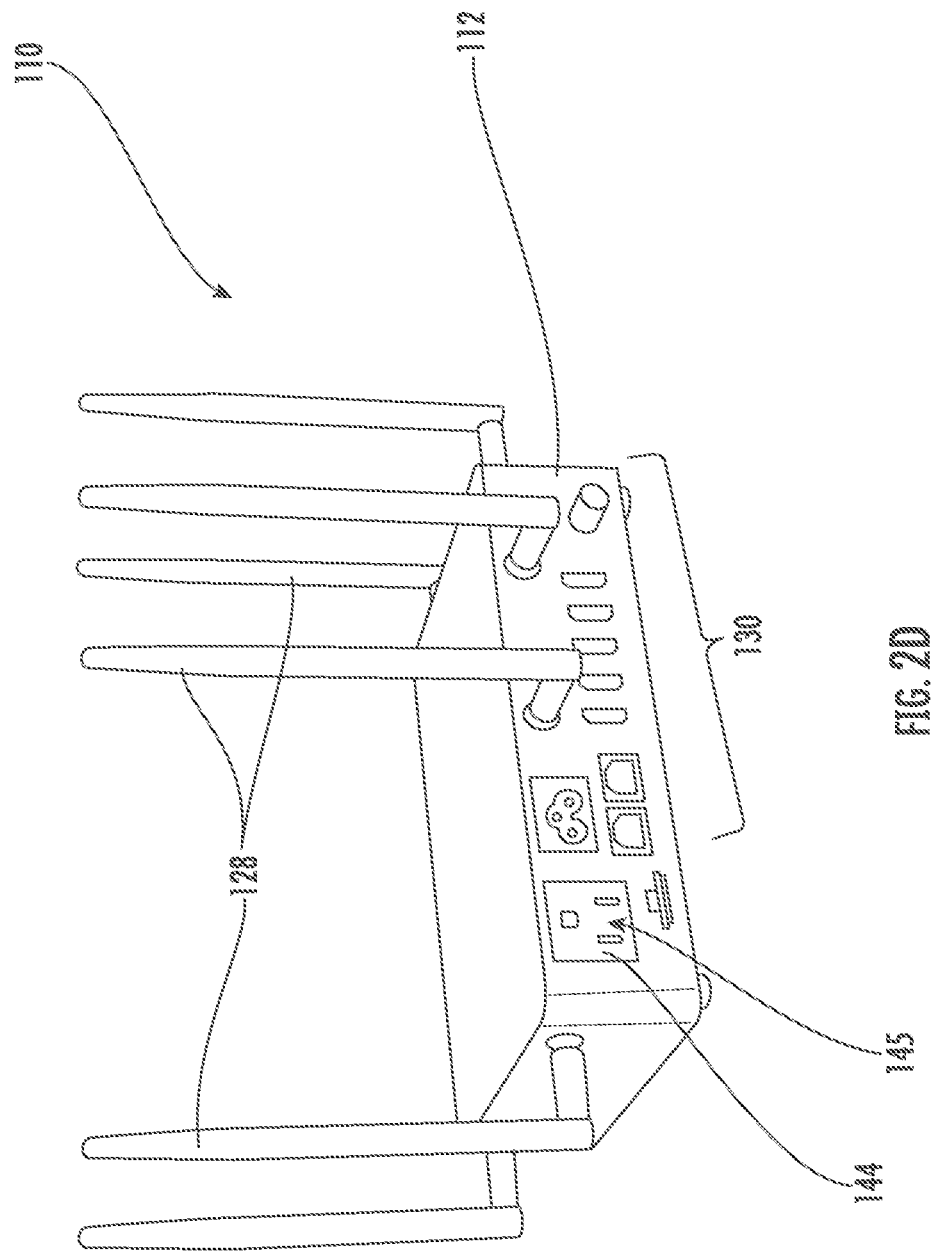
FIG. 2D shows a perspective view of an alternative embodiment of a housing for the gateway of FIG. 1.

The media gateway 110 is provided in a housing 112, cabinet or the like, and includes a number of ports and associated electronic components enclosed within the housing 112. As can be seen in FIG. 2C, the housing 112 is a simple cube-shaped box structure with a solid color provided on the base (e.g., a gray color), and a contrasting color provided on an upper portion of the housing above the base (e.g., a black color). The display 152 of the gateway 110 is visible on the upper portion of the housing. The simple design of the housing 112 is intended to be both rugged and aesthetically pleasing. However, FIG. 2C is only one of numerous possible embodiments for the housing 112. FIG. 2D shows an alternative embodiment of the housing that does not include the display 152, but includes a number of additional antennas 128 associated with the wireless transceiver 124.

With particular reference now to FIG. 2A, the electronic components of the media gateway 110 include processing circuitry/logic 114, a memory 116, a communications module 120, an infrared receiver 122, a wireless transceiver 124, a cellular transceiver 126, a number of input/output ports 130, a power module 150, a display 152, a microphone 154, and a speaker 156.

The processing circuitry/logic 114 is operative, configured and/or adapted to operate the content gateway 110 including the features, functionality, characteristics and/or the like as described herein. To this end, the processing circuitry/logic 114 is operably connected to the memory 116, and various other components including the communications module 120, the I/O ports 130, the power module 150, the display 152, the microphone 154, and the speaker 156. The processing circuitry 114 may be provided by one or more commercially available microprocessors, such as a quad core 1.8 GHz or faster processor, such as those sold by Intel Corporation or AMD, Inc. The processing circuitry 114 may be included on a single board/processor, or may be split amongst a number of different boards and processors within the gateway 110. For example, in at least some embodiments, the processing circuitry includes a CPU, a motherboard, and one or more additional processing modules, such as a video capture module 115 (see FIG. 2B).

The memory 116 may be of any type of device capable of storing information accessible by the processor, such as solid state memory, hard drives, memory cards, ROM, RAM, write-capable memories, read-only memories, discs, flash memory, or any of various other computer-readable medium serving as data storage devices as will be recognized by those of ordinary skill in the art. In the embodiment, shown in FIG. 2B, the memory includes 4 GB (or more) DDR3 RAM as well as 8 GB (or more) SSD storage.

The memory 116 is configured to store both instructions 160 for execution by the processing circuitry/logic 114, as well as data 170 for use by at least the processing circuitry/logic when running one or more of the programs/software engines included in the instructions 160. In the embodiment described herein, the instructions 160 include various software programs/engines, including OTT apps 161, a content capture engine 162, a client-side content identification engine 164, a panelist registration engine 166, a content overlay engine 168, as well as numerous other computer programs. It will be recognized that the instructions 160 also include various additional programs that are not discussed in detail herein. For example, the instructions 160 include a hardware interface application programming interface (API) that allows the gateway 110 to interact with various hardware components such as the communications module 120 and associated transceivers 122, 124, 126, I/O ports 130, power module 150, display 152, etc.

The OTT apps 161 include any of various apps available to or downloaded by the user for use via the gateway 110. The OTT apps may 161 include any of various applications for streaming OTT content, such as the Amazon Prime app, Hulu, Netflix, etc.

The content capture engine 162 is configured to select, copy and save certain screenshots, video snippets, and/or audio associated with the selected video source that is delivered to the television 200. The content captured may be from any of various media sources, including one of the sources connected to one of the I/O ports 130 (e.g., one of the HDMI-IN ports 132) as well as any additional sources such as content provided by one of the OTT apps 161 included in the memory 116 of the gateway 110. The content capture engine 162 captures/copies specific types of content (e.g., video frames) at certain times. The capture of content may occur periodically and/or be determined based on instructions from the content identification engine 164. In at least some embodiments, the content capture engine 162 interacts with the hardware interface API and captures content every time an infrared signal is received from the remote control 206. Content captured with the content capture engine 162 may be processed by the content identification engine 164 and/or transmitted to the remote server 310 for additional processing.

The client-side content identification engine 164 is configured to monitor, analyze and identify content presented on the television screen and other display devices using a multi-layered approach to content identification. As explained in further detail below, the multi-layered approach involves the application of different rules to content review and identification based on the source of the content. The content identification engine 164 advantageously uses machine learning to improve upon content identification over time. The content identification engine performs a first round of content recognition on the captured media by using machine learning models. If the client-side content identification engine 164 is able to detect the required information with enough accuracy, the detected information (e.g., channel and other metadata) are transmitted directly to the cloud and stored in a database of the remote server together with panelist registration information. On the other hand, if the content is not identified with an acceptable level of accuracy, the content is sent to the remote server 310 for further processing by more robust machine learning engines.

The panelist registration engine 166 operates in association with the content identification engine 164 to identify certain panelists for association with identified content. The panelist registration engine 166 works directly with the hardware interface API in order to detect the household member's presence using any of various means. For example, the panelist registration engine 166 may analyze the power of the Wi-Fi signal that arrives at the gateway 110 from wireless devices 220 (e.g., smartphones and other mobile devices) associated with each of the panelists. As another example, the panelist registration engine 166 may interact with a Bluetooth chipset 123 on the wireless transceiver 124 in order to detect the presence of Bluetooth wearables that are assigned to one or more of the panelists (typically child panelists). It will be recognized that the terms "register" and "registration" as used herein with respect to one or more panelists refers to the condition of a panelist being in proximity to the television or other display device such that the panelist is associated with identified content presented on the display device; the terms "register" and "registration" as used herein with respect to one or more panelists does not refer to such panelists being users of the system and/or simply having demographic information for the panelist saved in the system 100.

The content overlay engine 168 is configured to display certain content on the television in association with media presented thereon. For example, as described in further detail below, the content overlay engine 168 is configured to overlay avatars representing the currently registered panelists over the video content presented on the television 200. The content overlay engine 168 is also configured to provide various graphical user interfaces (GUIs) for use in association with gateway operation. In at least some embodiments, the content overlay engine 168 also includes the software that operates the video capture module 115 of the gateway 110. In this embodiment, the content overlay engine 168 determines the video signal output at the HDMI-OUT port 133 of the gateway. Accordingly, the content overlay engine 168 may be configured to determine the programming/media content presented on the television in addition to any overlays on the programming/media content.

With continued reference to FIG. 2A, the data 170 stored in the memory 116 includes panelist data 172, a viewing log 174, training data 176, and saved content. The panelist data 172 includes data related to all panelists 204 in the household 202. The panelist data 172 may include any of various types of demographic data such as age, sex, income level, etc. for each panelist within the household 202. In at least some embodiments, the panelist data 172 also includes personalized information collected about the panelist at the time of registration. For example, the panelist data 172 may include education level, type of smartphone owned, type of automobile owned, pet ownership, vacation preferences, sports preferences, food preferences, etc.

The viewing log 174, includes information about the content viewed by the individual panelists. For example, the viewing log 374 may include individual data indicating that a particular panelist was watching a particular program at a particular time. For example, the viewing log 174 may include data indicating two panelists 204 from the household 202 were watching "Game of Thrones" on HBO via a cable box at 10 pm on Jul. 9, 2020. The viewing log 174 may be saved to the memory 116 of the gateway 110 for some period of time, and then periodically transmitted to the remote server 310 (e.g., at the end of every day), and/or erased after some period of time (e.g., after one month).

The training data 176 includes data that is used by the machine learning features of the client-side content identification engine 164. The training data includes a number of exemplary video frames for different input sources, and the appropriate content identification for such video frames. The training data 176 is used to train the content identification engine 164 to appropriately identify content from a video frame. The training data 176 is periodically updated (e.g., daily, weekly, etc.) by uploading additional training data from the remote server 310. This updated training data allows the content identification engine 164 to experience incremental learning, thus allowing the content identification engine to more reliably identify content from any of various input sources.

The saved content 178 includes frames of captured video that are saved for future reference. While much of the content identification process occurs locally on the gateway 110, in certain situation frames that require further processing are temporarily stored in the saved content 178. These frames may then be transmitted to the remote server 310 for further processing. For example, when certain types of frames that require more in-depth processing (e.g., face identification) are identified, these frames are temporarily stored with the saved content 178, and then subsequently transferred to the remote server 310 for further processing. In some instances, transfer of the saved content occurs along with content data that was identified at the gateway 110 (e.g., text data associated with each frame).

In view of the foregoing, it will be recognized that the data 170 is used by the computer programs 162, 164, 166, 168 utilize the data 170 in order to provide the functionality of the cross-media content identification system 100 described herein. A computer program product implementing an embodiment disclosed herein, including any of the above-mentioned programs may comprise one or more computer-readable storage media storing computer instructions executable by a processor to provide an embodiment of a system or perform an embodiment of a method disclosed herein. Computer instructions (e.g., the client-side content identification engine 164) may be provided by lines of code in any of various languages as will be recognized by those of ordinary skill in the art. A "non-transitory computer-readable medium" may be any type of data or storage medium that may store computer instructions, including, but not limited to a memory card, ROM, RAM, write-capable memories, read-only memories, hard drives, discs, flash memory, or any of various other computer-readable medium.

With continued reference to FIG. 2A, the communication module 120 of the gateway 110 provides an interface that allows for various types of communication with any of various media devices. The communications module 120 is specifically configured for both wired and wireless communications with various media devices and other electronic devices. The communications module 120 is configured for wireless communications via the I/O ports 130, and is configured for wireless communications via various wireless interfaces, including an infrared receiver 122, a wireless transceiver 124, and a cellular transceiver 126.

The communications module 120 connects the gateway 110 to the household's internet service provided by an internet service provider (e.g., via cable or fiber delivered to a household modem). The connection to the internet may be by wired communication (e.g., over the Ethernet port 142) or wireless communication (e.g., over the wireless transceiver 124). For example, the wireless transceiver 124 connected to the communications module 120 specifically includes a Wi-Fi chipset 125, thus allowing the communications module 120 to communicate with an existing Wi-Fi network provided by an internet service provider. Connection of the communications module 120 to the internet allows the gateway 110 to serve as a router in a new wireless network within the household. Thus, the gateway 110 serves as a Wi-Fi access point for all wireless network devices 220 within the household, including both mobile devices (e.g., smartphones and tablets) and stationary devices (e.g., desktop computers and the television 200). Besides acting as a router/Wi-Fi access point, the Wi-Fi chipset 125 also allows the gateway 110 to sniff the traffic on each mobile device and detect mobile browsing history, searched keywords and target URLs. Additionally, the Wi-Fi chipset 125 detects the signal strength (e.g., RSSI) of each mobile device at the gateway, thus allowing the gateway 110 to detect proximity of a mobile device (and the associated user) to the gateway. Thus, it will be recognized that the Wi-Fi chipset 125 provides for triple functionality: (i) it can connect to a Wi-Fi network as a client (e.g., in order to transmit captured date to a central server or receive software updates); (ii) it can act as a Wi-Fi access point such that other Wi-Fi devices connect to it (e.g., in order to perform network sniffing functions to determine the kind of contents the user is consuming); and (iii) it can act as a Wi-Fi beacon in order to detect the proximity of a mobile device (e.g., in order to allow for passive user presence detection in the same room as the television).

In addition to the wireless transceiver 124 and associated Wi-Fi chipset 125, the communications module 120 further includes a cellular transceiver 126 (or other wide area network transceiver) and associated chipset. The cellular transceiver 126 may include a cellular modem that facilitates internet communications between the gateway 110 and any of various remote computers via the cellular telephony network (e.g., 3G/4G/5G/LTE networks within the American frequency specification). In this manner, the gateway 110 is equipped with redundant functionality that allows for internet communications via any one of various available network connections, including: (i) an Ethernet connection, (ii) a Wi-Fi connection, or (iii) the cellular telephony network connection.

In addition to the internet connection capabilities, including Wi-Fi and cellular capabilities as discussed above, the communications module 120 also includes further wireless communications capabilities. For example, the infrared receiver 122 allows the communications module 120 to receive infrared signals from a remote control or other infrared-equipped device. Additionally, the wireless transceiver 124 may also provide other communications capabilities using any of various known hardware, software and related communications protocols. For example, the wireless transceiver 124 is also configured to provide short-range wireless communications (e.g., via the low emissions Bluetooth chipset 123) with any of various short-range communications devices. The short-range wireless communications provides additional functionality for the gateway 110, such as additional remote control functionality, or panelist registration functionality as will be explained in further detail below.

The I/O ports 130 include a number of ports that are accessible through the housing 112 of the gateway 110. As best shown in FIG. 2B, the I/O ports 130 include a plurality of HDMI-IN ports 132 (e.g., 4-8 ports), an HDMI-OUT port 133, a plurality of USB ports 134 (e.g., 2-4 ports), at least one CVBS-IN port 136, a CVBS-OUT port 137, and a digital antenna in port 138. The HDMI-IN ports 132 are configured to connect any of a plurality of different wired media sources 210 to the gateway 110 using an HDMI cable having an HDMI connector. Typical media sources that may be connected to the gateway 110 via the HDMI-IN ports 132 include cable boxes, Blu-ray and DVD players, OTT streaming devices (e.g., Apple TV, Roku, Amazon Firestick, etc.), video game consoles (e.g., Sony PlayStation, Microsoft X-Box, Nintendo Switch, etc.), video cameras, and any number of other media devices.

Similar to the HDMI ports, the USB ports 134 are configured to connect any of a plurality of different wired media sources 210 to the gateway 110 using a USB cable with a USB connector. Typical media sources that may be connected to the gateway 110 via the USB ports 134 include video cameras and computer devices such as tablets, laptops, and desktop computers. The USB ports 134 are particularly equipped to allow system administrator to perform activities such as operating system updates, media files transfer, extend storage capacity, add external dongles of any kind to expand the hardware capacity, and connect peripheral accessories such as biometric readers, webcams or other sensors.

The at least one CVBS port 136 is available in the event that a wired media source 210 does not include an HDMI port (e.g., an older media device, such as a VCR), in the event that composite video cables are available but an additional HDMI cable is not available to the user during set-up of the gateway 110, or in the event that all of the HDMI ports 132 are in use. The digital antenna in port 138 is generally a coax connection port that receives input from an HDTV antenna. The digital antenna in port is connected to a digital ATSC TV tuner 139 that allows the user to receive OTA content from any of a number of local TV providers.

Each of the video input ports, including the HDMI-IN ports 132, USB ports 134, CVBS-IN port 136, and TV tuner 139 are connected to the video capture module 115. The video capture module 115 is configured to receive video signal inputs from the various ports 132, 134, 136, 139, and act as a switch to select one of the inputs to be output to the television via the HDMI-OUT port 133 (or alternatively, the CVBS-OUT port 137). Selection of the appropriate video signal for output via the HDMI-OUT port 133 is typically determined by user/panelist selection of one of the input ports via the remote control or other means, thus indicating the user's preferred viewing source. The video signal from the selected input port is then output to the television for presentation to the user. Accordingly, a single HDMI input is received at the television 200 from the gateway 110, and there is no need for the user to switch video inputs at the television. Instead, selection of video inputs occurs at the gateway 110. Furthermore, because the video signal to the television is directed through the gateway 110, the content overlay engine 168 is configured to overlay additional content, such as legends, alerts and registered persons, on the television screen via the HDMI-OUT port 133 to the television 200.

In addition to the video input ports, the I/O ports also include several additional ports including an SD card expansion slot 140, an Ethernet port 142, and an AC output port 144. The SD card expansion slot 140 allows the user to insert an SD card so that content thereon can be read by the gateway 110. For example, the SD card expansion slot 140 may be used as an expansion slot for additional storage capabilities when connectivity problems exist with the gateway 110 (e.g. due to faulty Wi-Fi at the household or problems with the cellular network). Alternatively, the SD card expansion slot 140 may be used to provide updates or other information for use by the processing circuitry 114. The Ethernet port 142 (e.g., an RJ45 10/100 MBPS Ethernet port) is configured to connect to the household modem provided by an internet service provider (ISP). The Ethernet port 142 is typically used when the internet modem provided by the ISP is in close proximity to the gateway 110. If this modem is not in close proximity to the gateway 110 (or otherwise not available for wired connection), the gateway utilizes the wireless transceiver 124 or the cellular antenna 126 to connect to the household router provided by the ISP. The AC output port 144 is connected to the power module 150. As explained in further detail below, the AC output port 144 is configured to receive the power cord from the television 200 and provide AC power to the television.

The power module 150 is adapted to provide power to both the gateway 110 as well as the television. To this end, the power module 150 includes an internal power supply that is configured to plug in to an AC power outlet within the household 202. The power module 150 is also connected to an internal battery 148. The power module charges the internal battery 148, and in turn, receives power from the internal battery 148 in the event power from the household AC power outlet is not delivered to the power module 150. As shown in FIG. 2B, the internal power supply is connected to the AC output port 144 and provides power to the AC output port. In order to facilitate delivery of AC power, the AC output port 144 includes an AC receptacle 145 that other electronic devices may be plugged into. When the television 200 is plugged into the receptacle 145 of the AC output port 144, the television receives power via the gateway 110.

The power module 150 also includes a TV ON/OFF detection circuit 151. The TV ON/OFF detection circuit 151 is configured to determine whether the TV connected to the gateway 110 is on or off in one of two different ways. First, if the TV is plugged into the AC power port 144, the circuit 151 detects the amount of power flowing to the television (e.g., via an AC loop sensor or other current sensor or via a shunt resistor or other voltage sensor). When the amount of power provided to the television 200 is less than a threshold amount (i.e., indicating that the screen is not illuminated), the television is determined to be powered off. When the amount of power provided to the television is greater than a threshold amount (i.e., indicating that the screen is illuminated), the television is determined to be powered on. Second, if an HDMI cable connects the gateway 110 to the television, the HDMI CEC (consumer electronics control) feature may be used to detect whether the television 200 is powered on or off. As explained in further detail below, determining whether the television 200 is powered on or off may be used to (i) establish the measurement on/off times based on the times the user is actually watching television, (ii) optimize resource usage by processing and transmitting information only when the user is watching television, and (iii) detect user presence only during television viewing times. Also, because the gateway can detect the ON/OFF television state, the power module 150 is further configured to automatically turn on (full power) when the television 200 is turned on, and automatically turn off (reduced power) when the television is turned off.

With continued reference to FIGS. 2A-2C, the gateway 110 further includes additional electronic components such as a display 152, a microphone 154, and a speaker 156. The display 152 may be a conventional LCD display (e.g., a 16×10 cm LCD display), as shown in FIG. 2C. The display 152 provides simple information for the user such as the current time, date, selected media source (e.g., HDMI 2), and registered panelists (e.g., 1, 3, 4). The display 152 may also be used by a technician to provide information during diagnostic testing and repair of the gateway 110. However, the display 152 is not equipped to present video content from any of the sources connected to the ports 130. In other words, the gateway itself is not capable of acting as a television for user viewing of video signals delivered thereto.

The microphone 154 may be any of various commercially available microphones that are commonly used with electronic devices. The microphone 154 allows the user to provide verbal instructions in lieu of instructions from a remote control or other source (e.g., "Alexa, tune to Netflix," or "Hey Google, what channel is playing the football game"). The speaker 156 is capable of providing audible cues, alerts, reminders, or audio instructions for the user. For example, the speaker 156 may sound an error tone, or may be used to respond to a verbal command from the user (e.g., "The football game is on NBC, channel 12"). In at least one embodiment, the microphone 154 is used to provide additional content identification capabilities, such as audio ACR.

Remote Server

With reference again to FIG. 1, the remote server 310 is positioned at a location that is removed from the household 202 where the gateway 110 resides. The remote server 310 is configured to communicate with the gateway 110 via the internet 290. Accordingly, both data and instructions may be communicated and shared between the gateway 110 and the remote server 310 via the internet 290. While only a single remote server 310 is shown in FIG. 1, it will be recognized that this single server 310 is representative of any number of remote/cloud servers that may be in communication with the gateway via the internet 290 or other wide area network.

Figure 3:
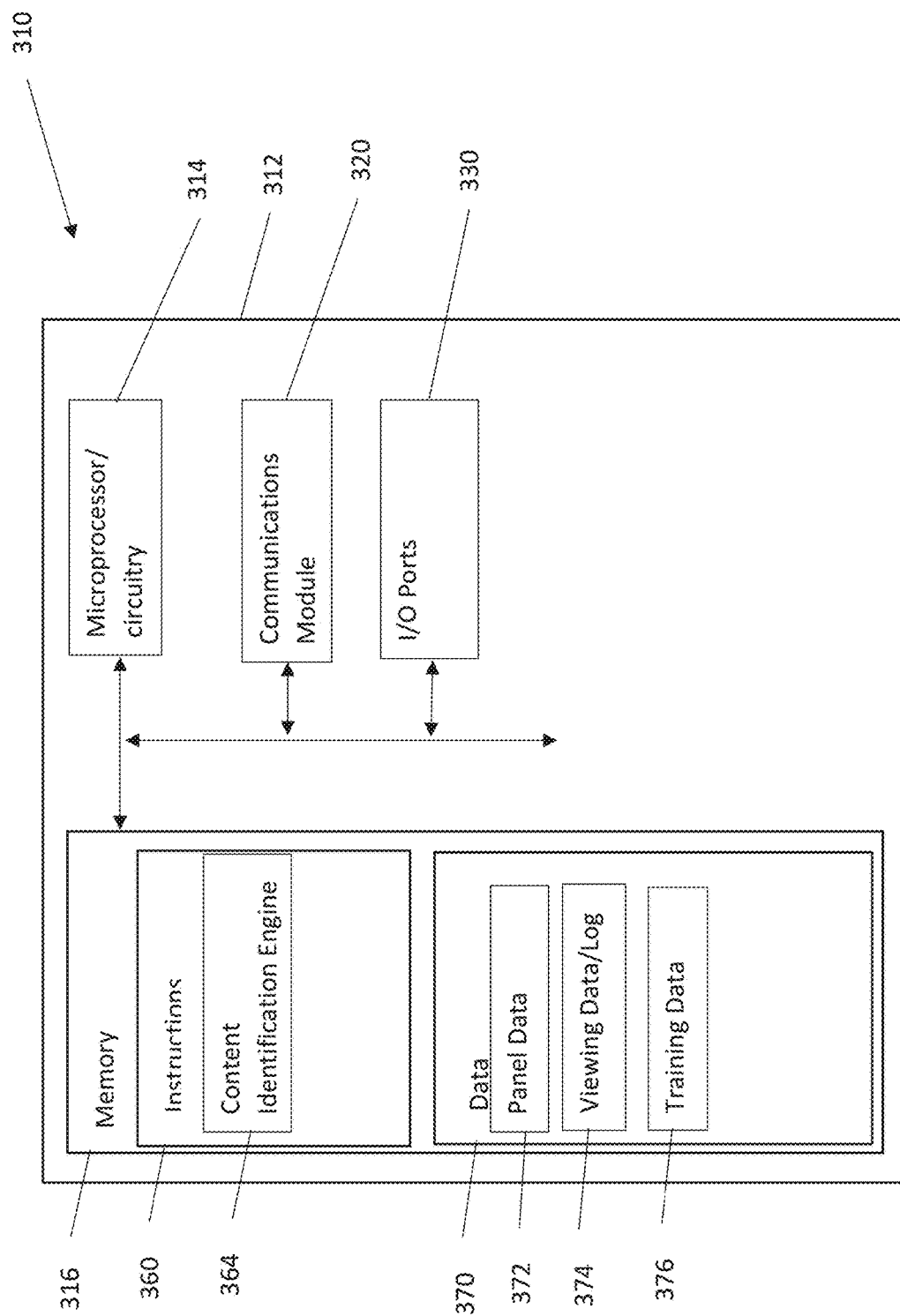
FIG. 3 shows a block diagram of the remote server of FIG. 1.

As shown in FIG. 3, the remote server 310 is provided in a housing 312, cabinet or the like, and includes a number of electronic components enclosed therein. In particular, the remote server 310 includes processing circuitry/logic 314, a memory 316, a communications module 320, and a number of input/output ports 330. The communication module 320 of the remote server 310 provides an interface for communication with other devices, and particularly the gateway 110, via the internet. As noted previously, the gateway 110 is connected to the internet using any of various means for establishing internet communications. The remote server 310 may be similarly configured, including configured for wired or wireless connection to the internet. To this end, the I/O ports 330 of the remote server provide the necessary ports, antennas, or other communications hardware required to establish the internet connection.

The processing circuitry/logic 314 of the remote server 310 is operably connected to the memory 316, and various other components including the communications module 320 and the I/O ports 330. Similar to the processing circuitry 114 of the gateway 110, the processing circuitry 314 of the server 310 may be provided by one or more commercially available microprocessors, such as a quad core 1.8 GHz or faster processor, such as those sold by Intel Corporation or AMD, Inc. The memory 316 may also be of any type of device capable of storing information accessible by the processor, such as solid state memory, hard drives, memory cards, ROM, RAM, write-capable memories, read-only memories, discs, flash memory, or any of various other computer-readable medium serving as data storage devices as will be recognized by those of ordinary skill in the art. The memory 316 is configured to store both instructions 360 for execution by the processing circuitry/logic 314, as well as data 370 for use by at least the processing circuitry/logic when running one or more of the programs/software engines included in the instructions 360.

In the embodiment described herein, the instructions 360 include various software programs/engines, including a network-side content identification engine 364. The network-side content identification engine 364 is similar to the client-side identification engine 160, and is configured to identify content presented on a television. However, the network-side content identification engine 364 includes additional functionality and processing capabilities, such as increased machine learning functionality beyond that capable with the client-side content identification engine 160.

The data stored in the memory 316 includes panel-wide data 372, a viewing log 374, and training data 376. The panel-wide data 372 includes data related to all panelists in the system 100, including the panelists 204 associated with the household 202, as well as numerous additional panelists associated with additional households. The panel-wide data 372 may include any of various types of demographic data such as age, sex, income level, etc. for each panelist. The viewing log 374, includes information about the content viewed by panelists, both individually and collectively. For example, the viewing log 374 may include individual data indicating that a particular panelist was watching a particular program at a particular time (e.g., panelist 1 from the household 202 was watching "Game of Thrones" on HBO at 10 pm on Jul. 9, 2020). Additionally, the viewing log 374 may include collective data that indicates that groups of panelists were watching a particular program at a particular time (e.g., 5% of all panelists, or 10% of all males between the ages of forty and fifty were watching "Game of Thrones" on HBO at 10 pm on Jul. 9, 2020). The training data 376 includes data that is used by the machine learning features of the network-side content identification engine 360, as explained in further detail herein.

General Gateway Operation

Figure 4:
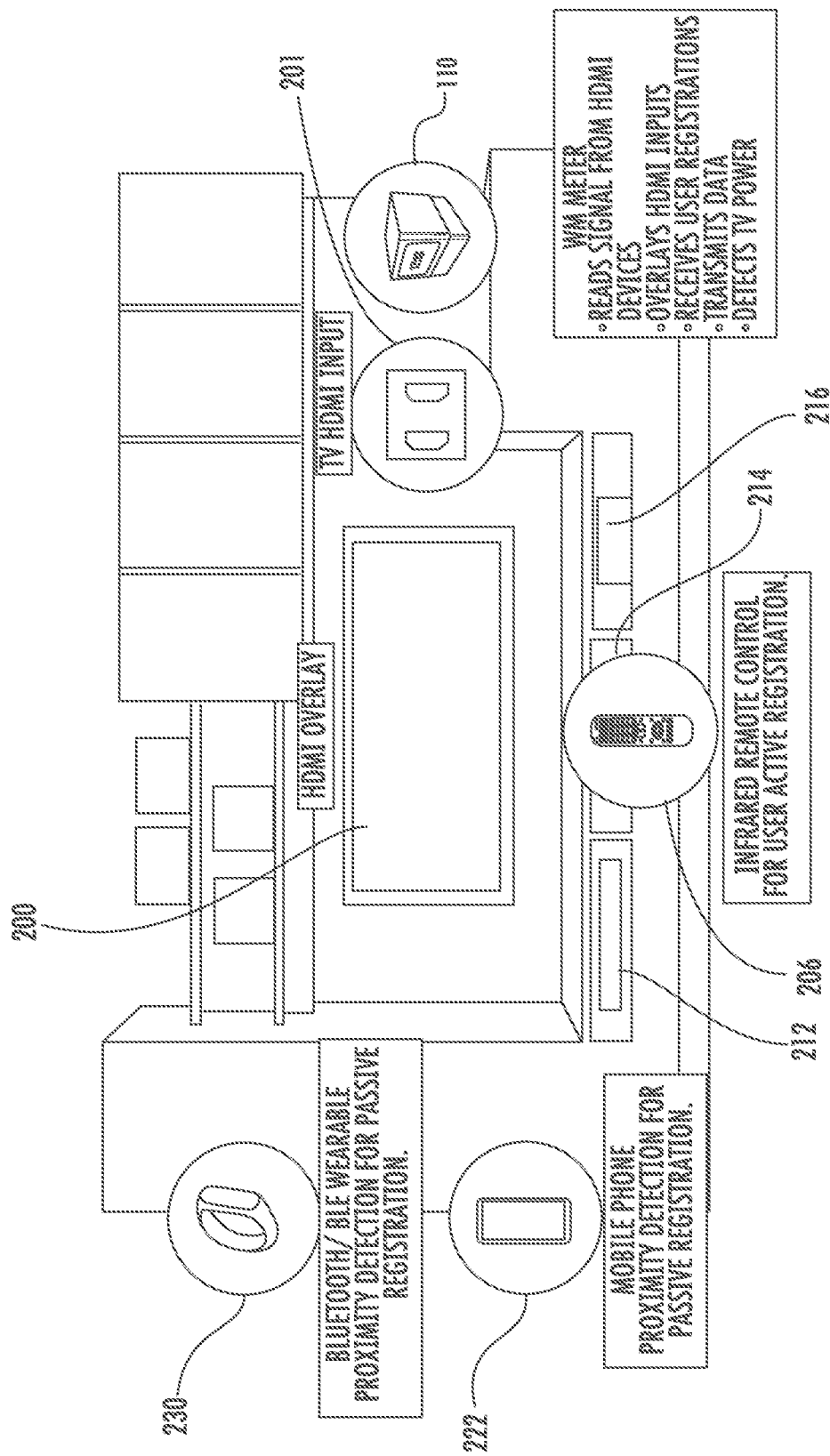
FIG. 4 shows inclusion of the gateway of FIG. 1 in an entertainment center of a household along with various other media components.

General operation of the gateway 110 is now be described with reference to FIGS. 4-7. FIG. 4 shows the gateway 110 positioned in a living area of an exemplary household 202. The gateway 110 is positioned in close proximity (e.g., within 5-10 feet) of the television 200. The HDMI-OUT port 133 of the gateway 110 is connected to one of the HDMI-IN ports 201 of the television 200. A plurality of wired media sources 210, including a cable box 212, Blu-ray/DVD player 214, and a gaming console 216 are connected to the gateway 110 using cables connected to the HDMI-IN ports 132 of the gateway 110. Wireless devices 220, including a smartphone 222 and a wearable device 230 (e.g., a smart bracelet), are also connected to the gateway 110 via the wireless transceiver of the gateway 110. A remote control 206 is also configured to communicate with the gateway 110.

The gateway 110 is configured to identify content presented on the television 200 and associate one or more panelists 204 with the identified content. Additionally, the gateway 110 is configured to communicate with the smartphone 222 over a Wi-Fi connection in order to monitor media content presented on the smartphone 222. The gateway 110 is also configured to register panelists 204 and associate registered panelists with identified media content on the television 200. Registration of panelists is accomplished in one of several ways. First, passive registration of panelists may occur using the wireless connection with the smartphone 222 (or other mobile electronic device) to detect user presence in proximity to the gateway 110. Second, passive registration of panelists may occur using the wireless connection, e.g., a Bluetooth connection, with the wearable device 230 in order to detect user presence in proximity to the gateway. Third, active registration of panelists may occur using the remote control 206. To this end, the remote control 206 includes a plurality of dedicated registration buttons for active registration of the panelists to the gateway. Each of the dedicated registration buttons is associated with one of the panelists in the household 202, such that the panelist only needs to press a button in order to actively register their presence in proximity to the television 200. Further detail concerning registration of panelists is provided in further detail below in association with the "Active and Passive Panelist Registration" subheading (and related FIGS. 11-17).

Figure 5A:
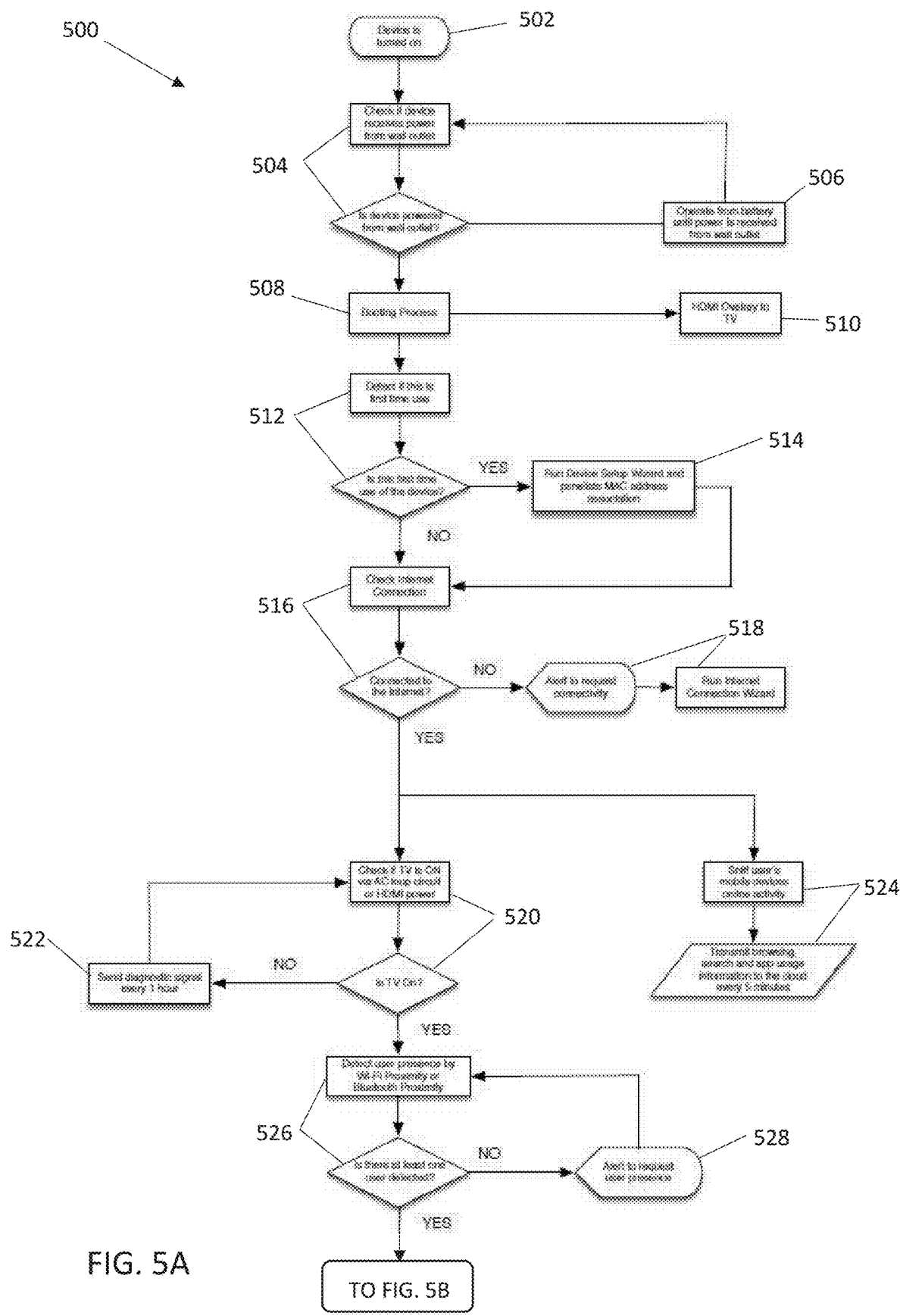
FIG. 5A shows a first flowchart of general operation of the gateway of FIG. 1.
Figure 5B:
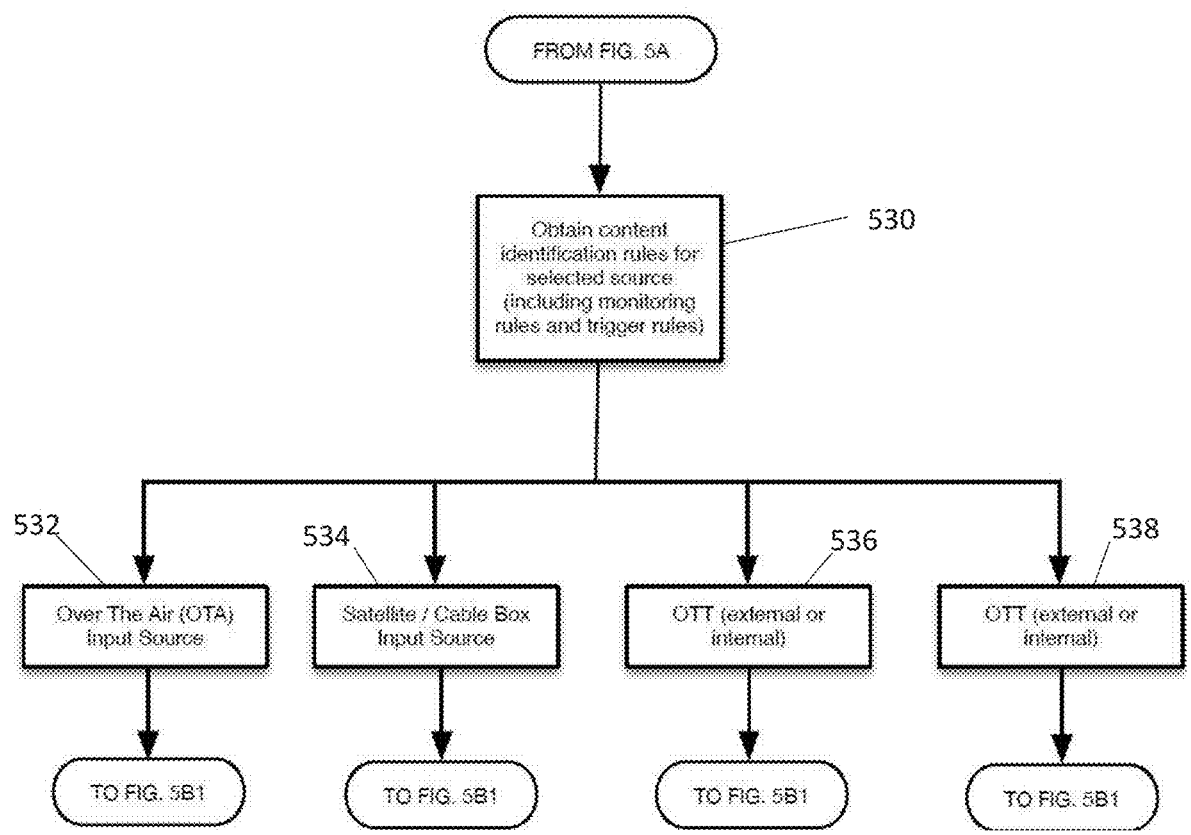
FIG. 5B shows a second flowchart of general operation of the gateway of FIG. 1.

With reference now to FIGS. 5A-5B4, a method 500 of cross-media content measurement is disclosed. The method 500 begins at block 502 when the gateway 110 is turned on (the terms "block" and "step" are used interchangeably herein). At block 504, a check is made that the gateway 110 is receiving power from an AC wall outlet. If the gateway is not receiving power from an AC wall outlet, the device is instructed at block 506 to operate from the battery until power is received from the AC wall outlet. At block 508, the process continues and the gateway goes through the booting process. Once the booting process is complete, the processor is instructed to overlay information about the gateway 110 on the television screen via the HDMI output. At block 512, the gateway detects whether this is the first-time use of the device within a household. If it is a first time use, at block 514 the setup wizard is run, demographic data for each panelist in the household is entered, registration buttons from the remote control are associated to each of the panelists, the MAC address of various wireless devices (e.g., smartphones and watches) are associated to the panelists, and wearable devices are associated with panelists (e.g., wearable bracelets for children). Then, at block 516 the gateway checks for an internet connection. If no internet connection is detected, the method continues to block 518 and an alert to request connectivity is issued, and the internet connection wizard is run.

Once an internet connection is established at the gateway 110, the method continues to block 520, and the gateway detects whether power to the television is on (e.g., via a current sensor or a CEC signal from the HDMI connection to the television). If power to the television is not on, no panelist presence or content identification is performed, and at block 522, the gateway 110 periodically sends a diagnostic signal (e.g., every hour) to be sure that the television remains operational. If the television is powered on, the method continues to block 526, and user registration (i.e., user presence in the vicinity of the television) is detected. As noted previously, the gateway 110 is capable of detecting user registration by any one of several means, including active user registration by a pressed button on the remote control 206, passive registration based on signal strength from a user mobile device (e.g., smartphone 222), or passive registration based on a wireless connection to a user wearable device (e.g., bracelet). If no panelists are detected, the method continues to block 528 and an alert is shown on the television instructing any panelists in the room to register (e.g., via the remote control). After one or more panelists are registered by the gateway 110, the method moves on and performs the acts associated with the additional blocks shown in FIG. 5B.

With reference now to FIG. 5B, after one or more panelists are registered with the gateway 110, the method continues at block 530 by determining which input source is selected for presentation on the television (e.g., HDMI 1-3 or OTA), and then obtaining content identification rules for the selected source. Again, the selected input source is the source that video capture module 115 has selected for delivery of the associated video signal to the television. This source may be selected by the user via the remote control, or may simply be the last selected source from a previous television viewing session. As will be explained in further detail below, the selected content identification rules may depend on the specific media input (e.g., cable box, OTA, OTT) as well as the specific device or content provider associated with such box (e.g., Spectrum cable box, Amazon Firestick, Roku, etc.). Depending on the selected input source, the method then implements the associated rules. As shown in FIG. 5B, the method continues at block 532 (and FIG. 5B1) when the selected input source is OTA television. The method continues at block 534 (and FIG. 5B2) when the selected input source is a satellite/cable box. The method continues at block 536 (and FIG. 5B3) when the selected input source is an OTT source (either connected to an input of the gateway 110 or on an app within the gateway). The method continues at block 538 (and FIG. 5B4) when the selected input source is a disc player or game console. While four exemplary methods associated with content identification rules are illustrated in FIGS. 5B1-5B4, it will be recognized that these are merely exemplary methods and numerous additional methods are contemplated for any of various input sources. Accordingly, the particular steps associated with each method, and any associated details (e.g., threshold amounts, times for processing, etc.) are merely illustrative and will change with different sets of content identification rules.

With reference now to FIG. 5B1, an exemplary method 540 associated with content identification rules for an OTA television signal is shown. The method 540 includes two different analysis routines 541 and 551 that are processed in parallel. The first routine 541 is a signal analysis routine. This routine 541 begins at step 542 where the tuned signal (from the digital ATSC TV tuner 139) is analyzed. Video signals transferred under the ATSC standard include metadata that identifies the tuned channel. Accordingly, analysis of the tuned signal with OTA content includes extracting the metadata from the signal in order to identify the content presented on the television screen. At block 543, a determination is made if a threshold period of time (e.g., 5 seconds) has elapsed since the last analysis of the tuned channel. If the period of time has elapsed the method 540 returns to block 542 and the tuned signal is analyzed again. If the threshold period of time has not elapsed, the method 540 proceeds to step 544 where a determination is made whether it is time to transmit the identified content data. If it is not yet time to transmit the data (e.g., once every two seconds) to the remote server 310, the method moves to block 546. However, if it is time to transmit the data, the routine 541 continues, and the identified content data is transmitted at block 545. Then, at block 546, a determination is made whether a change in the selected media source occurred. If a change did not occur, the method returns to block 543 and again analyzes the tuned signal. If a change in the selected media source did occur, the method moves to step 547, where the method returns to step 530 of FIG. 5B and the selected input source for presentation on the television is detected.

With continued reference to FIG. 5B1, in parallel with processing the metadata analysis routine 541, the method 540 associated with the OTA content identification rules also includes a video frame analysis routine 551. The video frame analysis routine 551 begins at block 548 where the processor waits for the next video frame from the OTA video signal. At block 552 a determination is made whether the next frame has been received. If the next frame has not been received, the method moves to step 546 and determines whether there was a change in the selected media source. On the other hand, if the next video frame has been received, the method continues to step 553, and the video frame is captured. Then, at block 554, a machine-learned frame analysis (e.g., logo analysis, face recognition, etc.) is performed on the video frame. At block 555, a determination is made whether the frame indicates a scene change (as explained in further detail below). If there is not scene change at block 555, the method continues to step 556, and a determination is made whether the frame has useful information (i.e., identified additional content data). If additional content data is identified, it is then transferred at block 557. If no useful content data is identified, the method returns to block 548, and waits for a new video frame. On the other hand, if a scene change is detected at block 555, the method continues to block 558 where a scene change timestamp is recorded and/or transmitted. This scene change timestamp is utilized to determine the length of an advertisement. At block 559, the method continues by waiting for a new non-blank screen. The new non-blank screen indicates the beginning of a new content piece (e.g., the start of a commercial, or return to regular programming). When a new non-blank screen is received, the method then returns to block 553 and captures the video frame.

With reference now to FIG. 5B2, an exemplary method 560 associated with content identification rules for a video signal from a satellite/cable box is shown. The method begins at step 561 where the processor waits for the next frame in the video signal. At step 562, a determination is made whether the next frame is received. It will be recognized that the next frame may be an immediately next frame, or could also be a next frame of some predefined number of frames (e.g., one in ten). If the next frame has not been received, the method continues to block 572, and a determination is made whether there was a change in the selected media source. On the other hand, if the next frame has been received, the method continues to block 563, and the next frame is analyzed to detect whether a content grid (e.g., banner, guide, mosaic, etc.) or network logo is present within the frame. As explained in further detail below, the algorithms for determining the presence of a content grid or network logo may be considered to be "trigger events." At block 564 the method determines whether the analyzed video frame includes a trigger event in the form of a content grid or network logo. If a content grid or network logo is present, the method continues at step 565, and a machine-learned content grid analysis is performed and/or machine-learned network logo analysis is performed. The content identification data generated by such analysis is then packaged in a data package and transmitted to the remote server 310. The method then returns to block 561 where the method waits for the next video frame.

With continued reference to FIG. 5B2, if no content grid or network logo is detected at step 564, the method continues to step 567, and a determination is made whether the analyzed video frame includes another trigger event in the form of a scene change. If a scene change is detected, the method continues to step 568, and a timestamp of the scene change is generated and stored internally and/or transmitted to the remote server. Thereafter, at step 569, the method waits for a new non-blank video frame. When a new non-blank video frame is received, this indicates the beginning of a new content piece (e.g., the start of a commercial, or return to regular programming). The method then returns to block 563 and reviews the new frame.

If no content grid or network logo is detected at step 564, and if no scene change is detected at step 567, the method 560 continues to step 570. At step 570, the method determines whether yet another trigger event has occurred in the form of a predetermined passage of time (e.g., ten seconds) since the last video frame analysis. If the predetermined period has passed and it is time to review another video frame, the method 560 continues to step 571 and a machine-learned algorithm (which may also be referred to herein as a machine-learning module) performs an analysis on the frame. This machine-learned algorithm may be any of a number of machine-learned algorithms configured to detect content from a video frame, such as logo analysis, object detection, face recognition, etc. Following this analysis, the method continues on to step 566, and any identified content is collected into a data package and transmitted to the remote server 310.

If a determination is made at step 570 that it is not time to analyze another frame, the process 560 continues to block 572, where the gateway 110 determines whether there has been a change in the selected media source. If there has been no change in the selected media source, the method 560 returns to step 561 and waits for the next video frame. On the other hand, if there has been a change in the selected media source, the method 560 proceeds to step 573, where it is instructed to return to step 530 of FIG. 5B.

With reference now to FIG. 5B3, an exemplary method associated with content identification rules for a video signal from an OTT provider is shown. The method begins at step 581 where the processor waits for the next frame in the video signal. At step 582, a determination is made whether the next frame was received. If the next frame has not been received, the method continues to block 590, and a determination is made whether there was a change in the selected media source. On the other hand, if the next frame has been received, the method continues to block 583, and a machine-learned algorithm analyzes the frame to determine if one of a number of different objects or indicia can be found within the frame. At step 584, the processor determines whether the frame includes a content mosaic. If the frame does include a mosaic, the process 580 continues to block 585 and a machine-learned mosaic analysis and content browsing path are determined (as described in further detail below under the "Content Grid Detection" subheading). Then, at step 586, the data generated by the mosaic analysis and content browsing algorithm is transmitted to the remote server.

If no mosaic is identified at step 584, the process 580 of FIG. 5B3 continues at step 587, and a determination is made whether any additional content information was identified in step 583. If some useful content information (e.g., logos, objects, faces, etc.), the method continues to step 588, and that data is transmitted to the remote server. If no useful content information was identified at step 587, the method continues to step 589, and a determination is made whether a predetermined period of time has passed since the last video frame capture and/or analysis. If the predetermined period of time has passed, the method returns to block 583, and the machine-learned frame analysis is performed on the next frame. On the other hand, if the predetermined period of time has not passed, the method continues to step 590, and a determination is made whether there has been change in the selected media source. If there has been no change in the selected media source, the method 580 returns to step 581 and waits for the next video frame. On the other hand, if there has been a change in the selected media source, the method 580 proceeds to step 591, and the method then returns to step 530 of FIG. 5B.

With reference now to FIG. 5B4, an exemplary method associated with content identification rules for a video signal from a disc player or video game console is shown.

FIGS. 5A-5B4 illustrate a simplified exemplary operation of the system 100. It will be appreciated that numerous additional steps have been excluded for the sake of simplicity. For example, in addition to continually monitoring the media input source, the system also continually monitors whether user registration has changed. Again, this is accomplished by monitoring input from the active registration buttons on the remote control 206, as well as the passive registration techniques associated with the mobile devices associated with each panelist (e.g., smartphones, watches, bracelets, etc.). As explained in further detail below, when user registration information has changed, the information is overlaid on the content currently presented on the screen of the television 200.

Although not shown as a particular step in the methodology of FIGS. 5A and 5B, it will be recognized that router capabilities of the gateway 110 allow it to also serve as a Wi-Fi sniffer that detects content consumed on other Wi-Fi-equipped devices (e.g., smartphones, tablets, desktop computers, etc.). In particular, simultaneously with monitoring the content presented on the television 200, the gateway 110 is also configured to monitor Wi-Fi traffic at any of various devices connected to the gateway's Wi-Fi network. The content sniffed by the gateway 110 is tied to the panelist associated with the Wi-Fi-equipped device that presented the content. In this manner, all media content consumed at a household 202 is collected by the gateway 110 and associated with individual panelists within the household. Methods associated with detecting content presented at Wi-Fi enabled devices is described in further detail below with reference to FIGS. 18-20 under the heading "Internet Activity Measurement."

By implementing the method of FIGS. 5A and 5B, the system 100 is equipped to improve upon conventional media content measurement devices. The system 100 implements unique hardware and software components and functionality in order to collect the appropriate data that is capable of providing an understanding of essentially all of the media content being consumed within a household and the specific panelists consuming such content.

Figure 6:
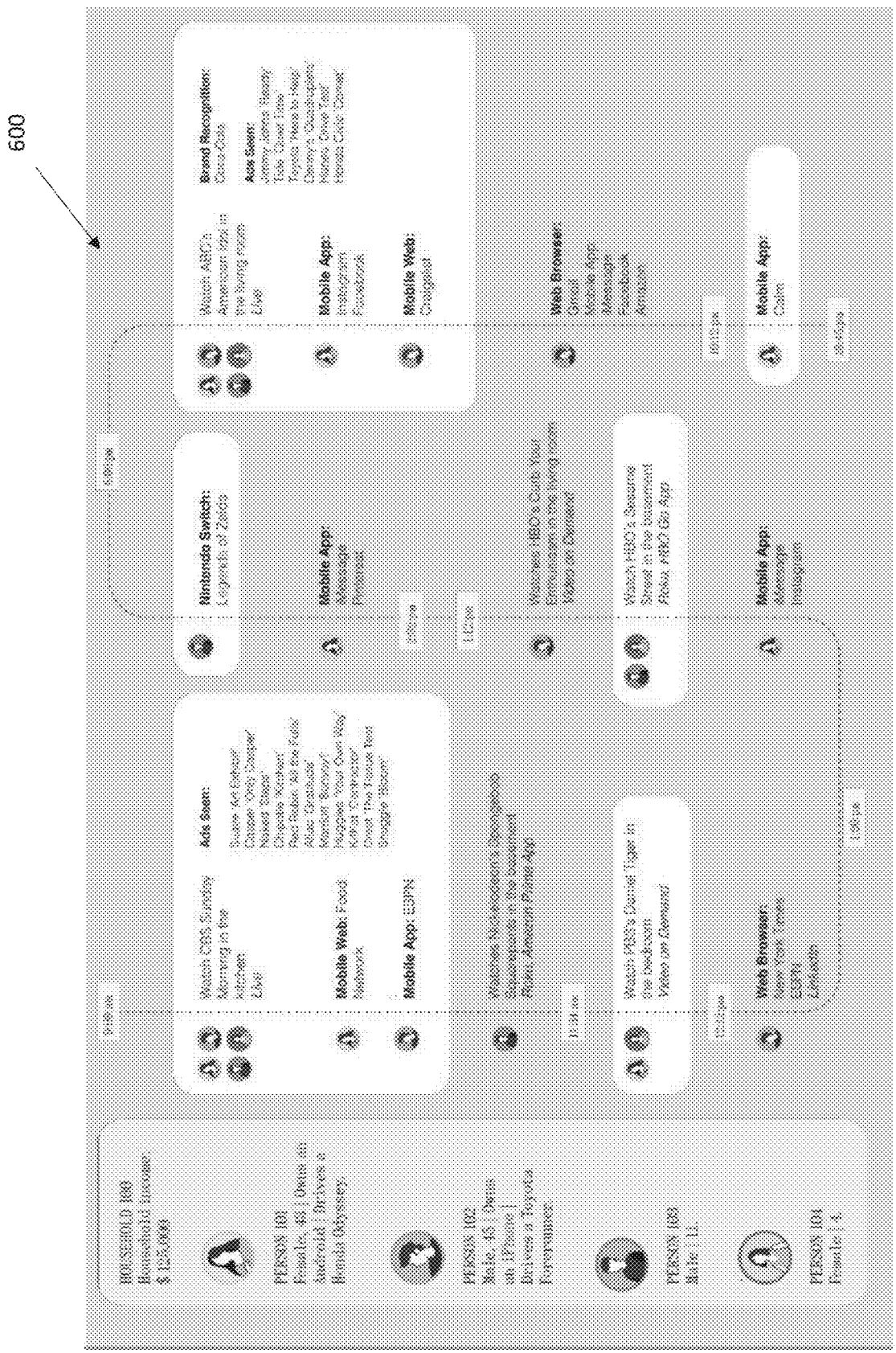
FIG. 6 shows an illustration of content identified via the gateway of FIG. 1 from a household of exemplary panelists.

FIG. 6 is an illustration showing a data series 600 collected from an exemplary household/family of panelists within a single day. The household includes the following panelists; (i) a 43 year old adult female, (ii) a 45 year old adult male, (iii) an 11 year old boy, and (iv) a 4 year old girl. As shown in the illustration, at some time between 9:00 am and 11:00 am, all of the panelists are present in the kitchen and the gateway identifies the program "CBS Sunday Morning" as presented on the kitchen television. The program airs for some period of time (e.g., from 9:15 to 11:00 am) and all panelists are identified with the show during this period of time. During this time a number of ads are also identified as been presented to the panelists. These ads include the Suave "Art Exhibit" ad, the Casper "Only Casper" ad, the Naked "Steps" ad, the Chipotle "Kitchen" ad, as well as a number of additional ads as shown in FIG. 6. Also during this time, the gateway 110 identifies that content from the "Food Network" app was presented to the adult female on her device. The gateway also identifies that content from the "ESPN" app was presented to the adult male. The television is turned off around 11:00 am, at which time the 11 year old boy goes to the basement where he watches a "Spongebob Squarepants" episode in the basement using Roku via the Amazon Prime app. At some point after 11:30 am, the adult female and the 4 year old girl go to the bedroom and watch the PBS show "Daniel Tiger" via video on demand. The collection of data concerning consumed media content then continues throughout the day, until all devices are turned off by 10:45 pm. Advantageously, the data collected includes data describing the display device, where the device is located (i.e., if a non-mobile device such as a television), the platform and/or apps used to watch the media content (e.g., cable TV, Amazon Prime, etc.), the specific content watched (e.g., ads, programming, gaming, etc.), the specific the panelists watching the content, and the time the content was watched. The collected data for the household is periodically transmitted to the remote server 310 throughout the day.

Figure 7:
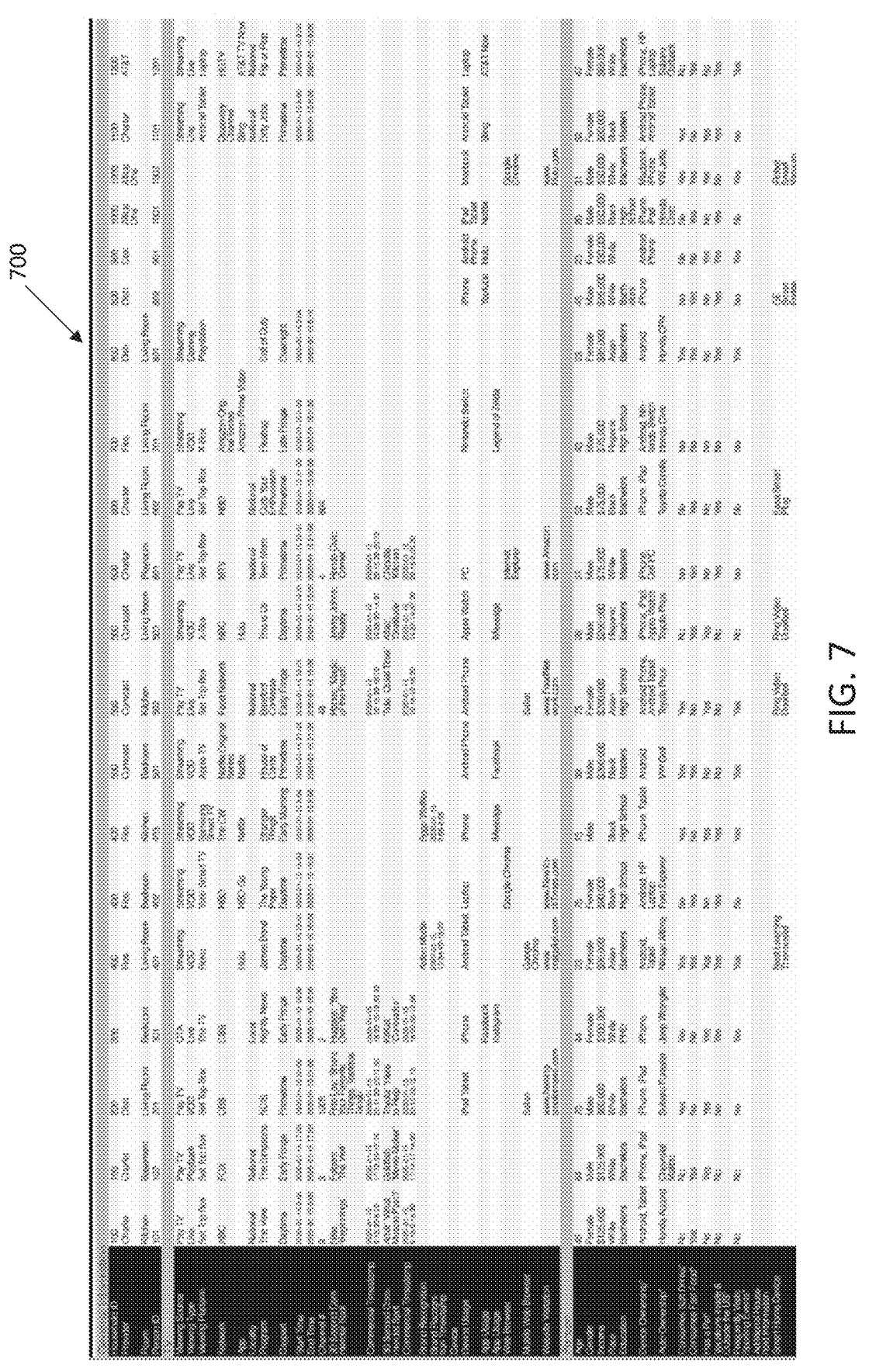

FIG. 7 shows an exemplary set of data 700 collected from a number of different households on a particular day (e.g., Jan. 15, 2020). This data set 700 includes a number of fields 702 identifying the media consumed, a number of fields 704 identifying the panelist who consumed the data. Advantageously, the data may be processed in order to identify trends in the data. For example, the data may indicated that 25% of adults between the ages of 25 and 35 who subscribe to cable watched a particular network drama (e.g., "Game of Thrones") on this day, and 80% of those viewers were exposed to a particular advertisement. The data set 700 may also be further processed to expose additional information and trends. For example, the data set 700 may indicate that 5% of the viewers exposed to a particular advertisement actually searched for the advertised content on their smartphone within ten minutes of viewing the advertisement. Therefore, by collecting and analyzing data using the gateway 110, advertisers, programmers, and others in the media industry are equipped to learn the level of exposure of programming and advertisements, and responses to such programming and advertisements. This also equips those in the media industry to make informed decisions with respect to future programming and advertisements.

Multi-Layered Approach to Content Recognition

As noted above the gateway 110 is configured to identify media content presented on a television 200. The gateway does this by first identifying what source is providing the television input, and then applying different rules to determine the content based on the identified source. Because of the different rules associated with different input sources, the gateway 110 is considered to take a "multi-layered approach" to content identification.

Figure 8:
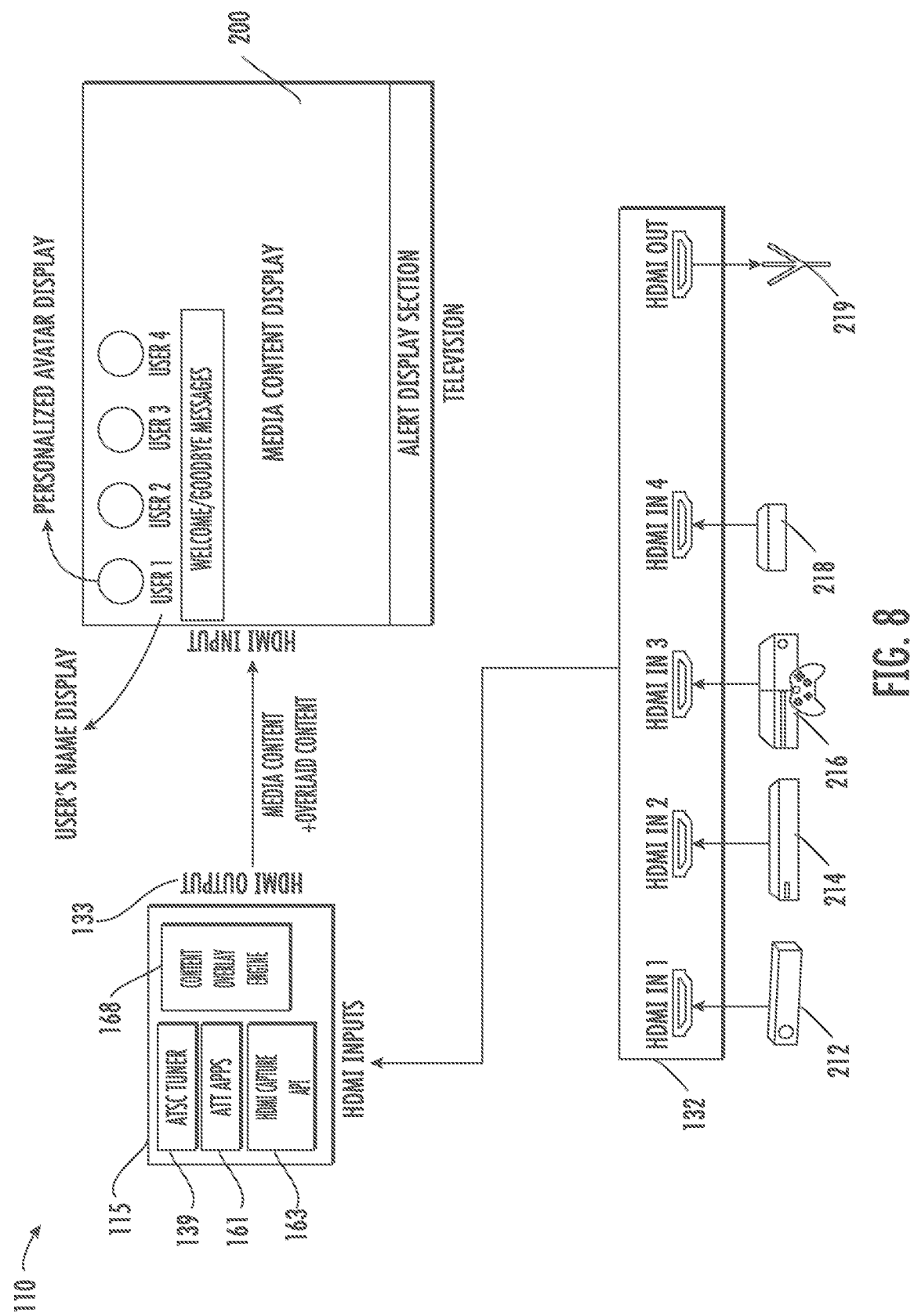
FIG. 8 is a diagram showing exemplary inputs into the gateway of FIG. 1 and an associated HDMI output to the television.

To further illustrate the multi-layered approach, consider the exemplary arrangement of FIG. 8 wherein five input sources are connected to the I/O ports of the gateway 110. The input sources include four HDMI inputs, including a cable/satellite box 212 connected to the HDMI-IN 1 port, a Blu-Ray/DVD player 214 connected to the HDMI-IN 2 port, a video game console connected to the HDMI-IN 3 port, and an OTT device connected to the HDMI-IN 4 port. These four HDMI inputs are fed to the video capture module 115 of the gateway 110. The fifth input source is a digital TV antenna input 219, which is fed to the video capture module 115. The video capture module 115 includes various hardware and software components for processing the received signals, including an ATSC tuner 139 (which receives the antenna input 219), an HDMI capture API 163 (which may be considered part of the content capture engine 162), and various OTT apps 161. Using the remote control 206, the user selects one of the four input sources for presentation (i.e., display) on the television 200. The video capture module 115 then outputs the video signal associated with the selected input source to the television 200 via the HDMI-OUT port of the gateway 110.

The video signals delivered to the video capture module 115 via the four HDMI inputs are all industry standard video signals. The video signals delivered to the video capture module 115 via the antenna and the ATSC tuner 139 are ATSC or other standard broadcast signals. The video signals delivered to the video capture module 115 may be characterized as a series of still images called "frames" (or screen shots) that are delivered in rapid succession at a constant interval (i.e., frame rate). As the frames of video are received by the video capture module 115, the frames from the selected input source are passed on through the HDMI-OUT port 133 and to the television 200 where they are then presented on the television screen. During this time, the video capture module 115 analyzes selected frames of the video signal presented on the television. The frames selected for analysis are determined by a specific set of content identification rules that are dependent on the selected input source. The content identification rules define the method for processing the associated video signal, including rules for identifying video frames for content identification analysis, and what procedures for content identification will be applied to the identified video frames. In some rule sets, each and every frame from a particular source may be monitored and, based on certain trigger events, selected frames may then be subjected to additional in-depth analysis. In other rule sets, only predetermined frames are selected for in-depth analysis following the occurrence of a trigger events. As used herein, the term "trigger event" refers to some occurrence indicating that a subsequent more in-depth content analysis should be conducted on one or more video frames in an attempt to determine the media content presented on a screen device (e.g., the television 200). In at least some embodiments, the frames associated with a trigger event are not only analyzed, but also captured (i.e., stored in memory), and/or transmitted to the remote server 310 or cloud for additional processing.

A number of different trigger events are possible. In general, trigger events may be split into two categories: (i) video frame triggers (which may be referred to herein as "frame triggers"), and (ii) external triggers unrelated to the video frame (which may be referred to herein as "external triggers" or "non-frame triggers"). Frame triggers occur when a preliminary analysis is conducted on a video frame which indicates that some trigger event is happening. Frame triggers are often used in rule sets where the video frames associated with a video signal are regularly monitored (e.g., many, most or all of the frames are subjected to some preliminary frame analysis). A first type of frame trigger occurs when a programming grid or content banner is included in one frame of the stream of frames. For example, this trigger event may occur when the preliminary analysis of a video frame includes pixels indicative of content banner or programming grid (e.g., a box or grid structure overlaid on some portion of the screen that includes some programming information, including information for a single channel and/or information for multiple channels). A second type of frame trigger occurs when a scene change is detected in the video signal. For example, the preliminary analysis of the stream of video frames may include comparing consecutive frames in the video input in order to detect a temporary blank screen (e.g., five consecutive blank screens), or a threshold change in the pixel density from one frame to the next (e.g., as may be the case when the content changes from network programming to an advertisement). A third type of frame trigger occurs when a network logo appears or does not appear within a frame. Inclusion of a network logo is generally indicative of network program content. Similarly, a missing network logo may be indicative of advertising or other content that is not created by the network. While three frame triggers are mentioned herein, it will be recognized that numerous additional frame triggers are possible and contemplated for use in the field. As discussed in further detail herein, frame triggers are often provided by the analysis from one or more local machine learning engines configured to detect such frame triggers.

Unlike frame triggers, external triggers are not related to the video frame itself. A first type of external trigger occurs when an infrared signal (or other type of signal, such as a short-range RF signal) is sent to the gateway 110 from the remote control 206. The signal may be any number of different possible signals sent from the remote control 206, such as a channel change signal, volume change signal, input source change signal, menu signal, television guide signal, etc. A second type of external trigger occurs when a signal for the gateway 110 is received from a source other than the remote control, such as a user voice signal. Again, this signal may be any number of different signals associated with control of the television via the gateway. A third type of external trigger occurs is when the gateway 110 detects a change in panelist registration occurs (i.e., an individual considered to be consuming the displayed content) is detected. A fourth type of trigger event is the expiration of a threshold period of time since the last trigger event (e.g., 500 ms, one second, one minute, five minutes, etc.). This trigger event ensures that the input video signal is captured and analyzed at least periodically (e.g., every five minutes), even if no intervening trigger events occur. While four types of external triggers are mentioned herein, it will be recognized that numerous additional external triggers are also possible. Additional information and descriptions of various triggers, including examples of external triggers and frame triggers, are provided below under the "Exemplary Trigger Events" subheading.

As noted previously, each set of content identification rules defines different signal monitoring procedures and trigger events. When a trigger event occurs, the video capture module 115 strategically analyzes one or more frames of the selected video signal as defined by the rule sets. The gateway 110 may define any number of different rule sets for content identification. For example, in the embodiment of FIG. 8, a first set of rules with a process flow similar to that of FIG. 5B1 is used if the selected video signal for display on the television is received from the antenna input/ATSC tuner 139. A second set of rules with a process flow similar to that of FIG. 5B2 is used if the selected video input signal is received from the satellite/cable box 212. A third set of rules with a process flow similar to that of FIG. 5B3 is used if the selected video signal is received from the OTT device 218. A fourth set of rules similar to that of FIG. 5B4 is used if the selected video signal is received from the Blu-ray player 214 or the gaming console 216. Following application of each rule set, a data package is generated that includes content identification data for the associated media content presented on the television. Because each rule set is different, it will be appreciated that each data package is also different.

One example of a content identification rule set procedure is now provided in the context of the selected video source being the satellite/cable box input 212 of FIG. 8, and the rule set being a first set of rules. This first set of rules is uniquely adapted to analyze frames of the video signal from the satellite/cable box 212 and assemble a data package for the analyzed frames. As noted previously, the rule set defines the method for processing the associated video signal, including rules for identifying video frames for content identification analysis, and the specific in-depth content identification algorithms that will be applied to the identified video frames. In this example, consider that the exemplary rule set defines a process flow that is somewhat similar to that of FIG. 5B2, but instead of analyzing each and every frame of the video signal for frame triggers, the rule set defines frame analysis windows that follow immediately after the occurrence of external triggers.

Each frame analysis window defines a short time period following a specific trigger event when one or more frames are captured and/or analyzed (e.g., one frame, two frames, ten frames, all frames, etc.). As an example, when the external trigger event is receipt of a remote control signal to change the channel, the rules define a frame analysis window that occurs between one and five seconds after the trigger event, and a frame is captured every 0.5 seconds during this time. The defined frame analysis window is based on the expected or possible occurrence of some content information being displayed on the television screen within the defined window. This content information may be displayed in any number of different ways, depending on the specific cable provider, such as different types of content grid (e.g., a banner overlaid along the bottom of the image, or a programming guide overlaid on some portion or most of the television screen), a simple display of text, or even audio played for the viewer (in the case of audio, the gateway is configured to store the audio as text). The first set of rules strategically defines this frame analysis window based on the particular input source (e.g., set-top box) connected to the gateway 110, which may include a specific model of set-top box. The term "model" of set-top box may refer to a specific content provider (e.g., AT&T Uverse, DirectTV, etc.) and/or a specific model number and/or part number of the set-top box. For example, an AT&T Uverse box having model number 123456 may place a content box with a blue-colored background along the bottom of the screen between one and four seconds after the receipt of a channel change signal. In this case, the content identification rules for this set-top box defines an associated frame analysis window (e.g., one to four seconds following detection of the banner) that utilizes a machine-learned algorithm to detect the presence of the AT&T content banner in one of the video frames within frame analysis window.

In addition to defining a frame capture window, the first set of rules incorporates machine learning modules within the content identification engine 164, and is configured to analyze an identified video frame (or multiple frames) and provide outputs that identify the content being watched on the screen. The outputs primarily include data identifying what is being watched on the television (e.g., program name, channel, time, etc.), but may also include additional information, such as identified logos, faces, characters, etc. Thus, the content identification engine 164 includes a number of different machine-learned algorithms, each of which implement a number of different tools/hidden layers. Examples of these tools include a text recognition tool (e.g., OCR), and other computer vision tools such as a logo recognition tool, a character recognition tool and/or a face recognition tool. Selected ones of these machine-learned algorithms may be executed in parallel to arrive at the defined content for a particular video frame.

The machine learning engine may also implement additional tools to arrive at the content identification data. For example the machine learning engine includes a text classification tool that identifies a category/field for all of the text extracted from a content grid from a particular provider (e.g., an identification that specific text is associated with a program name, program time, program description, channel, current time, etc.). The text classification tools are dependent at least in part on the particular provider (e.g., AT&T) and the expected position of certain information on a banner or other grid from such provider (e.g., the network is on the left side of the banner, the program name is in the middle of the banner, and the channel number is on the right side of the banner).

Figure 9:
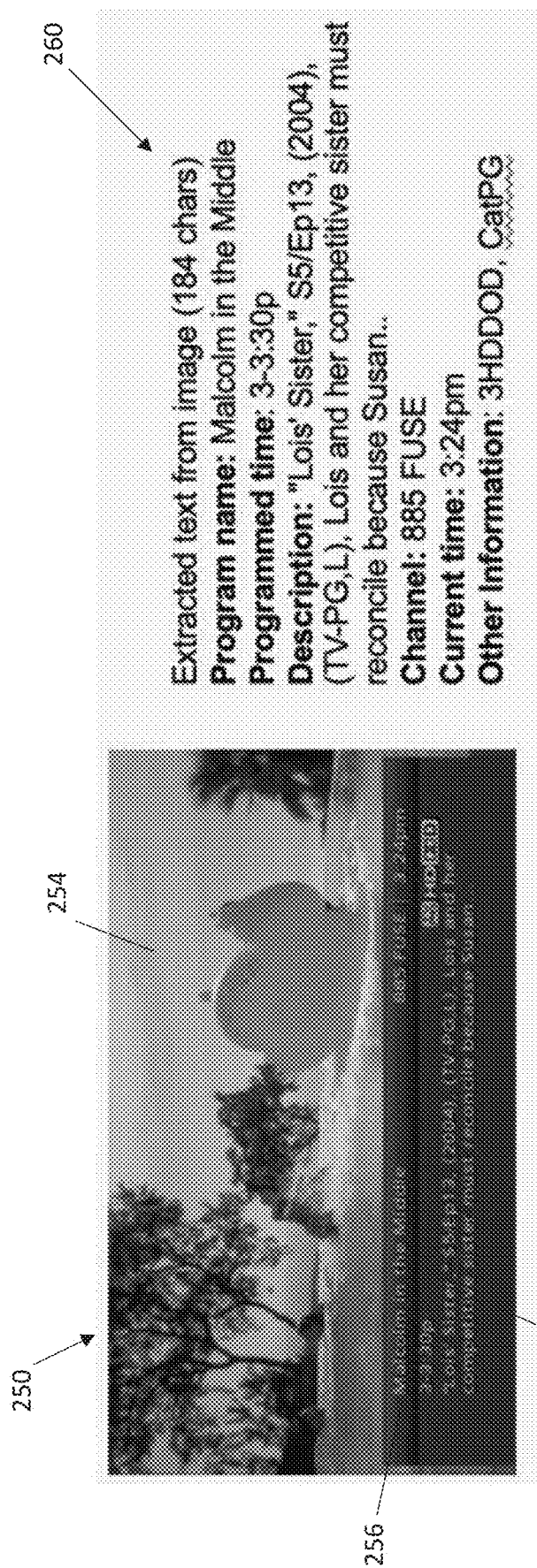
FIG. 9 shows an example of media content presented on a television and metadata extracted from a frame of the content.

With reference now to FIG. 9, a screen shot 250 associated with an exemplary video frame captured by the gateway 110 is shown. FIG. 9 also shows content identification data 260 extracted from the video frame using the first set of rules described above (i.e., a rule set associated with the cable box 212). As shown in the screen shot 250, a programming banner 252 is overlaid on the program content 254 on a lower portion of the screen. The banner 252 includes a significant amount of text 256 that may be used to identify the program content. The machine learning engine reads the text 256, splits the text into different blocks of text, and then categorizes each block of text (e.g., program name, program time, program description, channel, current time, other information). Again, the categories for each block of text may be derived based on the known source (e.g., AT&T Uverse cable box), and the known location of data within the AT&T Uverse content grid/banner.

In the example of FIG. 9, the rule set has extracted 184 characters of text from the frame, split the extracted text into blocks, and identified data categories and associated data for each category, as shown in the following table:

TABLE 1

| Data Category | Extracted Data |
| --- | --- |
| Program name | "Malcom in the Middle" |
| Program time | "3-3:30pm" |
| Description | "Lois' Sister," S5/Ep13, (2004), (TV-PG,L), Lois and her competitive sister must reconcile because Susan . . . " |
| Channel | 885 FUSE |
| Current time | 3:24 pm |
| Other information | 3HDDOD, CatPG |

While table 1 illustrates an example of extracted text from a frame of video, and categorization of such data in order to identify programming content, it will be recognized that additional data may also be extracted from a frame of video. Examples of such additional information include logos, faces, products (e.g., cars, shoes, etc.), image labels (e.g., houses, cars, trees, animals, etc.), or any other information that may be of assistance in content identification and that the machine learning engine is trained to recognize.

The content identification data is incorporated into a data package for each analyzed video frame. Each data package includes different information, depending on the input source of the content. For example, different types of additional information associated with different input sources may include a viewing source, viewing type, viewing platform/provider, application name, and program type, and system information from the time of capture. The input source may include, for example, paid TV, OTA TV, recorded content, streaming content, video game, mobile source, etc. The viewing type may include, for example Live TV, Playback, video on demand (VOD). The viewing platform/provider may include, for example, AT&T set top box, Comcast set top box, Xbox console, PlayStation console, AppleTV, Amazon Firestick, etc. The application name may include, for example, Netflix, Amazon Prime, Hulu, etc. The program type may include, for example, TV program, TV ad, movie, video game, etc. System information from the time of capture includes, for example, a timestamp, TV on/off status, etc. Additional information on various data packages is provide below under the "Data Packages" subheading.

Exemplary Trigger Events and Content Identification Algorithms

A more detailed explanation of various trigger events and associated content identification programs are now described with reference now to the exemplary triggers illustrated in FIGS. 10A-10L. As discussed previously, numerous sets of content identification rules are stored in the gateway, and each set of content identification rules includes one or more defined triggers. The gateway 110 applies one set of content identification rules to the video signal output to the television. The applied set of content identification rules is based on the selected input (i.e., the input to the television 200, which is the output of the gateway 110).

Infrared External Trigger Event

FIG. 10A illustrates a first exemplary external trigger event in the form of an infrared signal from a remote control. The trigger event is included with a particular set of content identification rules associated with a particular cable box (e.g., a Comcast cable box). In the example of FIG. 10A, the infrared signal is received from the gateway's remote control 206, but it will be appreciated that the trigger event could be defined by an infrared signal from any remote control.

As shown in FIG. 10A, when the user presses a button on the remote control 206, an infrared signal is transmitted. The gateway 110 receives the infrared signal and performs the requested action (e.g., a channel change) on the selected source/device. When the gateway 110 receives the infrared signal, the content capture engine 162 performs a capture and/or analysis of one or more frames of the video signal that are presented on the television follow the trigger event. Again, the content identification rules define the number of video frames to analyze, what analysis should occur, and the timing of the analysis.

In the example of FIG. 10A, consider a situation where the content identification rules indicate that one frame of the video signal should be captured and analyzed every 250 ms within a frame analysis window of three seconds. Based on these rules, the gateway 110 will capture 12 frames over the three seconds (i.e., 4 frames/second×3 seconds=12 frames) that follow the trigger event. The content identification rules also indicate that each of these frames should be analyzed with the grid detection algorithm. When a grid is detected (e.g., in the form of banner 252 of FIG. 10A), the rules then indicate that the text from the grid should be subjected to a content extraction algorithm that is unique to banners associated with the particular content provider and device (e.g., the specific type of Comcast cable box connected to the gateway). The content extraction algorithm not only identifies text within the banner, but also categorizes the identified text. For example, the content extraction algorithm may determine blocks of text as indicating particular data based on any number of parameters such as the location of the text within the banner, the font of the text, the format of the text (e.g., a time format), proximity of the text to various indicia (e.g., a program timeline, icons, etc.), and any of various other parameters that the machine learning model determines to be significant. In at least some embodiments, the categorization portion of the content extraction algorithm is a machine-learned algorithm. In other embodiments, the categorization portion is a human-programmed algorithm.

In addition to identifying text, and classifying the text, the content identification rules further indicate when the content identification process should be terminated (e.g., prior to the full three second period). For example, in the embodiment of FIG. 10A, the content identification period may terminate when either (1) two consecutive video frames are analyzed and identify the same content, or (2) a specific additional trigger event occurs (e.g., a new channel change signal from the remote control). When content is identified, the data may be saved in the internal memory of the gateway 110 and/or transmitted to the remote server 310. It is also possible that the rules may instruct the gateway to discard (and/or do not transmit) the identified content the content was not presented on the television for a threshold period of time (e.g., a subsequent channel change signal was received within ten seconds).

When the content identification rules are executed in the example of FIG. 10A, no grid may be detected for the first few frames that are captured following the trigger event (e.g., it may take 1 second for the content banner 252 to appear on the television 200). Accordingly, the content identification process does not occur for the frames captured and analyzed during second one of the frame analysis window. However, if the banner 252 then appears during second two of the frame analysis window, the gateway detects the occurrence of the banner 252, and the content identification rules applies a content extraction algorithm to the banner. The content extraction algorithm not only recognizes text, but also categorizes the text in order to determine specific data taken from the banner. For example, in FIG. 10A, it may be determined that the text "Criminal Minds" is indicative of a program name and the text "2007" is indicative of a year when the program first aired. In this case, when data from two (or more) consecutive frames are identical, the rules instruct the gateway to terminate the analysis process, and the data associated with the identified content is saved and/or transmitted to the remote server. Because the data associated with each set of content identification rules is slightly different, it will be recognized that the data packages from different rule sets will also be different. Various examples of such data packages are described in further detail hereinafter with respect to FIG. 21A under the "Data Packages" subheading.

While FIG. 10A provides one example of an external trigger event and content identification rules associated therewith, it will be recognized that numerous variations of such rules and trigger events are possible. For example, in at least one embodiment, when an infrared signal is detected, the gateway 110 performs a media capture of the current incoming media, and all captured frames are stored in the gateway's memory without any analysis. Thereafter, the captured frames are transmitted to the remote server/cloud for analysis. In at least some embodiments the rules call for capture and/or analysis of all identified video frames within a frame analysis window, even if there is no useful information in them. For example, in the case when frame captures occurs because a user changes the volume level with his remote control, the captured frames may or may not contain useful information. On the other hand, when a user changes the channel, the captured frames have a high probability of containing useful information such as the program name, channel number, network name or other useful information.

Time-Based Frame Captures

Figure 10B:
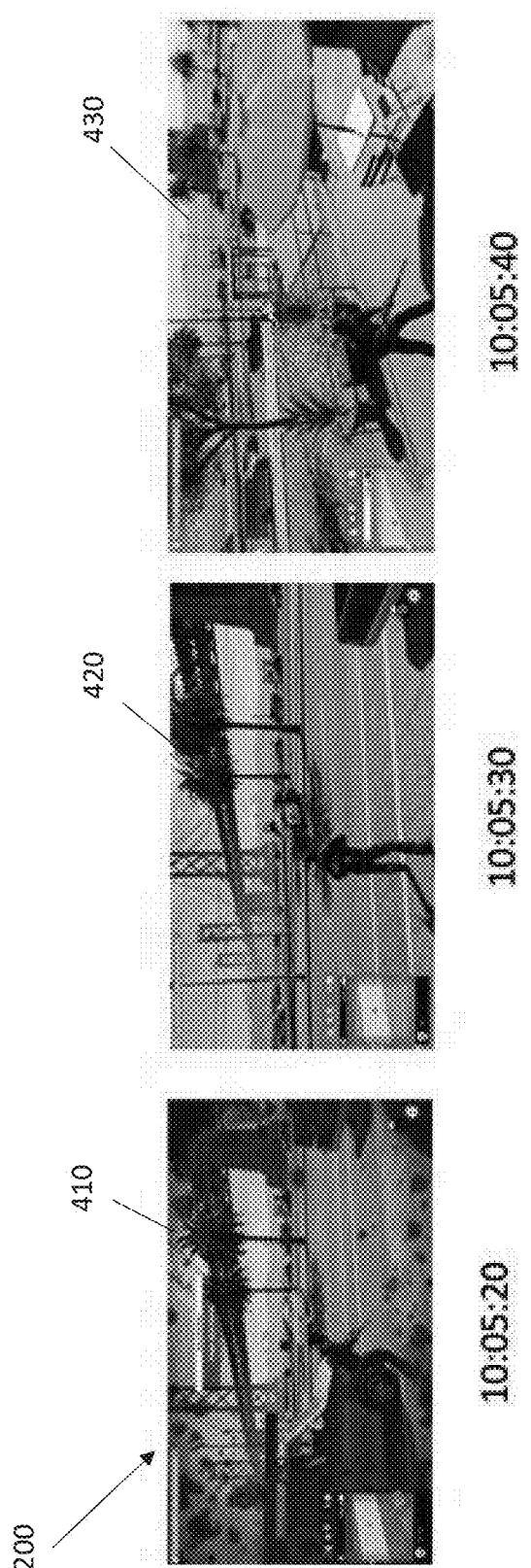
FIG. 10B is illustrates a time based trigger event used in association with the gateway of FIG. 1.

FIG. 10B illustrates a second exemplary external trigger event defined simply by the passage of time. The trigger event is included with a particular set of content identification rules associated with a particular game console (e.g., a Sony PlayStation). In the example of FIG. 10B, the content identification rules indicate that a screen should be captured and/or analyzed every ten seconds. Accordingly, video frames are captured for content 410 displayed on the television 200 at time 10:05:20, content 420 displayed on the television 200 at time 10:05:30, and content 430 displayed on the television at time 10:05:40. Subsequent video frames are also captured every ten seconds for the entire time that content from the game console is displayed on the television (e.g., frame captures every ten seconds for an hour or other time that the game console is in use).

The content identification rules identify specific in-depth content analysis procedures to be performed on each screen captured. As noted previously, in-depth content analysis is often based on machine learning models. For the video game console of FIG. 10B, the content identification rules may call for machine-learned algorithms, such as text recognition, logo/trademark recognition, character recognition, object identification, etc. These machine-learned algorithms are run sequentially or in parallel for each captured frame, as defined by the content identification rules. In some instances, these machine-learned algorithms are complex and require significant processing power. Accordingly, for these algorithms, the captured video frames are transmitted to the cloud/remote server 310 for further processing. In any event, the content data returned from the local and/or remote content identification engines provides valuable information concerning the particular content being played on the television. For example, in the example of FIG. 10B, the content identification engine may determine that the user is playing the "Call of Duty: Advanced Warfare" game. As another example, in some instances the content identification engine may simply identify video game content in a generic manner, such as: "video game/war game." Again, the data collected based on the content identification rules is assembled into a unique data package and saved to the gateway 110 and or transmitted to the cloud/remote server 310.

While FIG. 10B illustrates one example of a time-based external trigger event applied on one set of content identification rules, it will be recognized any number of additional time-based trigger events are possible. For example, in at least one embodiment, a time-based trigger event could require a frame capture every one minute with programming from a cable box, if no other trigger event occurred within the past minute. In yet another embodiment, a time-based trigger event could occur every five seconds with OTA content in an attempt to capture all advertising content displayed while a panelist is watching a broadcast channel.

Content Grid Detection

Figure 10C:
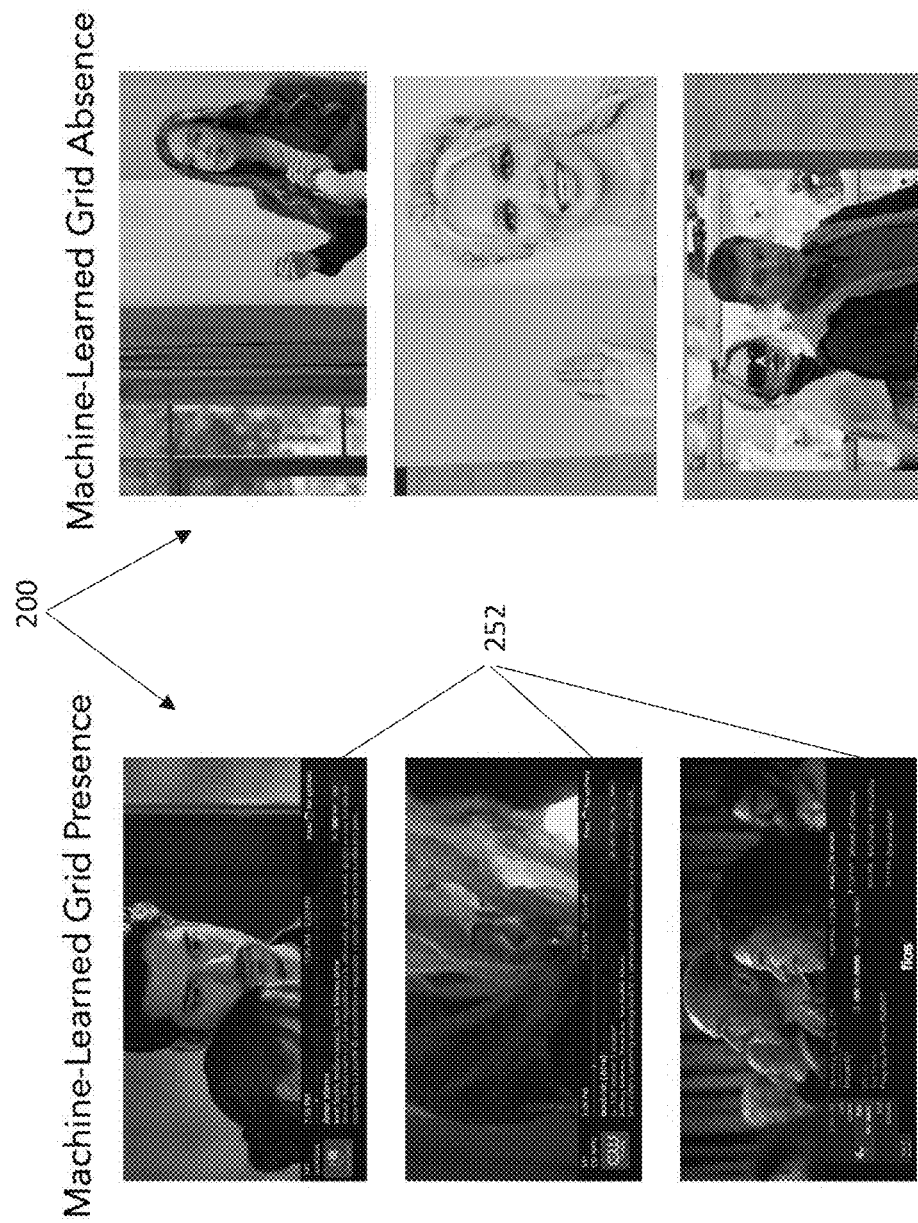
FIG. 10C illustrates several content banners displayed on the television of FIG. 1.

FIGS. 10C and 10D illustrates a first exemplary frame trigger event based on content grid detection, wherein the content grid is provided in the form of a content banner 252. The trigger event is included with a particular set of content identification rules associated with a particular cable box or satellite box (e.g., Comcast cable box, Direct TV satellite box, etc.; the term "set-top box" as used herein refers to either a cable box or a satellite box). In the example of FIGS. 10C and 10D, the content identification rules analyze each and every frame of video from a video signal and determine whether a content banner 252 is present on the television 200 (as noted on the left side of FIG. 10C) or is not present on the television 200 (as noted on the right side of FIG. 10C). When the content banner 252 is present, the content identification engine 164 performs further processing on the identified frames in order to identify the content provided within the banner (in a similar manner to that described above with reference to FIG. 10A).

FIG. 10D shows an exemplary log file 450 of the gateway 110 based on the analysis of a single video frame (and particularly a video frame with a content banner, such as that shown in FIG. 10A). The log file illustrates the steps taken by the gateway 110 when implementing a set of content identification rules, and particularly those associated with extracting programming data from a content banner. At line 451, the log file 450 shows that the gateway was reviewing video frames and waiting for a content grid to appear in one of the frames. At line 452, the log file 450 shows that a content grid in the form of a banner was detected in one of the frames. At line 453, the log indicates that further processing confirmed the presence of the content banner 252 within the frame. Accordingly, a trigger event is shown in lines 452 and 453 by the detection of a content banner. This trigger event resulted in further processing on the frame, as noted in lines 454-458 of the log 450, in order to identify the content associated with the frame. In particular, at line 454, the log 450 indicates that the process of extracting text from the grid was performed (e.g., via a text recognition tool such as OCR). At line 455, the text categorization process identified the name of the program as "Criminal Minds (2007)". At line 456, the text categorization process identified the network as "ion HD". At line 457, the text categorization process identified the channel number as "531". Then, at line 458, the log 450 indicates that a data package with this information is assembled and transmitted from the gateway 110 to the remote server 310. Finally, at line 459, the log 450 shows that the gateway returned to reviewing video frames for another trigger event in the form of detection of another content banner. This process of extracting text from a grid and categorizing or otherwise identifying such text is one example of a content extraction algorithm defined by a set of content identification rules.

Figure 10E:
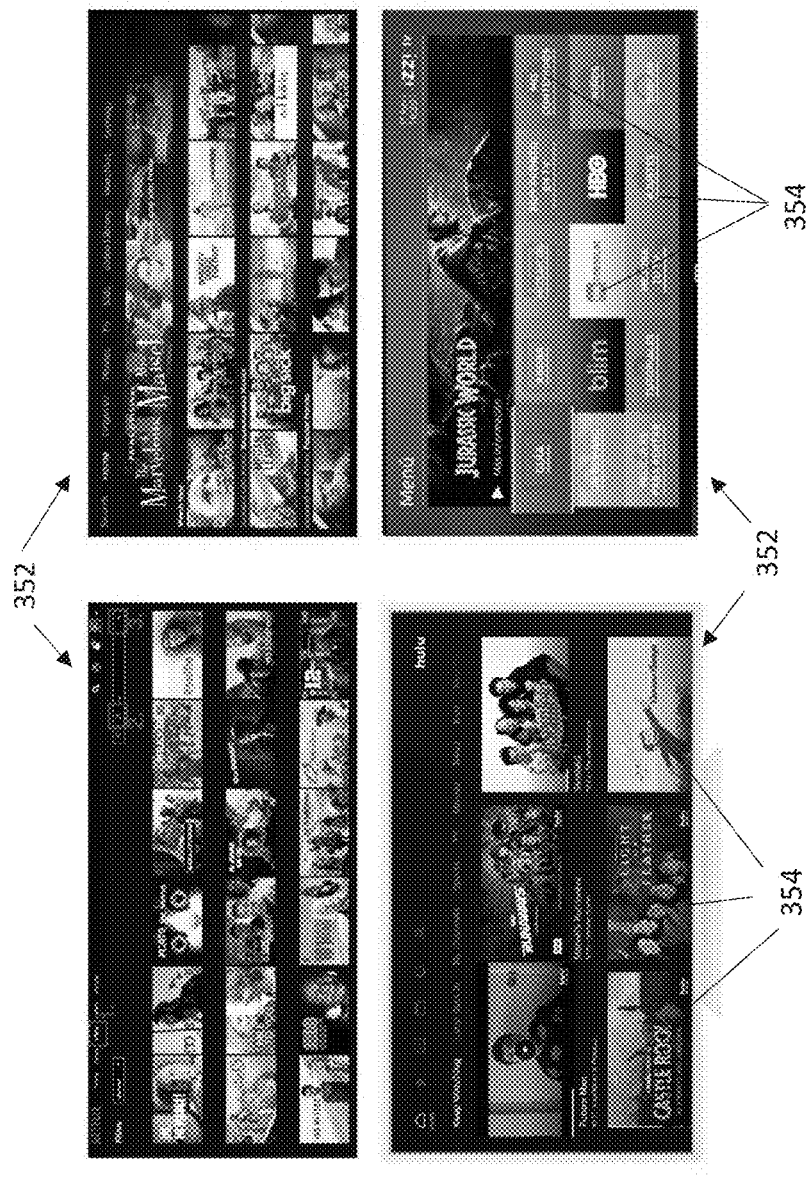
FIG. 10E illustrates several content mosaics displayed on the television of FIG. 1.

While FIGS. 10C and 10D illustrate a frame trigger and related processing based on the detection of a content banner, it will be recognized that other forms of content grids and subsequent processing are also possible. For example, as shown in FIG. 10E, content grids may also take the form of content mosaics 352. Content mosaics 352 include numerous blocks 354 of content (or content sources) that are simultaneously presented on a screen. The blocks 354 may be rectangular or any other shape, but they are selectable by a viewer in order to lead the viewer to desired content for presentation on the screen. Using a remote control, the user is able to move to any block on the mosaic by moving a selector. The current position of the selector (i.e., the block that the selector is current associated with) is highlighted in some way for the viewer. For example, the current block associated with the selector may be highlighted by an enhanced border, enhanced shading, an enlarged block relative to neighboring blocks, or any of various other highlighting techniques. As the user moves the selector from block to block, each selected block is highlighted. When the user wishes to view the content identified in the highlighted block, the user selects the block by taking an appropriate action, such as selecting an enter button on the remote control (e.g., the "OK" button).

The gateway 110 is configured to identify content presented on the television screen based on a user's manipulation of a content mosaic 352. FIG. 10F shows an exemplary log file 460 of the gateway 110 based on the analysis of a single video frame, and particularly a video frame with a content mosaic 352, such as that shown in FIG. 10E. The log file 460 illustrates the steps taken by the gateway 110 when implementing a set of content identification rules, and particularly those associated with extracting programming data from a content mosaic. At line 461, the log file 460 shows that the gateway was reviewing video frames and waiting for a content mosaic to appear in one of the frames. At line 462, the log file 460 shows that a content grid (in the form of a mosaic) was detected in one of the frames. At line 463, the log indicates that further processing confirmed the presence of the content mosaic 352 within the frame. Accordingly, a trigger event is shown in lines 462 and 463 by the detection of a content mosaic. This trigger event resulted in further processing on the frame, as noted in lines 464-468 of the log 460. In particular this further processing identified content selected from the mosaic by the viewer. At line 464, the log 460 indicates that the process of extracting text from the mosaic was performed. At line 465, the log indicates that the user selected one of the blocks of the mosaic. At line 466, the log indicates that the text from the selected option was extracted. At line 467, the text identification tool identified the selected option (e.g., "TV", "Game of Thrones", "Friends: The One Where Everybody Finds Out"). Then, at line 468, the log 460 indicates that a data package with this information was assembled and transmitted from the gateway 110 to the remote server 310. Finally, at line 469, the log 460 shows that the gateway returns to reviewing video frames for another trigger event in the form of detection of another content banner.

As illustrated in the foregoing examples, the gateway 110 maintains a log of various screens presented to a user and various selections made by the user. This log in combination with the various content identification rules allows the gateway 110 to actually track a user's path/journey as they make their way through various content options, including input sources, menus, mosaics, and any of various other options presented on the television screen. The information on such paths is extremely valuable to content providers because it can help content providers understand how to most effectively deliver content to consumers.

Figure 10G:
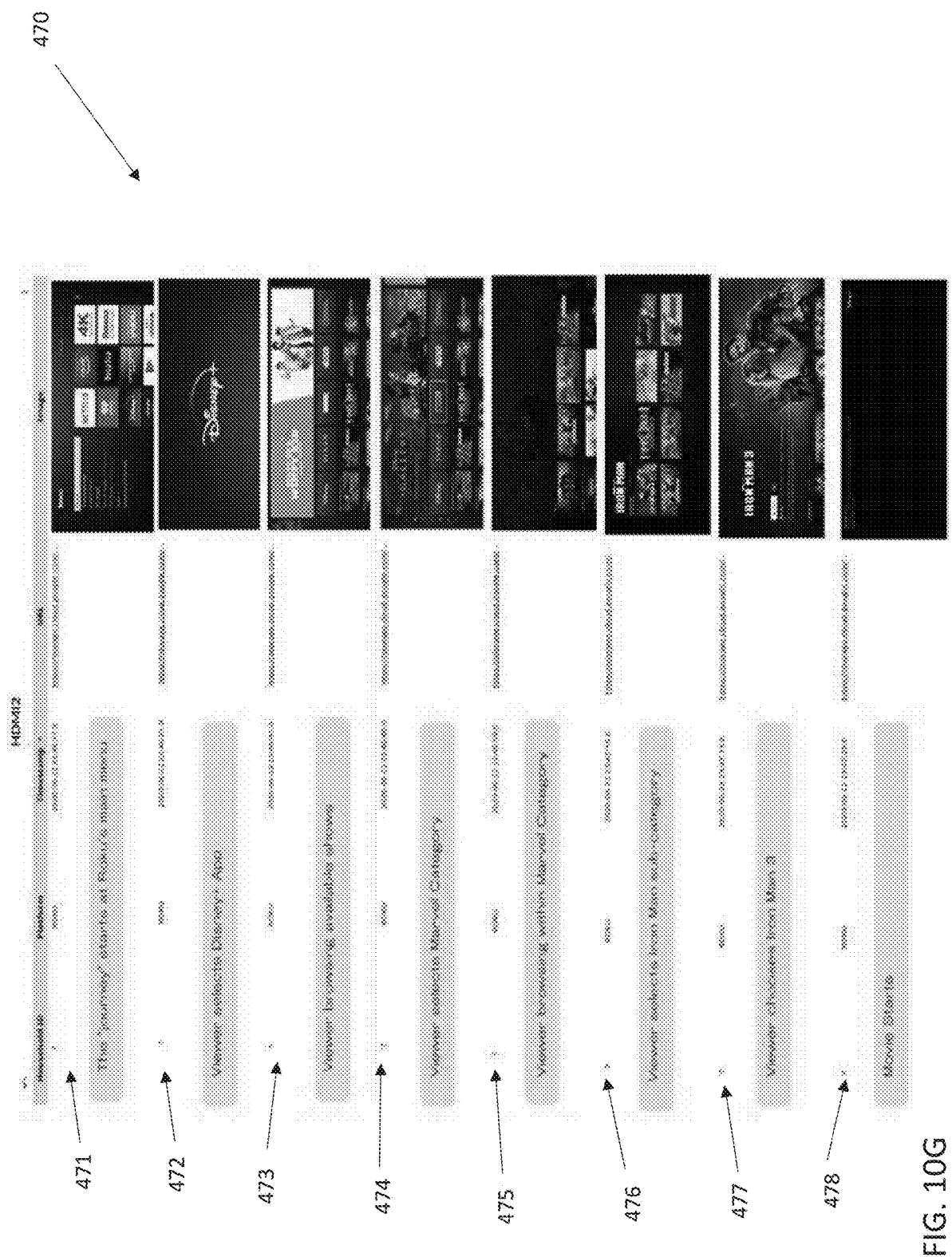
FIG. 10G is an exemplary content log illustrating a user's path through one of the content mosaics of FIG. 10E.

FIG. 10G illustrates an example of such a log 470 showing a user's path to selecting and watching a movie. As noted at the top of FIG. 10G, the user has selected the HDMI2 option for input to the television 200 from the gateway 110. In this case, the HDMI2 option is a Roku device. As noted in line 471, the user's journey began at the main menu of the Roku device. As noted in line 472, the user then selected the Disney+ App from the main menu of the Roku device. Line 473 shows that the user next browsed the main menu of the Disney+ App. As noted in line 474, the user then selected the Marvel category from the Disney+ menu. At line 475, the user browsed the "Marvel" menu. At line 476, the user selected the "Iron Man" category from the "Marvel" menu. As noted in line 477, the user chose the "Iron Man 3" movie. Then at line 478, the movie started. This simple example shows how a user's path through content may be tracked. The gateway can be configured to track this path at any level of detail, including for example, user movement through various input sources, menus, and blocks of a content mosaic. With this information in hand, the most advantageous positions within menus, mosaics, and other content display platforms may be determined.

Detection of Network Logos

Figure 10H:
FIG. 10H illustrates a network logo displayed on the television of FIG. 1.

FIGS. 10H and 10I illustrate another exemplary frame trigger event based on detection of network logos 258. Once again, the trigger event is included with a particular set of content identification rules associated with a particular input source (e.g., Comcast cable box). In the example of FIGS. 10H and 10I, the content identification rules analyze multiple frames per second (e.g., 30 frames per second) from a video signal and determine whether a network logo 258 is present on the television 200, or is not present on the television 200. While detection of network logos is a machine-learned process, this processing can typically be performed on the gateway because of the limited number of network logos currently in use (e.g., less than one thousand). The network logos that may be detected by the gateway 110 include the network logos that appear on any of various programming content, including that delivered by cable/satellite television providers (e.g., AT&T, Comcast, DirectTV etc.), OTT providers (e.g., Netflix, Amazon Prime, Hulu), video game console brands and game titles (e.g., Xbox, PlayStation), and various other providers.

Advantageously, the content identification rules may implement the network logo detection algorithm in various situations. Primarily, the presence of the network logo indicates the currently tuned network (or OTT provider, video game console, etc.). Identification of a network logo can improve the efficiency and accuracy of content detection by providing confirmation that other identified content is correct (e.g., that the content extracted from a grid is correct). Furthermore, the absence of a network logo in the transmission may also be valuable. For example, the absence of a network logo could mean that a television advertisement/commercial is currently being broadcasted (logos are not typically present in commercials). Accordingly, the network logo detection algorithm may serve as a trigger event to run other content detection algorithms that are more associated with advertising (e.g., see the discussion below under "Brand Detection"). Alternatively, the absence of a network logo may indicate other activity, such as the user navigating a content grid, the user browsing other services provided by the cable operator, or that the cable set top box is on standby mode or displaying a screen saver. Thus, it will be recognized that detecting logo absences is also an important process in order to improve the efficiency and accuracy of the content recognition.

FIG. 10I shows an exemplary log file 480 of the gateway 110 based on the analysis of a single video frame (and particularly a video frame with a network logo 258, such as that shown in FIG. 10H). The log file illustrates the steps taken by the gateway 110 when implementing a set of content identification rules that includes determining the existence of a network logo 258. At line 481, the log file 480 shows that the gateway was reviewing video frames and detecting the existence of network logos in each frame. At line 482, the log file 480 shows that a network logo was detected in one of the frames. At line 483, the log indicates that further processing identified the logo as the "FOX SPORTS" logo. At line 484, the identified network logo was included in a data package and transmitted from the gateway 110 to the remote server 310. At line 485, the gateway continued reviewing frames for presence of a network logo. At line 486, a frame was identified that did not include a network logo. At line 487, the absence of a network logo was noted and transmitted to the remote server. As noted above, the absence of a network logo in a video frame could itself serve as a trigger event, causing the content identification rules to perform subsequent processing, such as analysis of advertisements.

Real-Time Scene Change Detection

Figure 10J:
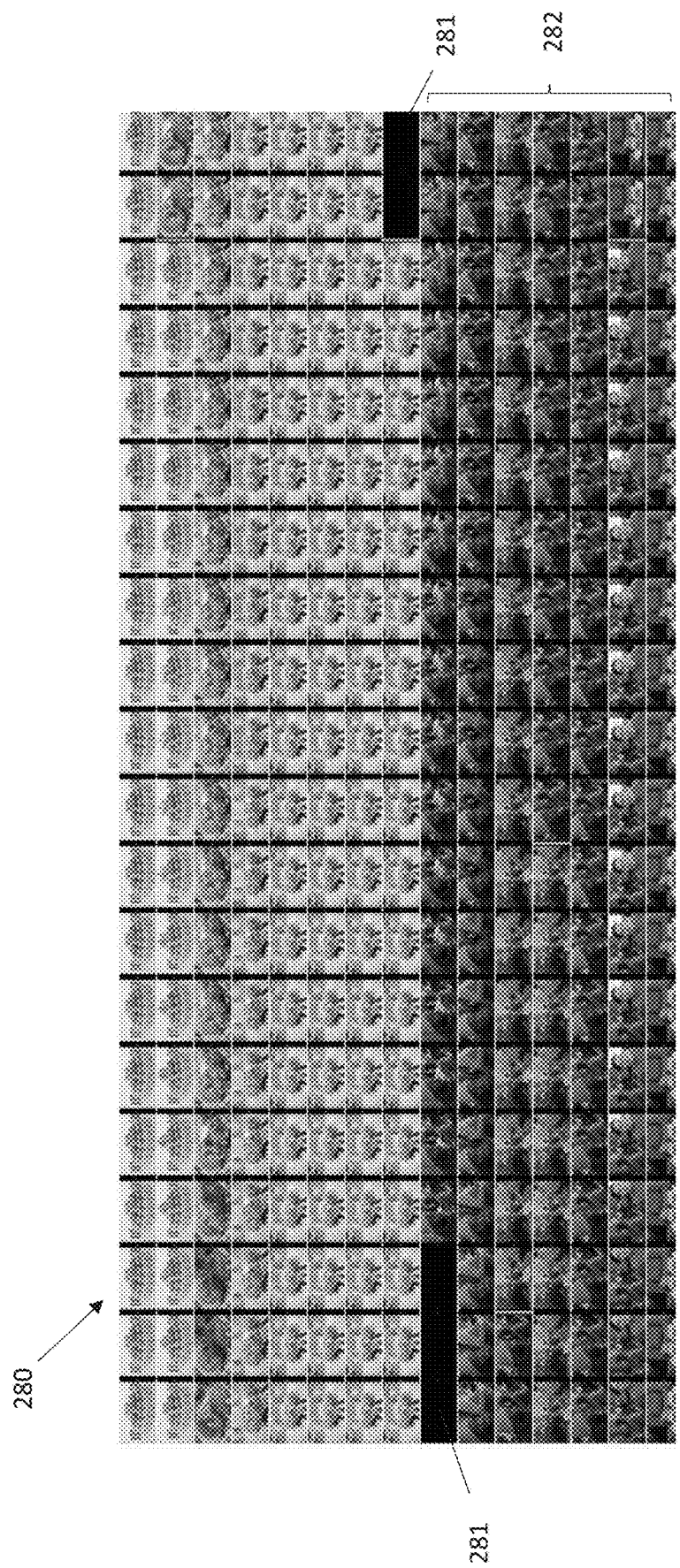
FIG. 10J illustrates a trigger event provided by a scene change within a series of video frames.

FIG. 10J illustrates another exemplary frame trigger event based on detection of scene changes. Once again, the trigger event is included with a particular set of content identification rules associated with a particular input source (e.g., Comcast cable box). In the example of FIG. 10J, the content identification rules analyze all frames of the video signal and determine whether a scene change has occurred. A scene change may indicate a number of different events, including a transition to advertising, a channel change, or simply a new scene within a program. Advantageously, the machine-learned scene change algorithm is capable of identifying a scene change, and the content identification rules are configured to use the scene change as a trigger event for further processing (e.g., analyze for advertisement, new channel info, etc.).

The scene change algorithm may be configured to detect a scene change in a number of different ways. For example, the algorithm may monitor a series of consecutive frames and look for some threshold number of consecutive blank frames (e.g., three frames) within the series. In FIG. 10J, a series of consecutive frames 280 is shown with five consecutive blank screens 281 included within the series 280. The content identification rules detect this series of blank screens 281 as a trigger event to implement an advertisement identification algorithm which includes several in-depth machine processes, such as face recognition and/or brand logo recognition.

When a scene change is detected, the gateway immediately stores a timestamp of the event, and additional processing begins as defined by the selected content identification rules. When a brand is detected within the video frames following a scene change, the machine-learning model appends the scenes associated to that particular television ad, in order to obtain the final duration of the ad, start and end time. Other exemplary elements that may be detected following a scene change include landmark detection, persons detections, object detections, etc. A text version of the detected items may be stored in the database and incorporated into the data package output from the content identification rules. In at least some embodiment, the audio associated with a given advertisement may be captured from the HDMI signal and converted to text for storage in the local or remote database. This allows for further identification of advertisements in the event there is some question about what particular ad was presented on the television (e.g., the Coca-Cola ad with the polar bear, or the Coca-Cola ad with the puffin) when an advertisement occurs.

Another advantageous feature of the scene change detection algorithm is the ability to assign a length of time to the advertisement. For example, by reviewing a series of consecutive frames, the gateway 110 could register that a television commercial for Coca Cola ran from 11:23:30 to 11:24:00.

The scene change detection algorithm may also be used with other algorithms to specify a particular event (e.g., type of content change) occurred following a scene change. For example, if the frames immediately following a scene change do not include a network logo, the content identification engine may determine that a commercial is being played, and any of various advertisement identification algorithms may be run. On the other hand, if the frames immediately following a scene change still include a network logo, it is unlikely that the scene change was to a commercial, and the advertisement identification algorithms need not be run.

Brand Detection

The machine learning models further include algorithms configured to detect brand/trademark presences within content (e.g., Coca-Cola, Pepsi, Toyota, Ford, etc.). The detection of brands may be as simple as extracting text from a frame and identifying a particular string of text as a known brand. However, more complex machine-learned algorithms may also be used to identify brand logos. For example, in the example of FIG. 10K, the machine-learned brand recognition algorithm may be configured to not only extract the text "Coca-Cola" 283 from the video frame, but may also be configured to recognize the ribbon 285 as a brand logo for Coca-Cola. With certain rule sets, brand detection may be used as a frame trigger (e.g., to indicate that a commercial is airing). However, in most rule sets, brand detection is used for more in-depth content analysis following another trigger event. For example, if a detected scene change (or alternatively, the absence of a network logo) indicates that a commercial is occurring, various in-depth brand detection algorithms may be applied to the video frames following the scene change as part of an advertisement identification algorithm. In addition to identifying brands, the advertisement identification algorithms may also include other machine-learned algorithms that detect other components of a commercial. For example, the advertisement identification algorithms may indicate that a particular Coca-Cola commercial included people, a beach, and a dog. This identified content is of great value in determining specific advertising content that was viewed by specific panelists at a specific time.

In view of the above, it will be recognized that many of the trigger events associated with FIGS. 10C-10K are frame triggers associated with internal machine learning models and algorithms. While some of these algorithms that that provide the frame trigger (e.g., grid detection) implement relatively simple machine-learned algorithms, others are much more complex (e.g., face recognition) and require significant processing power. Thus, while each of the machine-learned algorithms described above may be used as trigger events, the more complex machine-learned algorithms are more appropriate for in-depth content analysis than as frame triggers. Accordingly, it will be appreciated that different rule sets within the gateway will implement the machine learning models and algorithms differently. For example, one rule set may implement a logo recognition algorithm as a trigger event, while another rule set may only implement the logo recognition algorithm following a trigger event.

Changes in Signal Parameters of an OTA Content

The content identification rules for over-the-air (OTA) content is generally distinct from those used with any other input sources. When a user is watching OTA television, the digital tuner is constantly reading the incoming digital signal coming from the antenna. OTA transmissions inherently include specific content information such as network name, channel number and program name in their signal. Whenever the gateway 110 detects a change in these parameters (i.e., the content information in the OTA transmission), the gateway determines that the user has changed a channel. At that time, the gateway reads the parameters and registers them. In this way, the OTA transmission itself can serve as an external trigger (i.e., a non-frame trigger) causing the gateway to record new information each time the parameters of the OTA transmission changes. However, it will be recognized that the content identification rules for OTA content may also include any of various additional trigger and/or machine-learned algorithms discussed above. For example, the frames of an OTA transmission may be periodically reviewed (e.g., every five seconds) to determine if a network or brand logo is present. Alternatively, the frames of OTA content may be continually reviewed to determine whether a scene change occurred.

Machine Learning Modules and Training

As noted above, the gateway 110 makes use of numerous machine-learned algorithms (which may also be referred to herein as "machine-learning modules") within the various content identification rule sets. Each of these machine learning modules is trained remote from the gateway to perform a particular task. The trained modules are then transmitted from the cloud to the gateway 110 and stored as machine learning modules within the content identification engine 164. The content identification engine 164 implements these modules and provides various forms of content identification data as an output.

Each of the machine learning modules is trained to perform a particular task. For example, the content grid identification module may be trained to detect the occurrence of a content banner (or content grid) within a video frame. As another example, the network logo identification module may be trained to detect the occurrence of network logos in a video frame. In any event, the training process includes first creating a training set comprising a plurality of video frames. The training set includes a first plurality of video frames that include the occurrence of defined content (e.g., a content grid, network logos, text within a content grid, etc.) and a second plurality of video frames that do not include the occurrence of the defined content (e.g., no content grid, no network logos, etc.). The defined content may be, for example, any of the above defined frame triggers (e.g., content grids, network logos, brands, scene changes, etc.). The training set is then used to train a machine-learned algorithm configured to detect the occurrence of the defined content within a video frame.

The machine-learning modules may be trained as neural networks with various layers (e.g., input layer, hidden layers, output layer) and nodes within each layer, as well as various weights applied to the nodes within each layer based on the training. It will be recognized that any number of different parameters and weights may be assigned to the various nodes in order to arrive at the probabilistic output. Moreover, the weights and nodes may be adapted over time as iterative training occurs. Because the content data output from the machine learning engine is actually a high probability prediction of content, the reliability of the identified content improves over time with additional learning. This additional learning typically occurs remotely and is transmitted periodically to the gateway 110 in order to update the various machine learning modules.

The output of the machine-learned algorithm indicates the occurrence or non-occurrence of the defined content within the video frame. The output of a machine-learning module within a given rule set may serve to generate data related to the media content itself (e.g., brands, logos, etc.), and/or may serve as a trigger event for implementation of another machine-learning module (e.g., the existence of a content grid).

Various machine-learning modules within the gateway 110 may be utilized to perform a first round of content recognition on the captured media. If the gateway's content identification rules are able to resolve the content with enough accuracy, the generated content data is packaged and transmitted to a remote location where it is stored in a cloud-based database. On the other hand, when the gateway's content identification rules do not resolve the content with sufficient accuracy (e.g., there are missing or unknown pieces in the data package), the data package and any associated video frames may be transmitted to a remote location for further processing. This remote processing typically includes much more powerful machine learning modules that are not efficiently run at the gateway. For example, face recognition, character recognition, advanced game recognition modules, etc. may all be more efficiently performed with remote cloud-based software. The output of these modules may then be used to complete or supplement any data packages generated using the gateway's content identification rules.

In view of all of the foregoing, it will be appreciated that the gateway includes various machine learning models that perform real-time detection of elements included in the frames of an incoming video signal. Models are initially trained using cloud computing infrastructure, which provides high computing powered. Once the models are trained, they are deployed into the gateway 110 for it to perform recognition on the incoming video frames. Additional remote machine learning modules may be applied to captured video frames that are transmitted to the remote server 310 or other remote locations.

Active and Passive Panelist Registration

As noted above, the gateway 110 is configured to register panelists who are determined to be watching the television 200 connected to the gateway 110 at the time of registration. The gateway 110 is also configured to de-register panelists after some period of time when it is determined that the panelist is no longer watching the television 200. When a panelist is registered, that panelist is associated with the media content presented on the television during the period of registration. In particular, when content is analyzed in order to identify the content (e.g., using the methodologies discussed in the previous section), all the panelists registered with the gateway 110 at the time the content is presented on the television 200 are also associated with the data that identifies the content. Therefore, the data generated by the gateway 110 not only identifies content presented on the television, but also identifies all panelists who watched/consumed the content.

Registration of panelists at the gateway occurs by either active or passive registration. Active registration requires conscious actions from at least one panelist in order to register the panelists who are currently watching the television 200. In at least one embodiment, active registration of panelists occurs by the user pressing one or more buttons representing the panelists to be registered. These buttons may be presented in several ways, including physical buttons on the remote control 206 for each panelist, physical buttons on the gateway housing 112 for each panelist, and virtual buttons overlaid on the television screen 200 when a registration menu is activated.

In a first embodiment, the remote control includes a dedicated button for registration of each panelist. For example, as shown in FIG. 11, the remote control 206 for the gateway 110 includes a series of differently colored buttons 208 positioned along the bottom of the remote control 206. Each of these buttons 208 is associated with one of the panelists 204 when the gateway 110 is initially set up for the household 202. For example, if the buttons 208 include a red, green, yellow and blue button, the red button may be associated with a first adult female, the green button may be associated with a first adult male, the yellow button may be associated with a first child, and the blue button may be associated with a second child. Thereafter, when the television is on and one of these buttons is pressed, the panelist associated with that button is registered with the device at that time. An indication of panelist registration may then be overlaid on the television screen (e.g., an avatar for the panelist may be presented on the screen along with a welcome message, as described in further detail below), or may appear on the gateway display 152. When the panelist de-registers, an indication of de-registration may also be overlaid on the screen (e.g., an avatar for the panelist may be removed from the screen and a good-bye message presented).

The buttons 208 may be configured in any of various ways to register and de-register panelists. For example, in one embodiment, each of the buttons 208 is a toggle switch such that pressing a button the first time registers the associated panelist, and pressing the button a second time de-registers the associated panelist. In another embodiment, the number of times the button is pressed within a short period of time registers or de-registers the associated panelist (e.g., one press within two seconds registers the associated panelist, and two or more presses within two seconds de-registers the associated panelist). Panelists effectively use the buttons 208 by registering when they enter a room and begin watching media presented on the television 200, and then de-register when they leave the room or otherwise stop watching TV. Again, during a panelist's viewing session, all detected/captured content information will have the panelist's identification and current timestamp attached to it, in order to associate the panelist, to the viewed content.

While the foregoing paragraphs describe one exemplary embodiment of active registration, it will be recognized that other forms of active registration are contemplated. For example, active registration may occur using physical buttons provided on the gateway or virtual buttons provided on the television screen when a user enters a registration routine (e.g., a routine that may be called up using a physical button on the remote or virtual button in another menu). As yet another example, active registration may occur using voice commands provided to the gateway 110 (e.g., "Hey Google, Adam is watching television".)

In addition to active registration, the gateway 110 also provides for passive registration of panelists. Passive registration occurs automatically without any conscious effort by the panelist to register. The gateway 110 is generally configured to perform passive registration by detecting use proximity to the gateway 110 (and thus the proximity to the television 200). In at least one embodiment, passive registration occurs by detecting the signal strength at the gateway 110 from mobile devices that are in communication therewith and associated to particular panelists. The mobile devices may be provided (i) by mobile computing devices such as a smartphones, tablets, watches, or other mobile devices configured with Wi-Fi communications capabilities, and/or (ii) by wearable devices with short range wireless communications capabilities such as dedicated watches or bracelets with Bluetooth communications capabilities, or any of various other devices with Bluetooth communications capabilities, such as earbuds.

Mobile computing devices within a household are registered with the gateway 110 (i.e., identification data is shared and the device is configured for automatic connection to the gateway) at the time of gateway setup (or any time thereafter). Registrations of smartphones and smartwatches with the gateway are particularly advantageous because these mobile computing devices are typically carried by the panelist at all times. In any event, the unique identifier/MAC address of a mobile computing device that is associated with a panelist is stored in the panelist data 172 of the gateway 110. Each panelist's mobile computing device is configured to automatically connect to the same Wi-Fi network as the gateway 110. As discussed in further detail below, the gateway's Wi-Fi chipset 125 allows the gateway 110 to either (i) serve as a router and establish a new Wi-Fi network, or (ii) operate in a sniffer mode in order to detect network traffic within the existing Wi-Fi network. In either case, the gateway constantly scans for MAC Addresses from devices communicating over the Wi-Fi network. When the gateway recognizes the MAC Address of a mobile device associated with a panelist, the signal strength (e.g., RSSI) of that mobile device is recognized to determine the proximity of the panelist to the gateway. When the signal strength from the mobile device is greater than a threshold strength, the panelist is determined to be in proximity to the gateway 110 and the television 200, and the panelist is registered at the gateway. All identified presented on the television 200 is then associated with the panelist during registration. When the signal strength from the mobile device is less than the threshold, the panelist is determined to be outside proximity to the gateway 110 and television 200, and the panelist is not registered with (or is de-registered from) the gateway 110.

Figure 12:
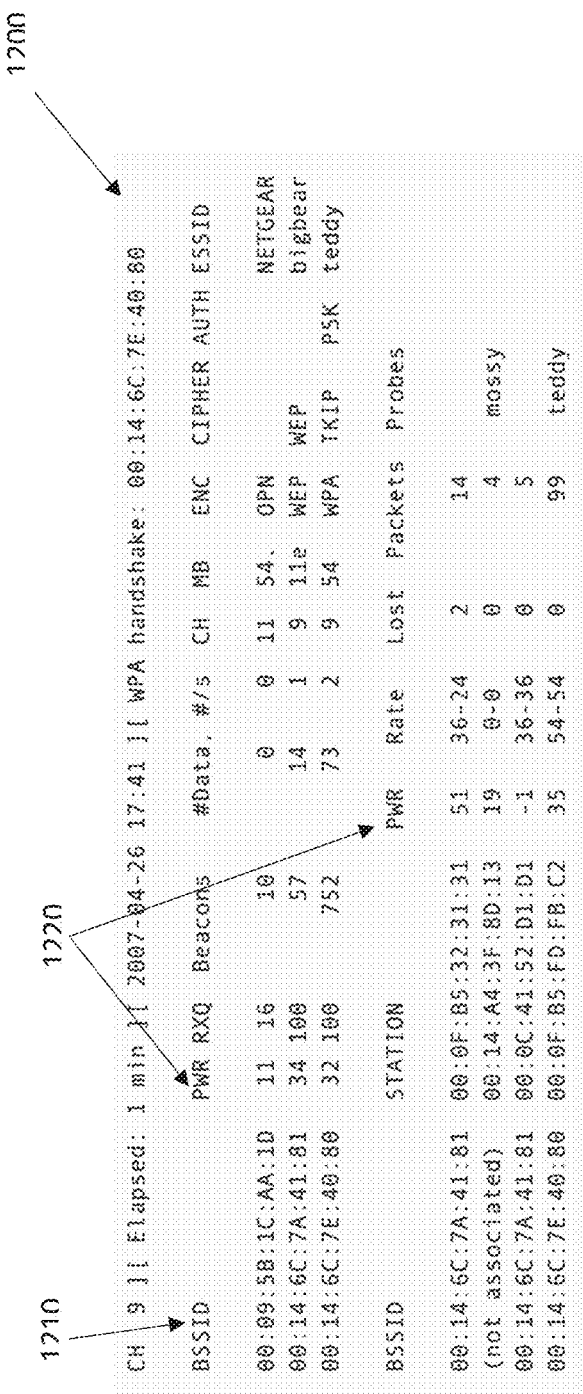
FIG. 12 is a table of Wi-Fi handshake information collected at the gateway of FIG. 1.

With reference now to FIG. 12, a table 1200 of WPA handshakes collected at the gateway 110 is shown. The table includes a list of MAC addresses associated with WPA handshakes between various mobile devices and the wireless access point (e.g., provided at the gateway 110 or household router). The BSSID column 1210 shows the unique identifier/MAC address for a number of devices communicating over the wireless network. Other information is also shown in the table 1200, including a signal strength column 1220 which provides a numerical value representative of the signal strength of the mobile device at the gateway 110. When the signal strength is greater than a threshold value (e.g., 25), the panelist associated with the mobile device is determined to be in proximity to the television 200 (e.g., 25 feet), and the panelist is registered at the gateway 110. When the signal strength is less than the threshold, the associated panelist is determined to not be in proximity to the television 200, and the panelist is not registered (or is un-registered) at the gateway 110. Advantageously, the threshold signal strength may be different for each gateway 110, depending on the size of the room where the gateway is installed. For example, in a first home, the gateway may be installed in a room that is 20 ft×20 ft, and in a second home the gateway may be installed in a room that is 30 ft×30 ft. Because of this, a panelist determined to be 25 feet away from the gateway in the first home is unlikely to be in proximity to the television, while a panelist determined to be 25 feet away from the gateway in the second home is likely to be in proximity to the television. Accordingly, when the gateways are initially configured in these two homes, the technician or user may make the threshold in the first home to be less than the threshold in the second room.

Figure 13:
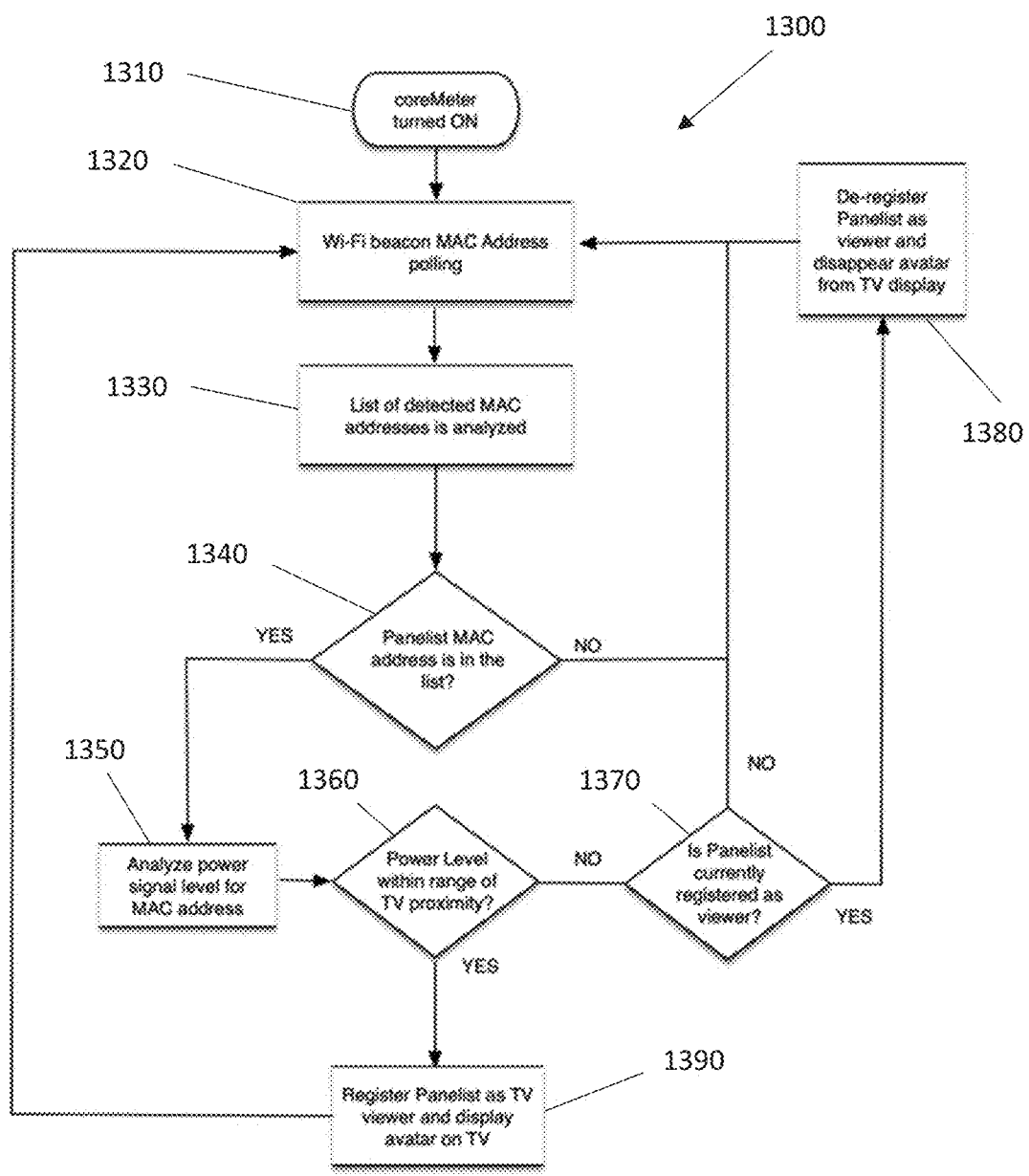
FIG. 13 is a flowchart of a method for registering and de-registering panelists at the gateway based on a Wi-Fi signal strength detected at the gateway of FIG. 1.

FIG. 13 is a flowchart summarizing the above-described method 1300 of registering a panelist based on the signal strength of a MAC address. The method begins at step 1310 when the gateway 110 is turned on and the gateway joins a household Wi-Fi network (or serves as a router therein). At step 1320, the method continues by conducting MAC address polling via the Wi-Fi beacon. At step 1330, a list of detected MAC addresses is analyzed (e.g., similar to that of FIG. 12). At step 1340, a determination is made whether a MAC address associated with one of the panelists is in the lists. If a MAC address associated with a panelist is in the list, the method continues to step 1350, and the power signal level associated with the MAC address is analyzed by comparing it to a threshold. As step 1360, if the power level is greater than the threshold, the associated panelist is considered to be in proximity to the television. On the other hand, if the power level is less than the threshold, the associated panelist is considered to be outside proximity to the television. At step 1390, when the panelist is determined to be in proximity to the television, the panelist is registered and an avatar for the panelist is shown on the television. However, if the panelist is not in proximity to the television, the method moves to step 1370, and a determination is made whether or not the panelist is currently registered with the gateway. If the panelist is not currently registered at step 1370, the method returns to step 1320 and continues to poll for MAC addresses. However, if the panelist is currently registered at step 1370, the method continues to step 1380. At step 1380, the panelist is de-registered at the gateway, and no avatar for the user is shown on the television.

Figure 14:
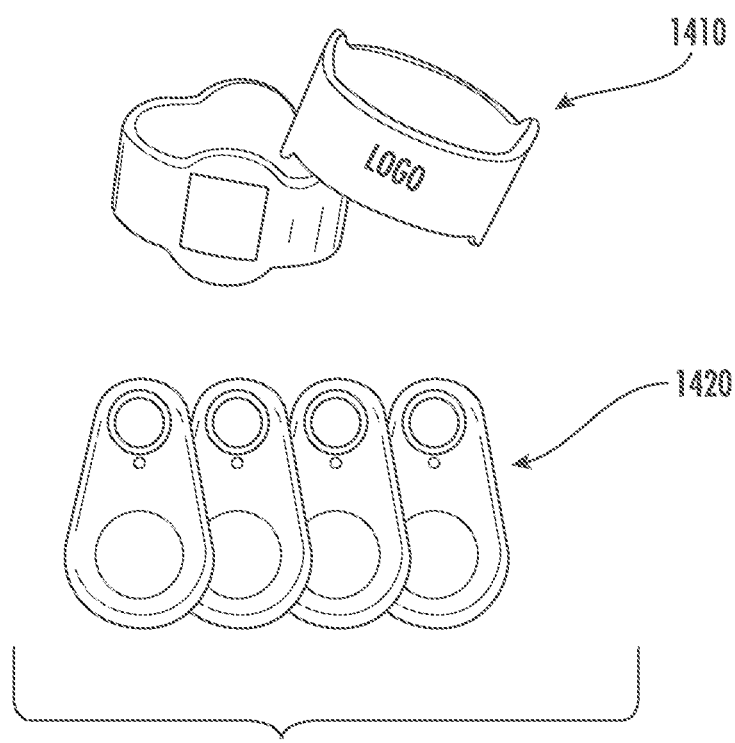
FIG. 14 shows a perspective view of exemplary wearable electronic devices for use with panelist registration to the gateway of FIG. 1.

As noted previously, in addition to passive registration based on the proximity of Wi-Fi-enabled mobile computing devices to the gateway, passive registration may also occur based on proximity of wearable electronic devices with short range wireless communications capabilities (e.g., Bluetooth) to the gateway. FIG. 14 shows an example of dedicated wearable electronic devices in the form of bracelets 1410 configured to be worn on the wrist and pendants 1420 configured to be worn around the neck or carried in the pocket of the panelist. Dedicated wearable devices are typically reserved for use by children or the elderly who do not own a smartphone or other mobile computing device capable of communicating with the household wireless network. However, dedicated wearable devices 1410, 1420, may also be used by adults who do not own a smartphone or do not regularly carry their smartphone around the house. Other examples of wearable electronic devices include headphones, earbuds, or other wearable speaker devices (e.g., iPods), with short range wireless communication capabilities. These devices are increasingly being carried by individuals at all times, and may be used to passively register panelists with the gateway 110.

Registration of panelists carrying wearable electronic devices is similar to registration of panelists with Wi-Fi-enabled mobile computing devices. However, instead of monitoring signal strength, the Bluetooth chipset 123 of the gateway 110 simply polls for Bluetooth signals from various wearable electronic devices. In particular, the gateway 110 continually sends a polling signal to ask whether any wearable devices are receiving Bluetooth signals from the gateway. The strength of the polling signals is such that only wearable electronic devices within a certain range (e.g., 25 feet) will receive the signal. The strength of the polling signal may be adjusted within the gateway 110 (e.g., by a technician via the gateway's configuration interface) in order to provide the proper signal range. When a response to the polling signal is received from one of the wearable electronic devices, the gateway recognizes the wearable device, and the associated panelist is registered at the gateway 110.

Figure 15:
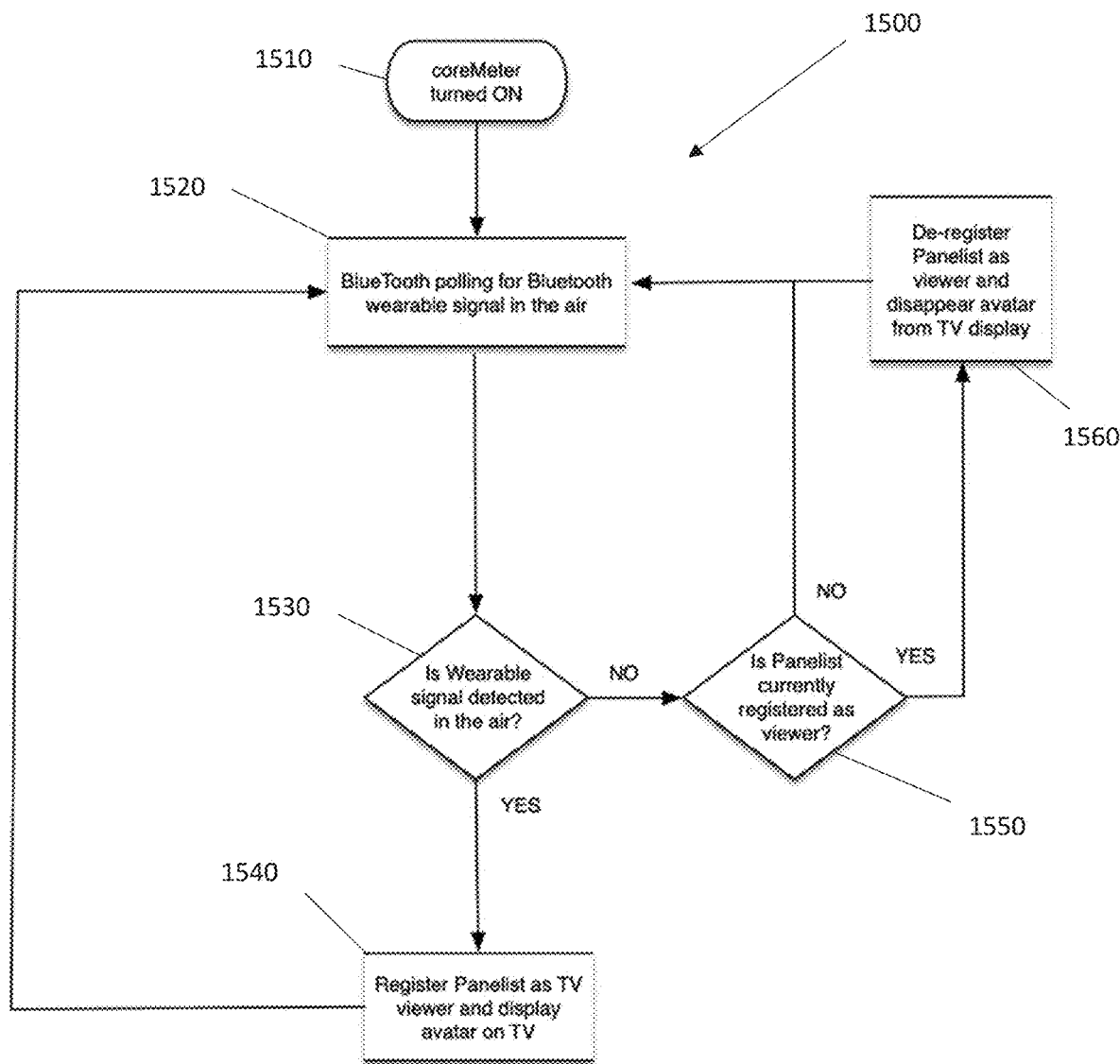
FIG. 15 is a flowchart of a method for registering and de-registering panelists at the gateway based on a Bluetooth communications with a wearable electronic device at the gateway of FIG. 1.

FIG. 15 is a flowchart summarizing the above-described method 1500 of registering a panelist based on Bluetooth communications with a wearable electronic device. The method begins at step 1510 when the gateway 110 is turned on and the gateway Bluetooth chipset 123 is powered up. At step 1520, the method continues with the Bluetooth transceiver sends Bluetooth polling signals, and listens for responses from any Bluetooth devices that are within range of the polling signal. At step 1530, a determination is made whether any confirmation signals have been received from wearable devices in proximity to the gateway 110. If a confirmation signal is received from a wearable device, the method continues to step 1540 where the panelist associated with the wearable device is determined to be in proximity to the television. In this case, the panelist is registered at the gateway 110 and an avatar for the panelist is displayed on the television. At this time, the registered panelist is associated with all identified content presented on the screen until the panelist is subsequently de-registered. On the other hand, if no confirmation signal is received from the wearable device, it is determined the panelist associated with the wearable device is not in proximity to the television, and the method moves on to step 1550. At step 1550, If the panelist is not currently registered at step 1550, the method returns to step 1520 and simply continues to poll for Bluetooth communications from wearable electronic devices. However, if the panelist is currently registered at step 1550, the method continues to step 1560 where the panelist is de-registered at the gateway 110, and no avatar for the user is shown on the television. From this moment, the previously registered user will no longer be associated with any identified content presented on the television until the panelist is re-registered.

In view of the foregoing described processes of active and passive user registration, it will be recognized that registration of panelists may occur in any of several forms, including passive registration only, active registration only, or some combination of passive and active registration. In general, active registration and de-registration is only necessary in cases where a panelist is not carrying his or her smartphone or other mobile electronic device (e.g., wearable device), or if the mobile electronic device has run out of battery power. Passive registration and de-registration occurs automatically when the user is carrying a fully powered mobile electronic device. In some embodiments, a warning message is shown prior to automatic de-registration of a panelist (e.g., "It appears that Adam has left the room; please press Adam's registration button on the remote control if this is incorrect.") These warning messages are designed to guard against de-registration when the user is actually still in the room but appears to have left the room for some reason (e.g., a panelist may appear to have left a room because his or her phone died, a child or other third party carried the user's smartphone out of the room, the user turned off the Wi-Fi on the phone, etc.). In further embodiments, when the system 100 detects that active and passive registration are often inconsistent, a message may be displayed on the television asking the panelist to take care to comply with registration protocols. For example, if a panelist repeatedly performs the active de-registration procedure but leaves his or her smartphone in the same room as the gateway 110, a message may be sent asking the panelist to keep the phone on his or her person, or find a different charging station for the phone.

While exemplary methodologies for active and passive registration and de-registration are described herein, it will be recognized that various additional devices and methodologies may be used in addition to or in lieu of those described herein to confirm registration or de-registration of a panelist. For example, in at least one alternative embodiment, the gateway 110 is further equipped with a camera and is able to perform facial recognition on individuals within proximity of the gateway.

HDMI Overlay

The gateway 110 is equipped with HDMI overlay capabilities that allow content generated by the gateway 110 to be overlaid on content from the input source and displayed on the television 200. The HDMI overlay capabilities are provided by the content overlay engine 168 (see FIG. 2A), which is configured to overlay legends, messages, icons, avatars, and other additional content/information on the media content provided to the television via the cable connected to the HDMI out port 133. The HDMI overlay engine 168 may be configured to overlay different types of information on the television at different times during operation of the gateway.

One instance in which the content overlay engine 168 overlays information on the media content is during panelist registration and de-registration. As described above, a panelist who is associated in the gateway 110 with a properly configured mobile electronic device (e.g., a smartphone or wearable electronic device) will be registered when the gateway detects that the mobile electronic device is in proximity to the gateway 110. Each panelist in the household is associated with a unique avatar. When a panelist is registered, the gateway 110 display the panelist's avatar over the content presented on the television for some period of time along with a welcome message to the newly registered panelist. When the panelist is de-registered, the gateway 110 displays a good-bye message and removes the panelist's avatar from the screen.

Figure 16:
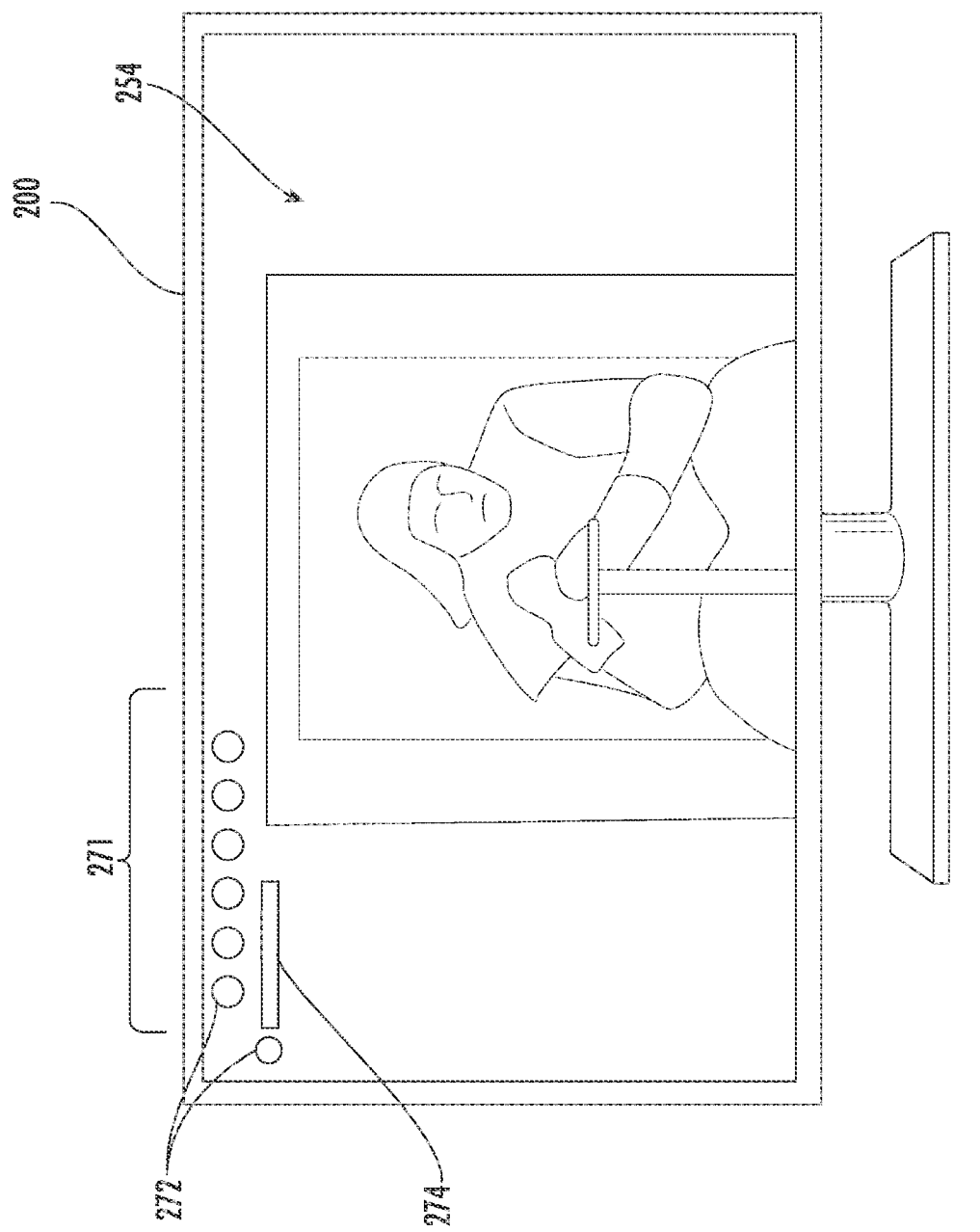
FIG. 16 is an exemplary television with media content presented on the screen and registered panelists displayed as avatars on the screen according to the method of FIG. 15.

FIG. 16 shows an exemplary television 200 with a plurality of avatars 270 overlaid on the program content 254 presented on the television screen. Six avatars 270 are overlaid on the program content 254 in the example of FIG. 16, indicating that six panelists are currently registered and are being associated with the program content 254 within the gateway 110. The six avatars 270 are all included in a single row across the top left side of the television 200. Avatars 270 for the currently registered panelists are all temporarily displayed on the television for a short period of time when a panelist registers or de-registers with the gateway 110. For example, the avatars 270 may be shown for five to ten seconds after an additional panelist registers with the gateway 110. After the short period of time, the avatars 270 disappear and only the program content 254 is shown on the television screen. Alternatively, in at least one embodiment, the avatars 270 are displayed in full color during the short period of time, but after expiration of the short period of time the avatars are muted (e.g., shown as dim colors, translucent, minimized, ghosted, replaced with small substitute icons) or completely hidden.

In the example of FIG. 16, the Jerry Smith recently entered the room where the television 200 is located carrying his smartphone. At this time, the power signal level associated with the MAC address for his smartphone exceeded the predetermined threshold and Jerry Smith was automatically registered with the gateway 110. This new registration prompted a welcome message 274 on the television (i.e., "Welcome Jerry"). Jerry Smith's avatar 272 was then displayed at the top of the television with the other avatars 270 for the currently registered panelists. Thereafter, during Jerry Smith's viewing session, all captured/identified content shown on the television 200 will be associated with Jerry Smith as well as any other registered panelists at the time of content identification (i.e., the data identifying the content will have the registered panelist's id and current timestamp attached to it).

Figure 17:
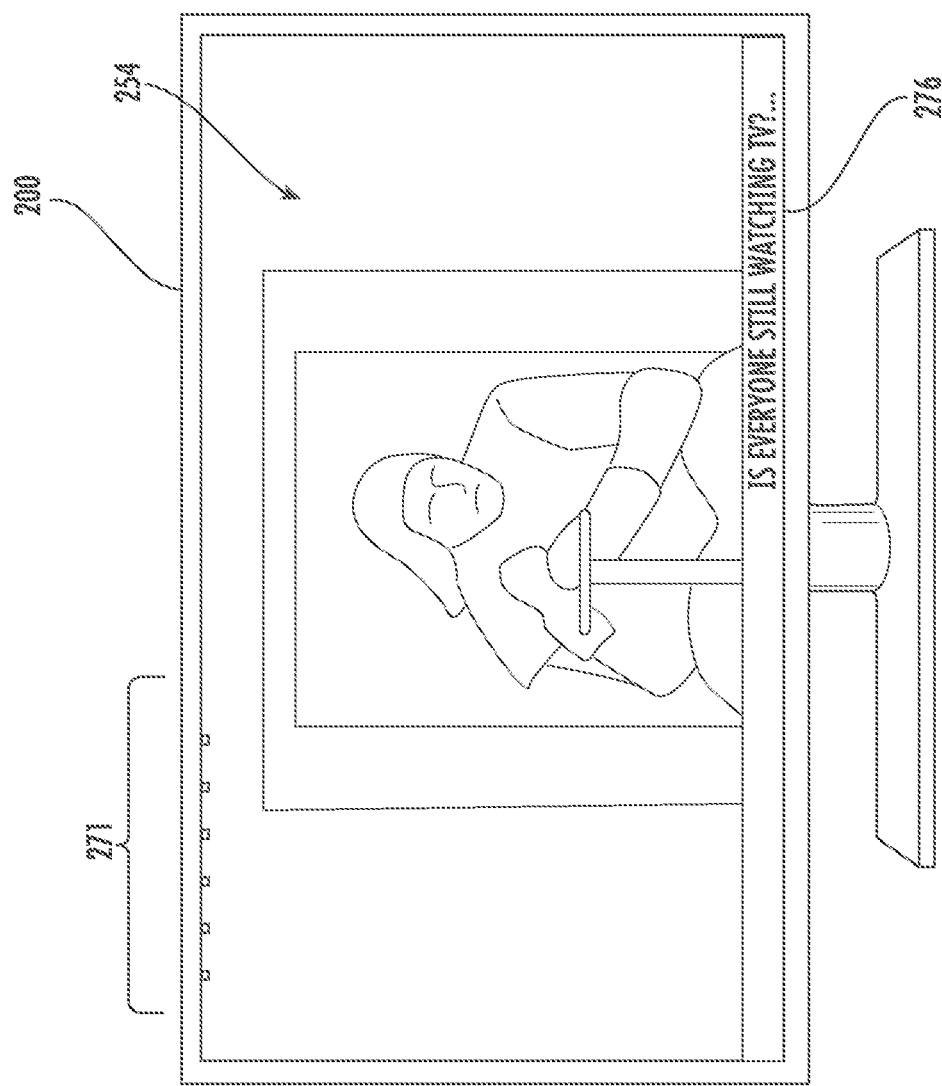
FIG. 17 shows the exemplary television of FIG. 16 when the avatars are muted on the screen.

After displaying the avatars 270 and welcome message 274 for a short period of time (e.g., five seconds), the welcome message 274 disappears, and the avatars 270 are muted on top of the television. For example, as shown in FIG. 17, the avatars 270 are replaced on the screen by small icons/shapes 271 (e.g., small circles) that are each personal to one of the panelists. These icons/shapes are significantly smaller than the avatars 270 and are intended to not be overly invasive on top of the media content 254 displayed on the screen. When the icons are all the same shape, each panelist may be associated with a different color (e.g., Jerry Smith is blue and Julie Smith is red) such that the panelists may quickly identify their personal registration icon on the screen.

Following registration of a panelist, the gateway continually scans for signals associated with panelists in order to determine panelist proximity to the television (i.e., by monitoring for signal strengths in excess of the threshold from any of various wireless devices associated with the panelist). If the panelist's mobile electronic device remains in proximity to the gateway 110 (i.e., the signal strength remains in excess of the threshold), the user will continue to be registered. However, when the gateway 110 does not detect the user's mobile device in proximity to the gateway, the user is de-registered and a good-bye message (e.g., "Goodbye Jerry Smith") is displayed on the television for some period of time (e.g., 5 seconds). At this time, the user's ID and timestamp will no longer be attached to the detected/captured content information.

While the foregoing discussion related to avatars 270 and related content overlaid on the television screen was discussed in the context of passive panelist registration and de-registration, it will be recognized that avatars 270 are similarly displayed during active panelist registration and de-registration. For example, if a user enters the room without any mobile electronic device, the user may actively register by simply pressing the active registration button on the remote control and his or her avatar will be overlaid on the screen with a welcome message. In at least one embodiment, when a panelist passively registers or de-registers, a message is overlaid on the screen requesting confirmation of such registration or de-registration with the remote control. For example, if the signal strength associated with a registered panelist's mobile device is lost or is less than a threshold, a message is overlaid on the television asking the remaining panelists to actively de-register the departing panelist (e.g., "If Jerry Smith is no longer watching, please de-register him using the remote control."). In this manner, active means are used to control which panelists are registered, but passive means are used to prompt active registration or deregistration.

In yet another embodiment the gateway 110 is configured to periodically request panelist registration status. This periodic confirmation request may occur when the same panelists have all been registered for a long period of time (e.g., more than an hour). For example, as shown in FIG. 17, a message banner 276 is shown at the bottom of the screen asking "Is everyone still watching TV." This prompts the current viewers to look at the avatars 270 or registration icons 271 shown on the screen and make sure that all the registered panelists are still in the room. The remote control may then be used to actively de-register any panelists who are no longer in the room.

In view of the foregoing, it will be recognized that the gateway 110 is configured to overlay different legends, specific messages, or any of various other additional content directly over existing media content on the television 200. This is accomplished without the need of secondary screens or smaller displays that are hard to see. By using the television 200 as the display interface, the gateway 110 is capable of conveniently displaying any of various graphics, messages, and high-quality images to the users. As a result, the gateway 110 is equipped with numerous features that make the device highly functional and user-friendly.

Internet Activity Measurement

In addition to identifying media content presented on the television 200, the gateway 110 is also configured to identify media content presented on any of various wireless devices within the household. To this end, the gateway 110 is configured to act as a Wi-Fi router or sniffer. Operational software for wireless networking features is retained in the memory 116 of the gateway. The wireless networking software may be retained in a separate memory of the communications module 120, or may be retained with other instructional programs in the main memory of the gateway. In any event, this wireless software interacts with the networking hardware components (e.g., the Wi-Fi chipset 125) in order to provide routing services, and at the same time perform network sniffing that allows the gateway to detect each panelist's Internet activity on their associated mobile device and/or computer. The gateway 110 has two different operation modes that allow it to identify and measure the online mobile device/computer activity in the households: a router mode and a Wi-Fi Sniffer mode.

When operating in the router mode, the Wi-Fi chipset 125 allows the gateway 110 to operate as wireless access point or wireless signal repeater for the household 202. When operating in this mode, mobile/desktop clients connect directly to the gateway 110 in order to obtain an Internet connection. Thus, all the wireless traffic for the household 202 goes through the gateway 110. The gateway 110 is configured to capture the network packets, identify media content presented on specific devices, and generally log all the Internet traffic passing through the gateway.

Figure 18:
FIG. 18 shows an exemplary network traffic log when the gateway of FIG. 1 operates in a router mode.

With reference now to FIG. 18, an exemplary log 1800 is shown of network traffic captured by the gateway 100 when operating in the router mode. As shown in FIG. 18, the log 1800 includes a list of data packets 1810 transferred to various mobile devices via the gateway. Each data packet 1810 includes and/or is further associated with the following information at the gateway 110: date, time, MAC address of mobile device (or computer device), origin IP address, destination IP address, consumed URL, time to live, and user agent. This data is then stored in the memory of the gateway 110, and/or transferred to the remote server 310 for further processing and storage.

Figure 19:
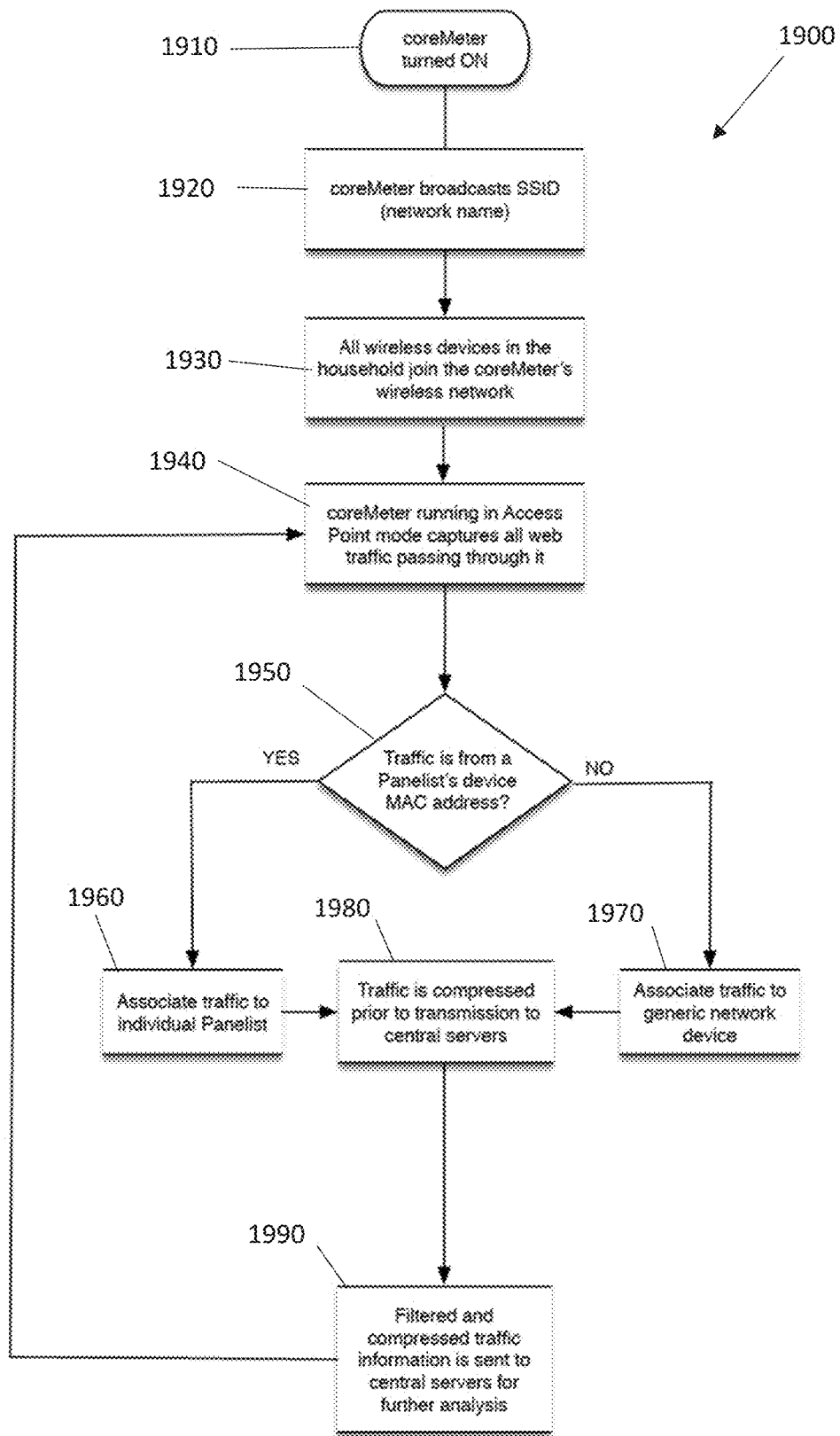
FIG. 19 is a flowchart of a method for detecting network traffic when the gateway of FIG. 1 operates in the router mode.

FIG. 19 shows an exemplary flowchart of a method 1900 of capturing network traffic at the gateway 110 operating in the router mode. The method 1900 begins when the gateway 110 is turned on at step 1910. At step 1920, the Wi-Fi chipset 125 begins operation in the route mode and the gateway 110 broadcasts the network name (SSID) to all wireless computing devices (including mobile devices and standalone devices) within the household 202. At step 1930, devices within the household are joined to the wireless network provided by the gateway 110. When each wireless device is initially joined to the network, the gateway 110 asks the user to associate one of the panelists within the household with the device. If a panelist is identified, the MAC address for the device is associated with the identified panelist within the gateway 110. If no panelist is associated with the device, the device is simply considered a generic traffic device. As shown in step 1940, the gateway 110 serves as the wireless access point for the wireless devices within the household, and routinely captures web traffic data, including web traffic data identifying all media content presented at the each MAC address. At step 1950, each time web traffic is captured, a determination is made whether the traffic is associated with one of the panelist's devices. If the web traffic is associated with a panelist's device, the method continues at step 1960 and associates the identified web traffic with the panelist. On the other hand, if the web traffic is not associated with a panelist's device, the method continues at step 1970, and the web traffic is associated to a generic network device (e.g., guest device). At step 1980, all the web traffic collected by the gateway 110 is compressed prior to transmission to the remote server 310. Thereafter, at step 1990, all the filtered and compressed traffic data is sent to the remote server(s) 310 for further analysis. In particular, if the gateway 110 does not include sufficient processing power to identify media content from the network traffic, such processing occurs at the more powerful remote server 310.

In addition to the router mode, the gateway 110 is also configured to operate in the Wi-Fi sniffer mode (which may also be referred to as the "promiscuous mode"). In this mode, the gateway 110 does not serve as a router, but instead join the household's existing wireless network (e.g., provided by the ISP's router within the household). After joining the household's existing wireless network, the gateway 110 then operates in the promiscuous mode and sniffs network packets that are passed through the network between various wireless devices and the network router. In general, the promiscuous mode causes the gateway 110 to pass all traffic/frames it receives to its microprocessor 114 (i.e., including traffic intended for other devices) for further processing, rather than passing only the traffic/frames specifically intended for the gateway 110. In this manner the gateway 110 analyzes all network traffic, and not only the traffic intended for the gateway 110. Data collected in the promiscuous mode includes the following for each data packet: SSID, BSSID, signal strength/power, beacons, data, channel, encryption type, authentication type, and URL.

Figure 20:
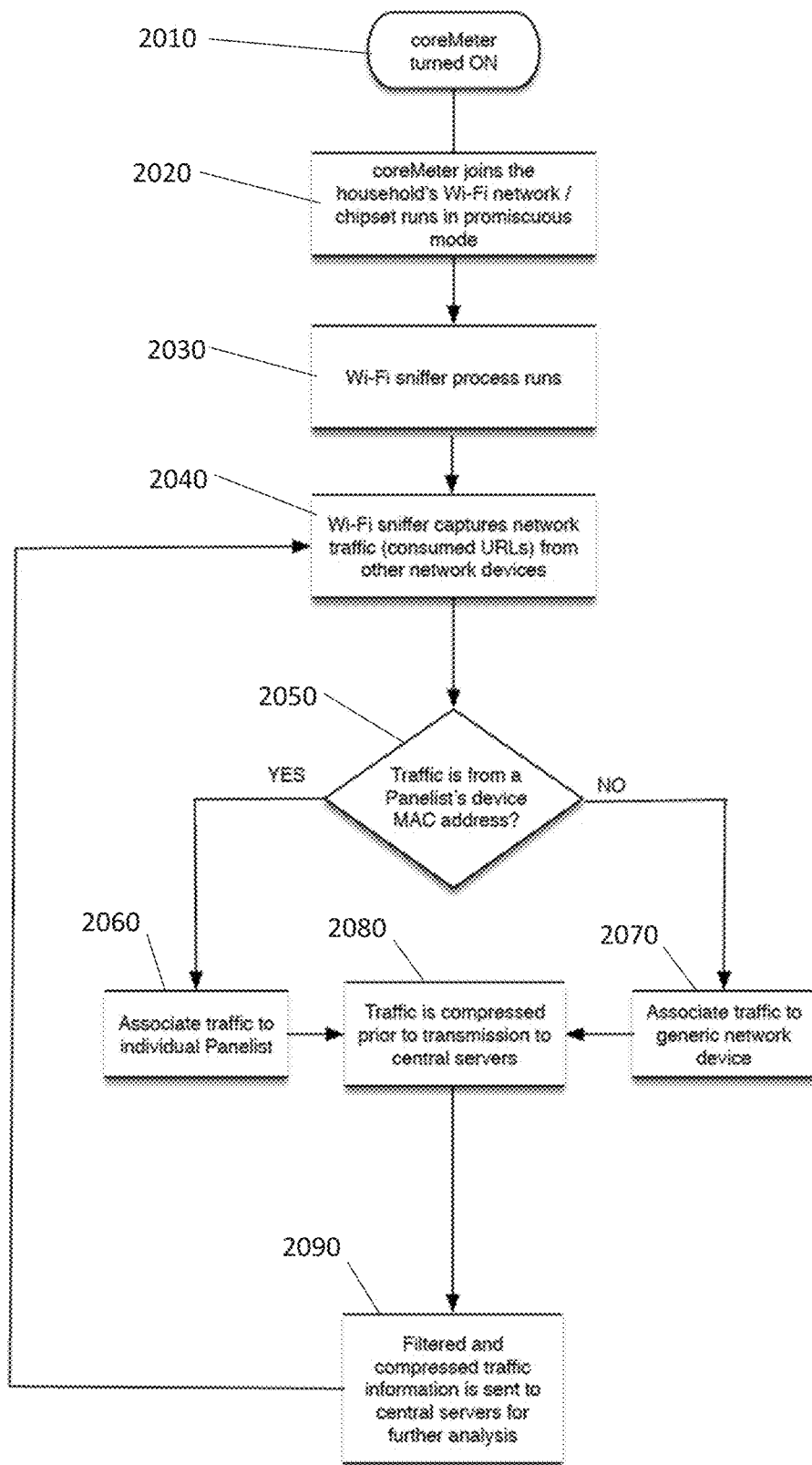
FIG. 20 is a flowchart of a method for detecting network traffic when the gateway of FIG. 1 operates in a promiscuous mode.

FIG. 20 shows an exemplary flowchart of a method 2000 of capturing network traffic at the gateway 110 operating in the promiscuous mode. The method 2000 begins when the gateway 110 is turned on at step 2010. At step 2020, the gateway 110 joins the household's Wi-Fi network and the Wi-Fi chipset 125 begins operation in the promiscuous mode. At step 2030, the Wi-Fi sniffer process runs, and the gateway looks for all traffic on the household's Wi-Fi network, including traffic not intended for the gateway 110. At step 2040, the gateway captures network traffic, and particularly URLs, consumed by/delivered to other network devices. At step 2050, each time web traffic is captured, a determination is made whether the traffic is associated with one of the panelist's devices. If the web traffic is associated with a panelist's device, the method continues at step 2060 and associates the identified web traffic with the panelist. On the other hand, if the web traffic is not associated with a panelist's device, the method continues at step 2070, and the web traffic is associated to a generic network device (e.g., guest device). At step 2080, all the web traffic collected by the gateway 110 is compressed prior to transmission to the remote server 310. Thereafter, at step 2090, all the filtered and compressed traffic data is sent to the remote server(s) 310 (e.g., in the cloud) for further analysis. In particular, if the gateway 110 does not include sufficient processing power to identify media content from the network traffic, such processing occurs at the more powerful remote server 310.

The foregoing process of collecting an identifying media content presented at various wireless devices is run in parallel with the other gateway processes, and in particular the process of identifying content presented on the television (e.g., see FIGS. 5A-5D and 8-10K) and the associated process of panelist registration (e.g., see FIGS. 12-17). With these processes all run in parallel on the gateway 110, it will be recognized that the gateway 110 is configured to identify content presented on all or nearly all media devices within the home, including one or more televisions 200 (with a gateway connected thereto), and any number of different wireless devices within the household. This capability allows the gateway 110 to serve as a single source capable of identifying all media content consumed within the household. Media content identified by the gateway 110 is conveniently summarized in data packages, as described below, and transmitted to the remote server.

Data Packages

Figure 21A:
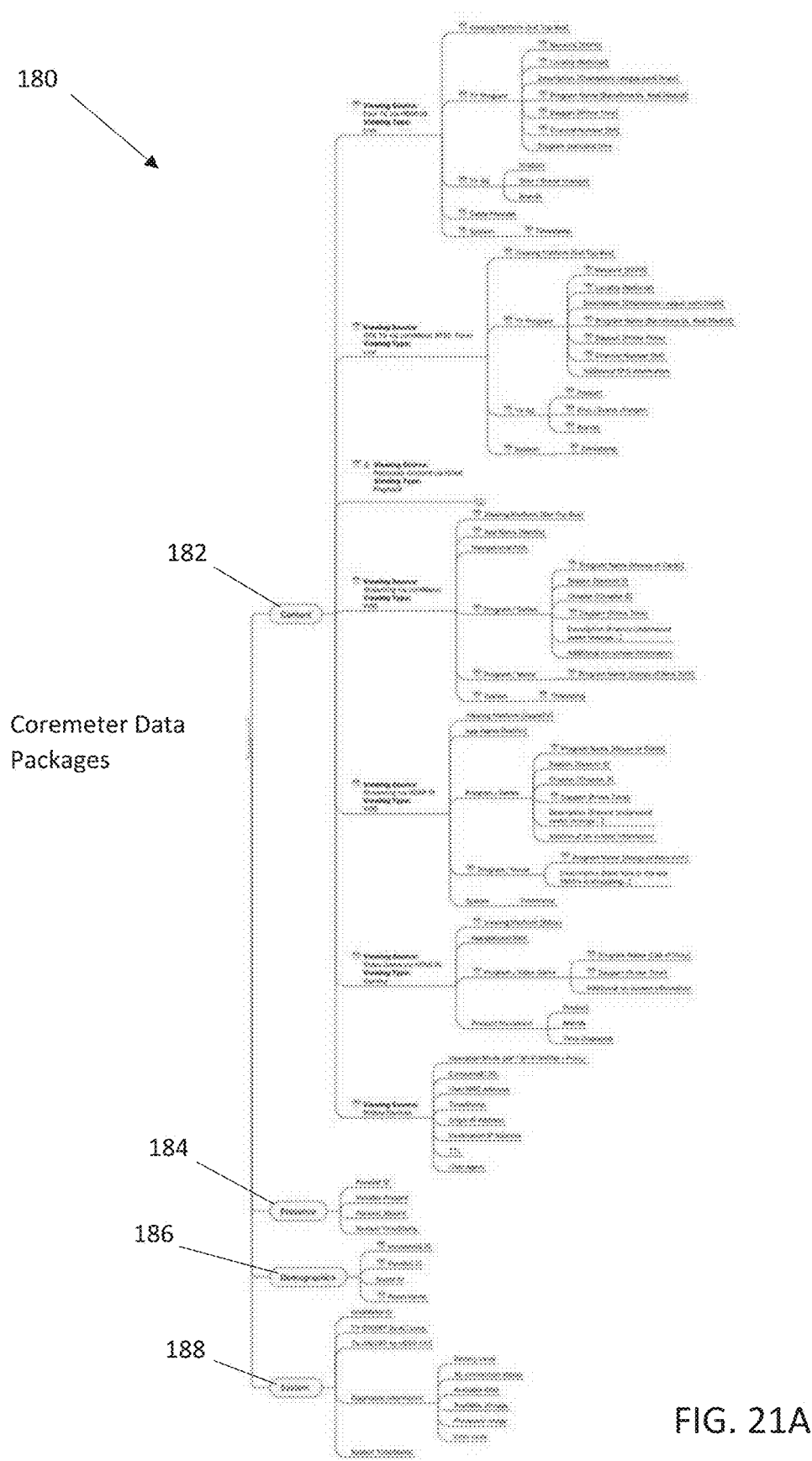
FIG. 21A is a tree diagram of exemplary data packages generated by the gateway of FIG. 1 based on different rule sets for different input sources.

FIG. 21A shows a schematic diagram of exemplary data packages 180 generated by the gateway 110. As shown in FIG. 21A, the exemplary data packages include each of the following: content data packages 182, presence data packages 184, demographic data packages 186, and system data packages 188. One or more of these data packages are automatically generated following a trigger event wherein a video frame is analyzed in-depth and the associated content identified. In particular, at least a content data package and a presence data package 184 are generated following a trigger event. These data packages may be immediately transferred to the remote server 310 and/or the cloud, or may be temporarily stored on the gateway 110 for subsequent transfer. The data packages 180 may be combined or otherwise associated with each other during transmission from the gateway 110. For example, a content data package 180 (i.e., identifying media content) and a presence data package 182 (i.e., identifying registered panelists associated with the identified content) may be automatically combined and transmitted following a trigger event. The remote server 310 may periodically request data from the gateway, such as a system data package 186 that provides diagnostic information about the gateway 110.

Figures 21B, 21C:
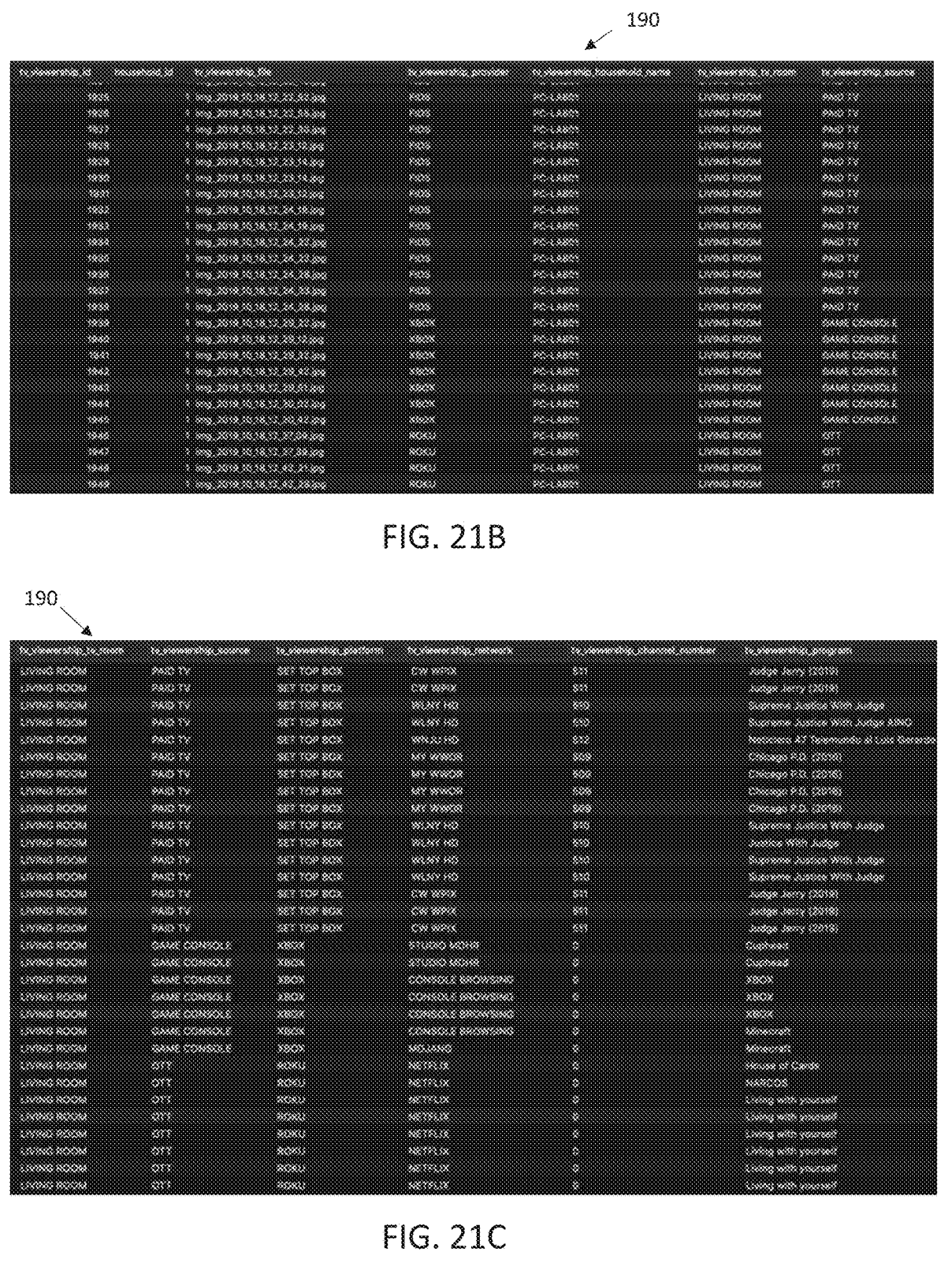

The content data packages 182 and presence data packages 184 transmitted to the remote server 310 are considered to be audience measurement "raw data". This data is further analyzed with additional processing engines at the remote server 310 (or any number of additional remote/cloud servers). The remote server 310 (or servers) apply the appropriate editing rules in order to structure the data as "clean" data for final consumption by clients. "Clean" data may simply be data that is standardized in some manner. For example, is the content data from one cable provider states a program name of "Criminal Minds (2007)", the remote editing rules may recognize that the "2007" parenthetical is a year of first showing, not the actual program name and may standardize the program name so simply be "Criminal Minds" so that it is consistent with the data collected from other cable providers. An exemplary database 190 including records/data packages of clean data is shown in FIGS. 21A and 21B. As noted in the figures, exemplary fields for the data package include viewership identification data (i.e., panelist identification), household identification data, content data, media source data, content provider, network data, channel data, program data, viewership room data (i.e., the room in the household where the content was viewed) viewership file, television provider, and any number of additional fields of data collected by the system 100.

Once the gateway 110 and/or remote server 310 has finished filtering, the resulting compliant (i.e., clean) data is stored by in a separate database. This data is prepared for generating reports and be consulted through a data provisioning portal and API. Final, clean data is available to various end game customers through an authenticated API that they can connect to their own systems for further processing, such as weighting, reporting or business intelligence systems. The aforementioned distributed processing/networking approach, wherein some of the analysis and machine learning routines are performed at the gateway 110 and additional machine learning is performed at the remote server, is advantageous. In particular, much of the data can be processed without the need of the transmission of the media files over the internet, thus saving costs of bandwidth and cloud infrastructure usage. At the same time, advanced processing at the remote server 310 means that the gateway 110 does not need the same advanced processing capabilities, thus resulting in various savings with respect to cost of each gateway.

The data generated and transmitted by the cross-media measurement system 100 is integrated with Blockchain. The use of Blockchain provides a reliable mechanism for audit automation and validation. By incorporating Blockchain in all the layers of the media measurement process, the system can ensure that all registrations, transactions and data generation are traceable and secure. In its simplest form, a Blockchain can be considered to be a distributed ledger which contains the relevant details for every transaction that has ever been processed. The validity and authenticity of each transaction is protected by digital signatures (cryptography). With Blockchain, there is no central administration, and anyone can process transactions using the computing power of specialized hardware. By using Blockchain, a distributed, cryptographic and immutable database is created. The database is considered to be distributed because, unlike most databases that control who can access the information in a system, any computer in the system can access the Blockchain. This creates a system of trust since there is no centralized data. The database is considered to be cryptographic because every transaction recorded in the system is cryptographically verified to ensure its authenticity. Cryptography allows the system's components to collaborate in an automated system of mathematical trust. The database is considered to be immutable because no records can be changed or altered; only new records can be appended to the distributed database. This ensures that data cannot be modified or altered in a way that would change the data generated by the system 100.

Remote Processing

As discussed above, the system 100 is configured to process data captured by the gateway 110 at either the gateway itself, or at one or more remote computing devices, such as remote server 310. The remote server 310 is merely representative of any number of remote computing devices and/or cloud based software that may be utilized by the system 100. The use of remote computing devices and cloud based software allows for increased processing power, expanded memory, and overall increased system functionality.

One example of additional functionality with cloud-based software is increase machine learning processing. In at least one embodiment, all software functions associated with content recognition and processing may run directly in the cloud, and not on physical server or even virtual servers. In this embodiment, the content recognition features work on-demand, and every time a new media capture arrives to the cloud storage, these functions automatically execute to process each piece of media individually. The training/machine learning models that power the cloud-based recognition are much more robust than the ones running locally in the gateway 110. Although the output data is generally the same in structure, the level of training and accuracy of these models may be more advanced since the computing power in the cloud is higher than that running in the gateway itself.

In addition to machine learning, the remote processing capabilities of the system 100 also include raw data storage and processing. The remote software interprets the data generated from the machine learning process and stores all the found metadata into a high-performance big-data database. This data has not yet been processed with editing rules; it is stored directly as it arrives from the machine learning process.

The remote processing power of the system further facilitates the application of compliance rules to the data collected from the gateway 110. Compliance rules are needed for any audience measurement process. These rules are applied to the raw data, in order to determine which households and household members are compliant and adequate to participate in the measurement for a particular day. In the present system, the compliance rules include (i) filtering of households that have a problem with the device or have disconnected it (i.e., diagnostic routines report trouble with the gateway), (ii) filtering of households that have more televisions than gateways 110 installed (i.e., all televisions of the household must be measured in order to accurately measure media consumption within the household), and (iii) filtering of household members that have more than some predetermined threshold period (e.g., 24 hours) of continuous TV viewing (i.e., thus indicating that the panelist is not actually watching the content presented). Once the processing module (e.g., at remote server 310) has finished filtering, the resulting compliant (clean) data is stored by this module in a separate database. This data is prepared for generating reports and be consulted through the data provisioning portal and API.

In at least one embodiment, the remote server 310 is configured to provide a web-based piece of software that allows clients to access the collected data and visualize in on a GUI. The GUI may include a dashboard visualization where all the viewing session of a particular household is displayed. This may include the person recognition information (times where a user was watching television), and a timeline that is constructed based on the time a user spent watching a specific platform, source, channel, network or program. FIG. 6 serves as an example of an exemplary dashboard for a GUI, but it will be recognized that numerous other dashboards are also possible.

In at least one embodiment, a data API is provided for clients via the remote server 310. Clients are able to "pull" the information collected from various gateways 110 directly from the API in order to generate their own reports or to connect our data to existing systems. User administration, permission control and setup are performed by an in-house team.

Television ON/OFF State Detection

It will be appreciated based on the foregoing description that the gateway 110 is configured to identify content consumed by panelists across numerous devices, including content delivered to wireless devices 220 (e.g., smartphones, tablets, etc.) and content delivered to the television 200. The gateway 110 is configured to continually monitor and identify content delivered to the mobile devices 110. However, the gateway 110 is only configured to monitor and identify content delivered to the television 200 when the television itself is turned on (i.e., such that the television screen and capable of presenting content to panelists within the household). By limiting content identification to times when the television is actually turned on, content consumption is more accurately determined. Furthermore, limiting content identification times further optimizes the use of computing resources within the gateway 110 and saves data consumption associated with data transmission through the gateway's Wi-Fi or cellular network connections.

The gateway 110 is configured to determine the on/off state of the television in two ways. First, the gateway 110 is configured to determine the on/off state of the television 200 by monitoring the consumer electronics control (CEC) pin on the HDMI connection between the television 200 and the gateway 110 (i.e., at the HDMI OUT port). Second, the gateway is configured to determine the on/off state of the television 200 by monitoring power flowing to the television 200 via the gateway 110.

AC Detection Through HDMI-CEC

CEC is a control function that lets one A/V component control another if they are connected via HDMI cables. If the television 200 is CEC-enabled, power detection can be performed through the HDMI cable connected to the HDMI OUT port 133 of the gateway 110. By monitoring the CEC pin of the HDMI cable, the gateway 110 can detect signals indicating that the television has been turned on or turned off. As noted previously, in at least some embodiments the gateway 110 is configured to save energy and stop performing television audience measurement computing processes (including content identification and panelist registration) when the television is off. Additionally, in at least some embodiments, the gateway 110 is configured to power itself down whenever the television 200 is turned off. This is especially true in embodiments where the gateway 110 is not monitoring mobile device traffic, and is only monitoring content consumed at the television.

Figure 22:
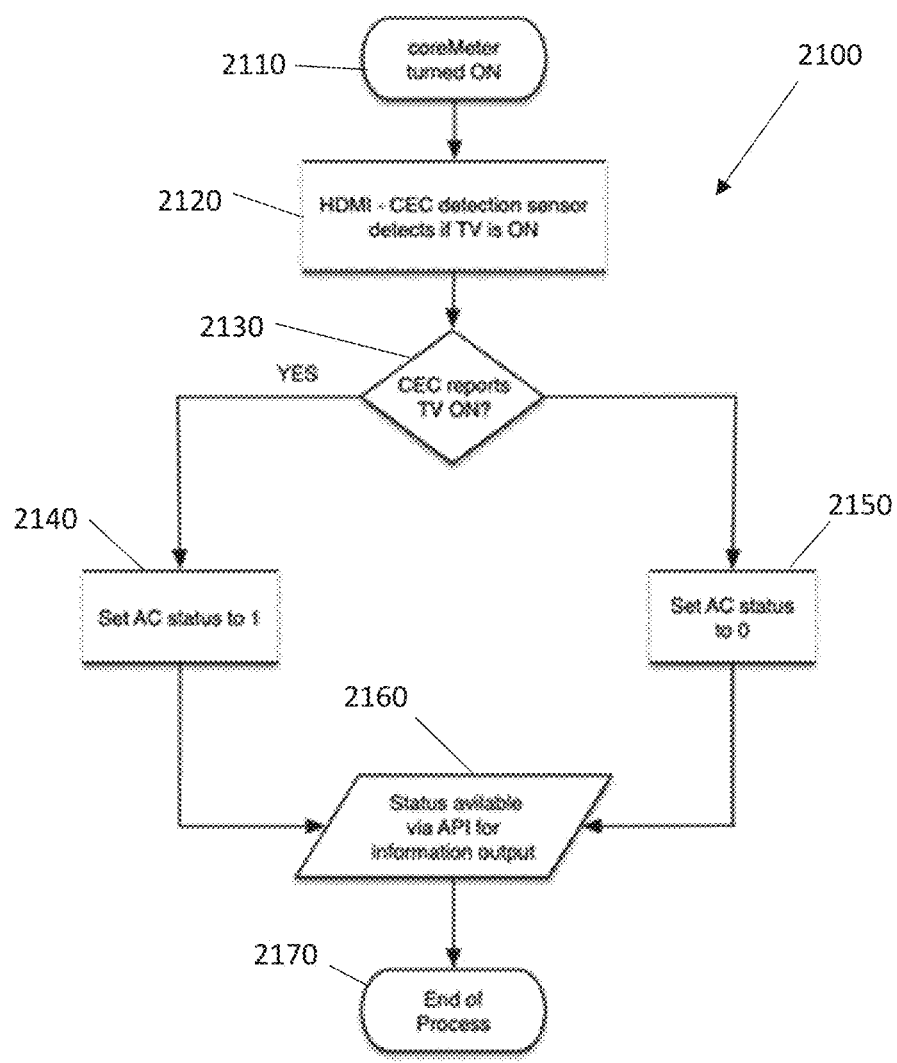
FIG. 22 is a flowchart of a method of determining television on/off state using HDMI-CEC detection at the HDMI output port of the gateway of FIG. 1.

FIG. 22 shows a flowchart 2100 of a process used by the gateway 110 for determining television state based on CEC. The process begins with step 2110 when the gateway 110 is turned on. Thereafter, as step 2120, the CEC pin at the HDMI output port 133 is monitored to detect whether the television is on or off. At step 2130, a signal is received at the CEC pin. If the CEC pin indicates that the television is on, the AC status in the gateway 110 is set to "1" at step 2140. If the CEC pin indicates that the television is off, the AC status in the gateway 110 is set to "0" at step 2150. At step 2160, the television status is made available for output to other components and devices via an application programming interface (API). The process ends at step 2170, but the process is periodically repeated starting with step 2120 in order to determine television status based on the HDMI-CEC port.

AC Detection Through Gateway Power Detection

In addition to being configured to determine power via the CEC control function, the gateway 110 is also configured to monitor power delivered to the television via the AC output port 144. To this end, the AC output port 144 of the gateway 110 includes a receptacle that receives the television's AC plug. When the television plug is connected to the AC output port 144 of the gateway 110, the gateway is able to determine whether power is flowing to the television.

As discussed previously in association with FIG. 2B, the gateway 110 includes an integrated power supply 150 that powers all the electronic components inside of the housing 112. The gateway 110 also includes a TV ON/OFF detection circuit 151 that is capable of sensing that alternating current (AC) is flowing to the television's power cable through the AC output port 144. Through an embedded API, the gateway 110 software obtains the readings from the TV ON/OFF detection circuit 151 to detect if the TV Set is turned on (i.e., alternating current is flowing to the television in excess of a threshold) or is turned off (no/low alternating current to the television).

Figure 23:
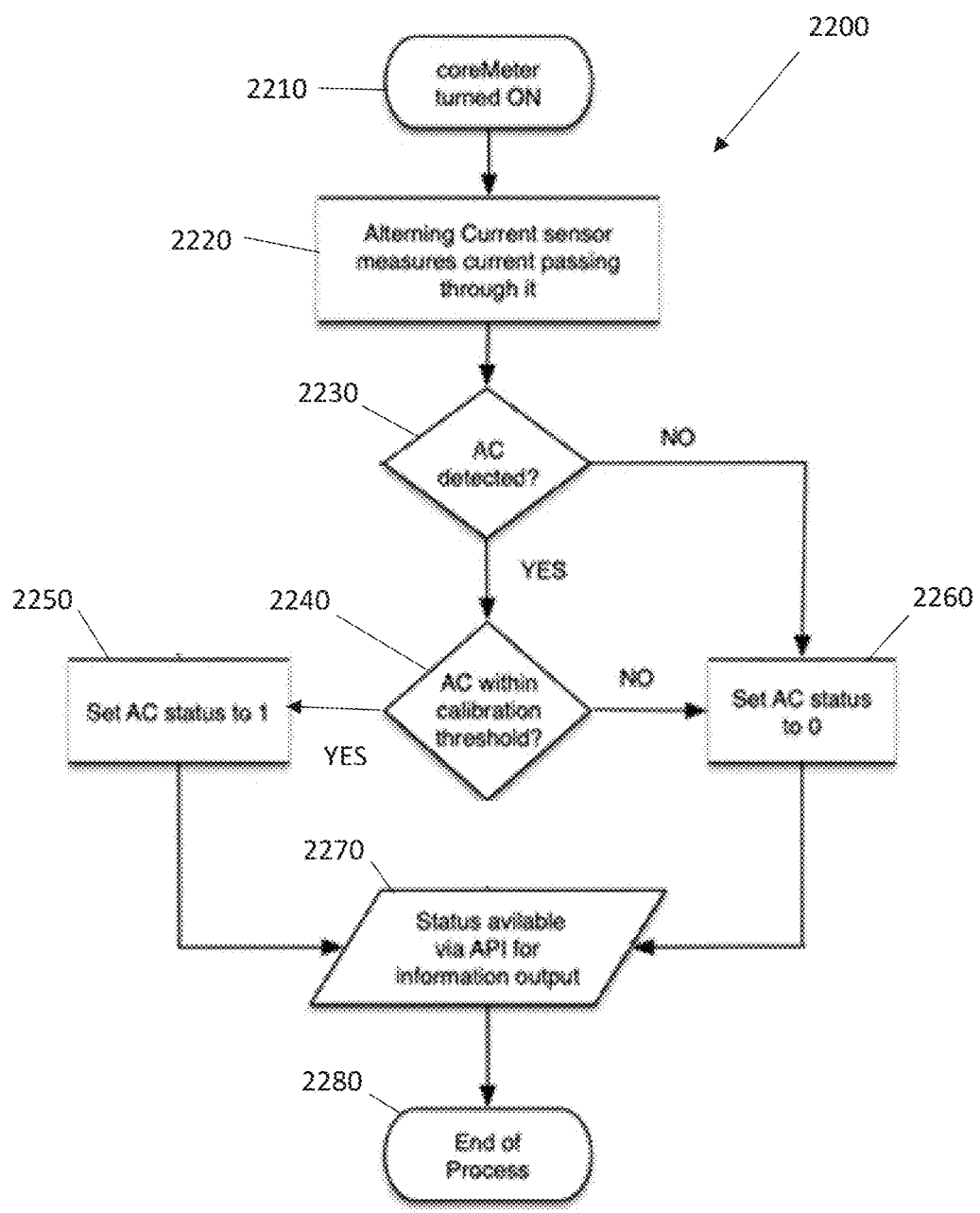
FIG. 23 is a flowchart of a method of determining television on/off state using the AC power detection circuit in the gateway of FIG. 1.

FIG. 23 shows a flowchart 2200 of a CoreMeter process for determining television state based on AC detection using an AC sensor provided by the TV ON/OFF detection circuit 151. The process begins at step 2210 when the gateway is turned on. Then at step 2220, the TV ON/OFF detection circuit 151 of the gateway 110 monitors AC power flowing to the television 200 (e.g., via a current sensor). If AC power is detected at step 2230, the process moves to step 2240 and a determination is made that the current provided to the television is within a calibration threshold. If the current is within the threshold, the process moves to step 2250, and the gateway status of AC to the television is set to "1". On the other hand, if no AC current is detected as step 2230, or if the AC current detected is not within the predetermined threshold at step 2240, the process moves to step 2260, and the gateway status of AC to the television is set to "0". At step 2270, the television status is made available for output to other components and devices via an application programming interface (API). The process ends at step 2280, but the process is periodically repeated starting with step 2220 in order to determine television status based on the AC to the television.

Advantageously, the two different mechanisms for monitoring power to the television 200 (i.e., CEC detection and AC detection) allows the gateway 110 to provide diagnostic information/warnings to the household when there are issues with the connections between the gateway and the television. As a first example, if the power cord of the television 200 is improperly plugged into an AC wall outlet instead of the AC output port 144 of the gateway 110, but the CEC pin on the HDMI OUT port 133 indicates that the television 200 was recently turned on, the gateway 110 may send a warning message for display on the television 200 instructing the user to plug the television into the AC output port 144 of the gateway 110. As another example, if the power cord of the television 200 is properly plugged into the AC output port 144 of the gateway 110, but there is no signal at the CEC pin on the HDMI OUT port 133, this may indicate that the HDMI connection between the television 200 and the gateway 110 has become disconnected, and a warning message can be delivered to the user to check the HDMI connection (e.g., a message delivered via the LCD display 152 or microphone 154 of the gateway).

Graphical User Interface

Figure 24:
FIG. 24 is a first exemplary embodiment of a graphical user interface for the gateway of FIG. 1.
Figure 25:
FIG. 25 is a second exemplary embodiment of a graphical user interface for the gateway of FIG. 1.

The main user interface of the gateway is user-friendly, attractive, and generally makes use of all media sources easy and convenient. This encourages panelists to consume media content via the gateway, thus allowing the gateway 110 to perform the measurement functions. There are at least two options for the gateway's main user interface. FIG. 24 shows a first option for the gateway main user interface wherein the currently selected media source (e.g., TV, game console, etc.) plays in the background, HDMI sources 210 are provided along an arc on a left side of the display, and OTT sources 161 are provided along an arc on a right side of the display. FIG. 25 shows a second option for the gateway main user interface wherein the currently selected media source plays in the background, HDMI sources 210 are provided on a top row of the display, and OTT sources 161 are provided along lower rows of the display.

Exemplary Technological Improvements

Based on the foregoing description, it will be recognized that the system and method for cross-media measurement described herein provides a technological improvement in the form of improved hardware and software devices for reviewing, analyzing and capturing media content presented on a television and various additional media presentation devices within a household. The system provides specific improvements of the conventional systems and related methods. Examples of these improvements over conventional ACR systems are included below. However, the improvements over conventional systems and method are not limited to the examples provided below.

As discussed previously, ACR technology is based on the use of an audio fingerprinting/matching technology, where binary files are compared to a series of audio/pixel references to determine which channels are being watched. In contrast to ACR technology, the gateway 110 leverages machine learning technologies (e.g., computer vision) to perform channel, content and advertising detection directly from the incoming video source, from its embedded OTA Tuner, and from the network traffic coming in/out connected devices. The gateway does not take a single approach for all media consumption options. Instead, the gateway considers the various methods of viewing media, and takes a multi-layer approach to determine the content presented to panelists. The methodology of the gateway does not need to assume the source of content, but instead bases content analysis on the source. This provides for more accurate content recognition and analysis. Furthermore, the gateway is able to definitively identify the decision-making path of content selection.

In order to comprehensively support an ACR solution, the library used for its implementation must include continuous recording of all available TV signals. Recorded stations and geographically distributed backups must be installed at different locations nationwide. The libraries should further include original content that is available across every available streaming service. Advantageously, the gateway 110 does not rely on a reference library. Instead, the gateway makes use of trained machine learning models in order to detect particular items in the watched signal. This is significant both from an accuracy perspective as well as a comprehensive analysis perspective. The gateway is able to reliably detect and measure content that may not be included in an ACR library.

ACR is completely unable to detect a channel/source provider when an event or program is being transmitted simultaneously in different channels. In contrast, the gateway does not have simulcast detection problems since it does not rely on audio. The gateway explicitly tracks the specific source of the content and ads that are delivered to the television. With this methodology we are also able to measure simulcast events (same content broadcasted at the same time in different channels), which is not possible with the ACR approach. The ability to identify sources allows for accurate reporting across the various television platform and device options which then translates to accurate allocation of measurement for both content and ads.

With ACR, beyond schedule supported content environments (i.e., viewing through the use of additional external devices such as video game consoles, DVD players, OTT sources, etc.) are difficult or impossible to detect. The conventional solution to this is a content matching methodology wherein validation of exposure/source must occur via manual panelist confirmation (e.g., manual button pushing). In contrast, the gateway is configured to detect and measure content from any number of different sources (e.g., video games, cable boxes, Blu-ray players, OTT sources, etc.). Thus, the gateway is configured to determine viewing behavior outside of non-linear environments (AppleTV, Roku, Video Game Console, etc.), inclusive of source, content, and ads. Marketers need validated measurement of these environments in order to shift their ad dollars into them.

In addition to the above, conventional ACR systems are not capable of measuring content presented at secondary devices (e.g., mobile phones, computers, etc.). Accordingly, additional hardware, software and meter components are needed in order to measure secondary devices in the ACR environment. In contrast, the gateway includes a dedicated chipset that allows it to act as wireless access point to capture the traffic going through it. This allow the entire household's media traffic to be analyzed and reported by the gateway. The gateway thus provides a single-source cross-platform solution to audience measurement that is capable of detecting media consumption overlaps across television platforms and secondary devices.

With conventional ACR, the timeliness of reporting is reliant on the ACR match-back process which needs at least 24 hours for the various confirmations needed to make the inferences of measurement. In the event of recording quality issues, reprocessing has to be re-run, and information delivery can be importantly delayed or entirely left out. The gateway 110 delivers content detection as it happens, and the information can be delivered to the cloud essentially in real time.

Conventional ACR and related systems require additional peripheral hardware to perform TV ON/OFF detection. In particular, the use of ACR microphones to detect TV ON/OFF is unreliable as the microphones tend to pick up signals from other sources which skews the output data (e.g., the microphone may detect television on when the audio is actually from a radio). In contrast to conventional ACR, the configuration of the gateway 110 allows it to definitively identify TV ON/OFF without reliance on a microphone or any peripheral device. All hardware required for TV ON/OFF detection is included inside the gateway 110, thus allowing TV ON/OFF detection as a built-in feature. As described above, in various embodiments, an AC Loop circuit detects the power consumed by the television connected to the gateway. Additionally, for those televisions that support the HDMI CEC protocol, the detection of TV ON/OFF state can be done via the HDMI output port of the gateway.

Conventional ACR is dependent on the capture of very high quality audio via microphones external to the television. This is problematic and unreliable for numerous reasons, including the possibility for muted televisions, ambient noise, etc. In contrast, the gateway 110 is configured to perform recognition through video content analysis, and particularly analysis of the video signal itself (e.g., in the case of an OTA television signal) or the selected frames of an input source (e.g., in the case of content provided by a cable box). Video analysis (e.g., video frame analysis) is more accurate and effective than audio detection because video analysis avoid the problems associated with audio capture including probability of interference and lack accurate identification and detection.

ACR supported methodologies utilize consumer-grade off the shelf hardware (e.g., portable tablets) which is not meant for the panel environment (thus resulting in short shelf lives). ACR supported methodologies also cannot support a variable device multimedia entertainment system. A patched together approach of several devices is usually necessary and implemented. In contrast to ACR, the gateway is a self-contained system wherein every component required to support each layer of the measurement solution is soldered to the main board. No delicate parts can be easily broken which results in long shelf lives that support the panel environment. The hardware is specifically designed for the in-home panel environment. It is configured to analyze and detect numerous different methods of media consumption. The gateway allows for a passive panelist experience which results in the most accurate, comprehensive and granular single-source data output.

In addition to the above, the consumer-grade off the shelf hardware components and devices (e.g., portable tablet computers) common to many ACR systems are attractive for panelists to use for tasks outside of panel measurement objectives. These devices are thus subject to abuse and a generally shorter lifespan. These devices must also be repeatedly turned on and off and charged, such that a relatively short lifespan is inherent with the device. In contrast, the minimalist design of the gateway 110 results in an innocuous presence in the household that discourages tampering. This reduces the opportunities for equipment loss due to fraud and allows for consistent presence within the household for audience measurement purposes. The gateway is specifically designed for continuous audience measurement (i.e., 24 hours a day, seven days a week) without the need for the user to take any particular action.

Because ACR technologies implement consumer-grade off-the-shelf hardware devices, user experiences are often forced upon the panelist experience when interacting with these devices that would otherwise not be in the home. In contrast, the gateway provides a friendly user interface that leverages the use of the television as a display to show high impact graphics. The panelist experience and behaviors are consistent with those prior to our installation of the gateway. The ability to communicate on the television screen allows the user interface to remain native to the user's existing media consumption environment.

The aforementioned combination of several components, devices, and consumer-grade off-the-shelf hardware with conventional ACR systems has long-term cost implications. The multiple points of failure results in high equipment churn, replacement, and repair costs. This equipment churn also impacts panelist satisfaction/drop-out, which in-turn results in panelist replacement costs. In contrast, the gateway includes all the necessary hardware in one device, is extremely durable, is built for continuous audience measurement real-world environment, has an innocuous presence, and includes an all-in-one measurement approach. As a result, the gateway 110 not only delivers higher data integrity, but also facilitates unique data outputs that can produce higher return on investment.

Although the various embodiments have been provided herein, it will be appreciated by those of skill in the art that other implementations and adaptations are possible. Furthermore, aspects of the various embodiments described herein may be combined or substituted with aspects from other features to arrive at different embodiments from those described herein. Thus, it will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of identifying media content presented on a display device in communication with a content gateway, the media content provided by a video signal comprising a series of frames, the method comprising:

determining, at a processor within the gateway, a selected input source providing the video signal, wherein the selected input source is one of a plurality of input sources including at least a first input source and a second input source;

selecting a first set of content identification rules when it is determined that the selected input source is the first input source, wherein the first set of content identification rules define a first trigger event and a first algorithm for analyzing one or more of the frames of the video signal following the first trigger event;

selecting a second set of content identification rules when it is determined that the selected input source is the second input source, wherein the second set of content identification rules define a second trigger event and a second algorithm for analyzing one or more frames of the video signal following the second trigger event, wherein the second set of content identification rules is different from the first set of content identification rules; and applying the selected first set or second set of content identification rules to the video signal in order to generate content identification data for the media content presented on the display device, wherein applying the selected first set of content identification rules includes waiting for the first trigger event and applying the first algorithm to one or more frames of the video signal following the first trigger event, and wherein applying the selected second set of content identification rules includes waiting for the second trigger event and applying the second algorithm to one or more frames of the video signal following the second trigger event.

2. The method of claim 1 further comprising, transmitting the generated content identification data to a remote computing device.

3. The method of claim 1 wherein the first trigger event is detection of a content grid within one of the frames of the video signal, and wherein application of the first set of content identification rules includes periodically applying a grid detection algorithm to the frames of the video signal.

4. The method of claim 3 wherein the grid detection algorithm is applied to every frame of the video signal provided by the selected input source.

5. The method of claim 3 wherein the first algorithm is a content extraction algorithm applied to the detected content grid.

6. The method of claim 1 wherein the first input source is a specific model of set-top box, and wherein selection of the first identification rules is based at least in part on the specific model of set-top box.

7. The method of claim 1 wherein the second trigger event is passage of an amount of time since a previous frame capture, and wherein the second algorithm is a logo recognition algorithm.

8. The method of claim 1 wherein the second trigger event is detection of a scene change in the series of frames, and wherein the second algorithm is a brand recognition algorithm.

9. The method of claim 1 wherein the display device includes a screen and a speaker, wherein the first algorithm is a first machine-learned algorithm, and wherein the second algorithm is a second machine-learned algorithm.

10. A non-transitory computer-readable medium for identifying media content provided by a video signal delivered to and presented on a display device, the computer-readable medium having a plurality of instructions stored thereon that, when executed by a processor, cause the processor to:
    determine a selected input source providing the video signal, wherein the selected input source is one of a plurality of input sources including at least a first input source and a second input source;
    select a first set of content identification rules when it is determined that the selected input source is the first input source, wherein the first set of content identification rules define a first trigger event and a first algorithm for analyzing one or more frames of the video signal following the first trigger event;
    select a second set of content identification rules when it is determined that the selected input source is the second input source, wherein the second set of content identification rules define a second trigger event and a second algorithm for analyzing one or more frames of the video signal following the second trigger event, wherein the second set of content identification rules is different from the first set of content identification rules; and
    apply the selected first set or second set of content identification rules to the video signal in order to generate content identification data for the media content presented on the display device, wherein application of the selected first set of content identification rules causes the processor to wait for the first trigger event and apply the first algorithm to one or more frames of the video signal following the first trigger event, and wherein application of the selected second set of content identification rules causes the processor to wait for the second trigger event and apply the second algorithm to one or more frames of the video signal following the second trigger event.

11. The non-transitory computer-readable medium of claim 9 wherein the first trigger event is detection of a content grid within one of the frames of the video signal, wherein application of the first set of content identification rules includes periodically applying a grid detection algorithm to the frames of the video signal, and wherein the first algorithm is a content extraction algorithm applied to the detected content grid.

12. The non-transitory computer-readable medium of claim 9 wherein the first input source is a specific model of set-top box, and wherein selection of the first identification rules is based at least in part on the specific model of set-top box.

13. The non-transitory computer-readable medium of claim 9 (i) wherein the second trigger event is one of passage of an amount of time since a previous frame capture or detection of a scene change in the series of frames, and (ii) wherein the second algorithm is a logo recognition algorithm or a brand recognition algorithm.

14. A gateway for identifying media content presented on a display device including a screen and a speaker, the gateway comprising:
    a plurality of input ports including at least a first input port and a second input port;
    an output port configured to transfer a video signal received at the first input port or the second input port to the display device, wherein the video signal includes a series of frames that provide the media content; and
    a processor configured to execute a computer application comprising a plurality of instructions which are configured to, when executed, cause the gateway to:
    determine a selected input port providing the video signal;
    select a first set of content identification rules when it is determined that the selected input port is the first input port, wherein the first set of content identification rules define a first trigger event and a first algorithm for analyzing one or more frames of the video signal following the first trigger event;
    select a second set of content identification rules when it is determined that the selected input port is the second input port, wherein the second set of content identification rules define a second trigger event and a second algorithm for analyzing one or more frames of the video signal following the second trigger event, wherein the second set of content identification rules is different from the first set of content identification rules; and
    apply the selected first set or second set of content identification rules to the video signal in order to generate content identification data for the media content presented on the display device, wherein application of the selected first set of content identification rules causes the processor to wait for the first trigger event and apply the first algorithm to one or more frames of the video signal following the first trigger event, and wherein application of the selected second set of content identification rules causes the processor to wait for the second trigger event and apply the second algorithm to one or more frames of the video signal following the second trigger event.

15. The gateway of claim 14 further comprising a housing, wherein the processor, the plurality of input ports, and the output port are all retained within the housing, and wherein the plurality of input ports and the output port are accessible through the housing.

16. The gateway of claim 15 wherein the first input port and the second input port are both HDMI ports.

17. The gateway of claim 16 wherein the first input port is connected to a set-top box, and wherein the second input port is connected to one of a video game console, a disc player, or an OTT device.

18. The gateway of claim 14 further comprising a storage apparatus and a transceiver, wherein the first set of content identification rules and the second set of content identification rules are retained in the storage apparatus, wherein the transceiver is configured to communicate with a remote server, and wherein at least one of the first algorithm and the second algorithm is stored at the remote server, and wherein application of the first application or the second application causes the processor to capture and transmit one or more frames of the series of frames to the remote server via the transceiver for application of the first algorithm or the second algorithm.

19. The gateway of claim 14 further comprising a router, wherein the processor is further configured to detect additional media content presented at a mobile device via the router.

20. The gateway of claim 15, wherein the processor is configured to register a panelist for association with media presented on the display device based on a signal strength of the mobile device at the router.

* * * * *